US011695323B2

(12) United States Patent
Lifschits et al.

(10) Patent No.: US 11,695,323 B2
(45) Date of Patent: Jul. 4, 2023

(54) METHOD AND APPARATUS FOR DISCHARGE

(71) Applicant: Solaredge Technologies Ltd., Herzeliya (IL)

(72) Inventors: Zakay Lifschits, Jerusalem (IL); Andrey Omer, Beit Kama (IL); Tzachi Glovinsky, Petah Tikva (IL); Yakir Loewenstern, Ariel (IL)

(73) Assignee: Solaredge Technologies Ltd., Herzeliya (IL)

( * ) Notice: Subject to any disclaimer, the term of this patent is extended or adjusted under 35 U.S.C. 154(b) by 27 days.

(21) Appl. No.: 17/131,892

(22) Filed: Dec. 23, 2020

(65) Prior Publication Data

US 2021/0203220 A1    Jul. 1, 2021

Related U.S. Application Data

(60) Provisional application No. 62/954,200, filed on Dec. 27, 2019.

(51) Int. Cl.
| | | |
|---|---|---|
| *H02M 1/32* | (2007.01) | |
| *H02S 40/32* | (2014.01) | |
| *H02M 3/155* | (2006.01) | |
| *H02M 7/5387* | (2007.01) | |

(52) U.S. Cl.
CPC .............. *H02M 1/32* (2013.01); *H02M 3/155* (2013.01); *H02M 7/5387* (2013.01); *H02S 40/32* (2014.12)

(58) Field of Classification Search
CPC ...... H02M 1/32; H02M 3/155; H02M 7/5387; H02S 40/32

USPC ......................................................... 363/132
See application file for complete search history.

(56) References Cited

U.S. PATENT DOCUMENTS

| | | | | |
|---|---|---|---|---|
| 9,293,284 | B1 * | 3/2016 | Romas | ...................... H02J 1/00 |
| 10,110,142 | B2 * | 10/2018 | Outram | ................. H02M 7/217 |
| 10,886,744 | B2 * | 1/2021 | Tsuruma | ................. H02J 3/383 |
| 2013/0214745 | A1 | 8/2013 | Funaba et al. | |
| 2014/0070751 | A1 | 3/2014 | Niwa et al. | |

FOREIGN PATENT DOCUMENTS

| | | |
|---|---|---|
| DE | 102017218429 A1 | 4/2019 |
| EP | 2460682 A1 | 6/2012 |
| EP | 2541748 A1 | 1/2013 |
| JP | H10224902 A | 8/1998 |
| WO | 2015082193 A2 | 6/2015 |
| WO | 2018219644 A1 | 12/2018 |

OTHER PUBLICATIONS

May 6, 2021—European Search Report—EP 20216904.1.

* cited by examiner

*Primary Examiner* — Yemane Mehari
(74) *Attorney, Agent, or Firm* — Banner & Witcoff, Ltd.

(57) ABSTRACT

Systems, apparatuses, and methods are described for discharging an input voltage by utilizing discharge circuitry configured to produce a relatively constant discharge voltage value/output voltage, a relatively constant discharge current value/output current, or a relatively constant discharge power value/output power. The discharge circuitry may include at least one power device, such as a DC to DC converter.

27 Claims, 31 Drawing Sheets

METHOD AND APPARATUS FOR DISCHARGE

CROSS-REFERENCE TO RELATED APPLICATIONS

This application claims priority to U.S. Provisional Patent Application No. 62/954,200, filed Dec. 27, 2019. The entire disclosure of the foregoing application is incorporated by reference in its entirety.

BACKGROUND

A photovoltaic (PV) system is a power system designed to supply solar power by converting sunlight into electricity. PV systems generally include solar panels or "PV modules". PV modules include a number of solar cells. PV systems are used in commercial and residential applications. One issue with PV systems is that they may include system power devices (e.g., direct current (DC) to alternating current (AC) converters/inverters), which may have a relatively great power and/or voltage value, which may need to be discharged.

SUMMARY

The following summary presents a simplified summary of certain features. The summary is not an extensive overview and is not intended to identify key or critical elements.

Systems, apparatuses, and methods are described for relatively quick discharge of a power device (e.g., a local power device or a system-level power device) in power systems, e.g., PV systems.

In some examples the power system(s) may include discharge circuitry that may be configured to control the discharge. The discharge circuitry may be configured to produce a relatively constant discharge voltage value/output voltage, a relatively constant discharge current value/output current, and a relatively constant discharge power value/output power. In some examples the discharge circuitry may include at least one power device, such as a DC to DC converter. One or more controllers may be configured to operate the discharge circuitry to discharge the input voltage. The one or more controllers may be configured to regulate the output voltage of the discharge circuitry. The one or more controllers may be configured to regulate the output voltage to about a constant value (e.g., for at least one phase of discharging the input voltage). The one or more controllers may be configured to regulate an output current of the discharge circuitry to about a constant current value (e.g., for at least one phase of discharge). The one or more controllers may be configured to regulate an output power of the discharge circuitry to about a constant power value (e.g., for at least one phase of discharge).

In some examples the power system(s) may include at least one power device that has multiple modes of operation. In a first mode of operation the power device may be configured to convert input power to output power, and provide the output power at a first output voltage to a first load (e.g., an AC electrical grid). And, in a second mode of operation, the power device may be configured to discharge input voltage by converting the input voltage to a second output voltage across a second load (e.g., a resistor for discharge).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
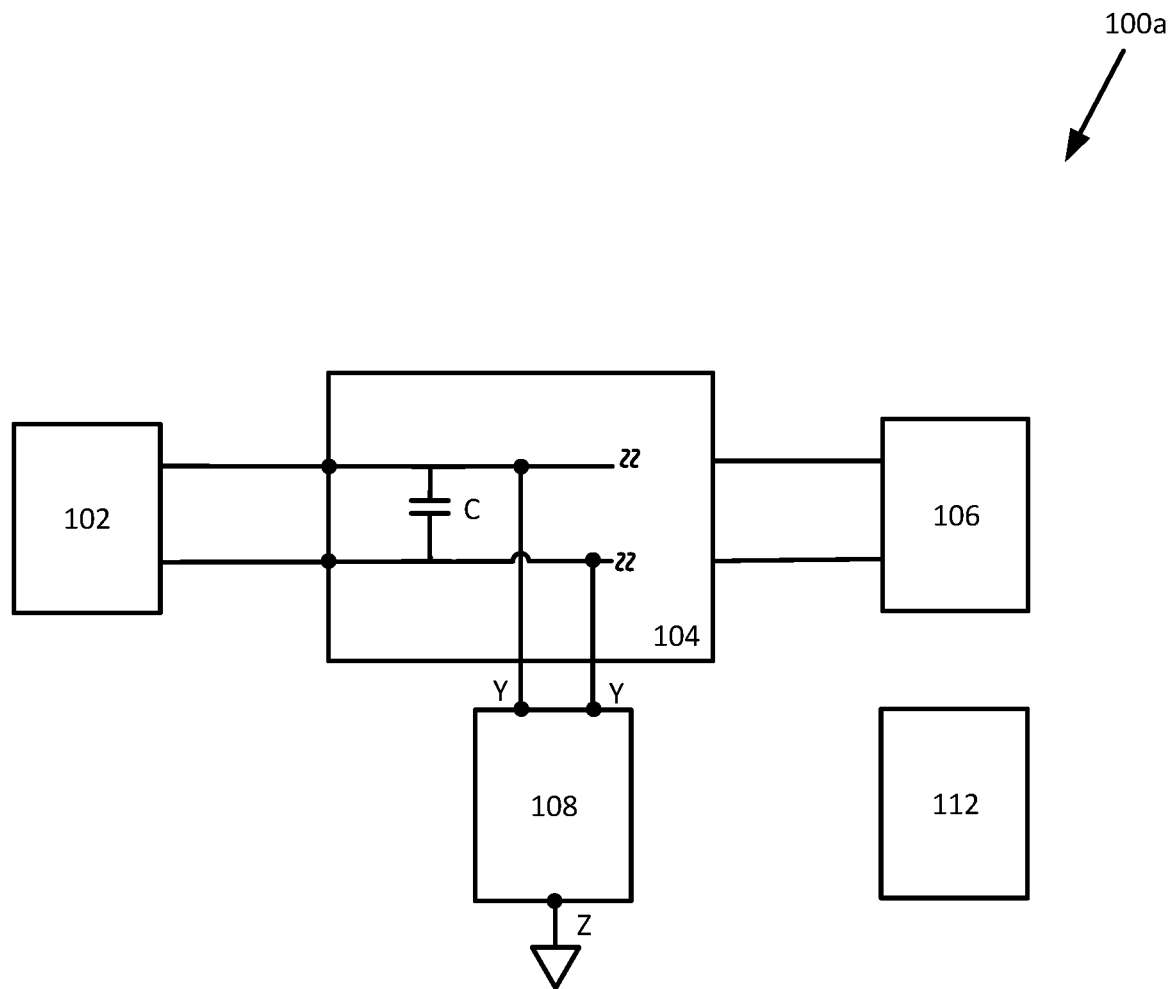
FIG. 1A illustrates a power system, in accordance with certain examples of the presently disclosed subject matter.

The accompanying drawings, which form a part hereof, show examples of the disclosure. It is to be understood that the examples shown in the drawings and/or discussed herein are non-exclusive and that there are other examples of how the disclosure may be practiced.

It is noted that the teachings of the presently disclosed subject matter are not bound by the power systems described with reference to the figures. Equivalent and/or modified functionality may be consolidated or divided in another manner and may be implemented in any appropriate combination. For example, power source 102 and power device 110, which are shown as separate units of power system 100d (FIG. 1D), may have their functionalities and/or components combined into a single unit.

It is also noted that the teachings of the presently disclosed subject matter are not bound by the flow charts illustrated in the figures, and the illustrated operations may occur out of the illustrated order. For example, operations 1804 and 1810 shown in succession in method 1800 (FIG. 18) may be executed substantially concurrently or in the reverse order. It is also noted that whilst the flow charts are described with reference to elements of power systems illustrated herein, this is by no means binding, and the operations may be performed by elements other than those described herein. Operations described with respect to a particular system may also be applied to a different system, without departing from the scope of the disclosure herein.

It is also noted that like references in the various figures refer to like elements throughout the application.

It is also noted that all numerical values given in the examples of the description are provided for illustrative purposes only and are by no means binding.

The terms, "substantially", "about", "sufficient", "efficiently", and, "threshold", used herein include variations that are equivalent for an intended purpose or function (e.g., within a permissible variation range). Certain values or ranges of values are presented herein with numerical values being preceded by the terms "substantially", "about", "sufficient", and, "threshold". The terms "substantially", "about", "sufficient", and "threshold", are used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

The term, "controller", used herein may include a computer and/or other appropriate processor/processing circuitry and memory. The terms "computer" or "processor" or variations thereof should be expansively construed to cover any kind of hardware-based electronic device with data processing capabilities including, by way of non-limiting example a digital processing device (e.g., digital signal processor (DSP), microcontroller, field programmable circuit, application-specific integrated circuit (ASIC), etc.) or a device which comprises or is operatively connected to one or more processing devices, or an analog circuit implementing control logic. The term, "memory", used herein should be expansively construed to cover any volatile or non-volatile computer memory suitable to the presently disclosed subject matter. The above may include, by way of non-limiting example, controller 112 disclosed in the present application.

Reference is now made to FIG. 1A, which illustrates a power system 100a according to examples of the present subject matter. Power system 100a may include one or more power sources 102. As an example, power system 100a may be a PV power system, and power sources 102 may be PV generators/PV modules. Although power sources are described herein in the context of PV generators/PV modules, it will be appreciated that the term power source may include other types of power sources, for example: wind turbines, hydro-turbines, fuel cells, batteries, etc.

Power source 102 may be connected to one or more system power devices 104. Power source may be a single power source or a plurality of power sources (e.g., connected in series and/or parallel).

System power device(s) 104 may be, for example, one or more: DC to DC converter(s) (e.g., buck converters, boost converters, buck/boost converters, buck+boost converters, isolating converters such as flyback converters, forward converters, etc.), DC to AC converter(s)/inverter(s), micro-inverter(s), etc. System power device 104 may be an inverter for one or more phases (e.g., a one phase inverter, two phase/split-phase inverter, and/or a three phase inverter, etc.), and may include lines/phases that are not illustrated herein for the sake of simplicity.

System power device 104 may be connected to one or more loads 106. The one or more loads may include, for example: an electrical grid (e.g., an AC electrical grid), a storage device (e.g., a battery), a resistive device (e.g., a resistor), etc.

System power device 104 may be connected to one or more discharge circuitry 108.

System power device 104 may include one or more switches (illustrated, for example, in FIG. 9) configured to switchably/reversibly connect/disconnect the system power device 104 to/from one or more other elements of the power system 100a (e.g., power source 102, load 106, discharge circuitry 108, etc.). The one or more switches may include one or more, for example: MOSFET, bipolar junction transistor (BJT), solenoid switch, relay switch(es), contactor switch(es), etc.

System power device 104 may include one or more capacitors C. For example, relatively great capacitors (such as, about 1 mF/1,000 uF to about 10 mF/10,000 uF, e.g., about 5 mF/5,000 uF). The one or more capacitors may store a relatively great charge corresponding to a relatively great voltage potential. This relatively great voltage potential may pose a potential danger to people who may need to approach the power system.

For example, in certain safety situations there may be a need to shut off the system power device 104 (e.g., an inverter) and/or to disconnect the system power device 104 from the one or more loads 106. In such cases there may be a desire to make sure that safety workers are not exposed to the relatively great voltage potential due to the relatively large capacitors in the system power device 104 (e.g., inverter). Therefore, there may be a need to discharge (e.g., disperse/dissipate on a load) the relatively great voltage (e.g., hundreds or tens of hundreds of volts, for example, about 500 volts or about 1000 volts) to a relatively lesser voltage/safety threshold voltage (e.g., tens of volts, for example, about 20 volts or about 30 volts) in a relatively short time (e.g., tens of seconds, for example, about 10 seconds-about 30 seconds).

As another example, in certain situations maintenance workers may need to perform maintenance on the power system. In these and other cases, there may also be a need to discharge (e.g., disperse/dissipate on a discharge load) the relatively great voltage in a relatively short time (e.g., until a lower voltage threshold, for example, a 30 volt safety threshold).

Discharge circuitry 108 may be configured to discharge the input voltage (e.g., due to the capacitor C) in response to one or more indication/signal to perform discharge.

The one or more indication to perform discharge may be related to: overvoltage, islanding, shut down, maintenance, an indication that at least one switch has been turned off, an indication that at least one system power device 104 has been turned off, an indication that a cover of a housing has been unlocked/removed, etc.

An indication related to shut down may include one or more shut down signals. The one or more shut down signals may include one or more sensor measurements or one or more communication signals. For example, a communication device coupled to a controller may receive a communication signal (e.g., from a server or central control device), and upon receipt of the communication signal, the controller may operate discharge circuitry to discharge the input voltage. As another example, a voltage sensor may continuously measure the input voltage and provide voltage measurements to the controller. If a voltage measurement is above a threshold, the controller may operate the discharge circuitry to discharge the input voltage.

An indication that at least one switch has been turned off may be an indication that at least one DC switch has been turned off, and/or an indication that at least one AC switch has been turned off. A DC switch may be a switch connected to a line that is connected to a DC source. In some examples, a DC switch may be a switch configured to connect circuitry (e.g., circuitry included in one or more elements of the power system, for example, circuitry related to system power device 104) to a DC power source or a DC load. An AC switch may be a switch connected to a line that is connected to an AC source or to an AC load (e.g., an electrical grid).

Figure 4:
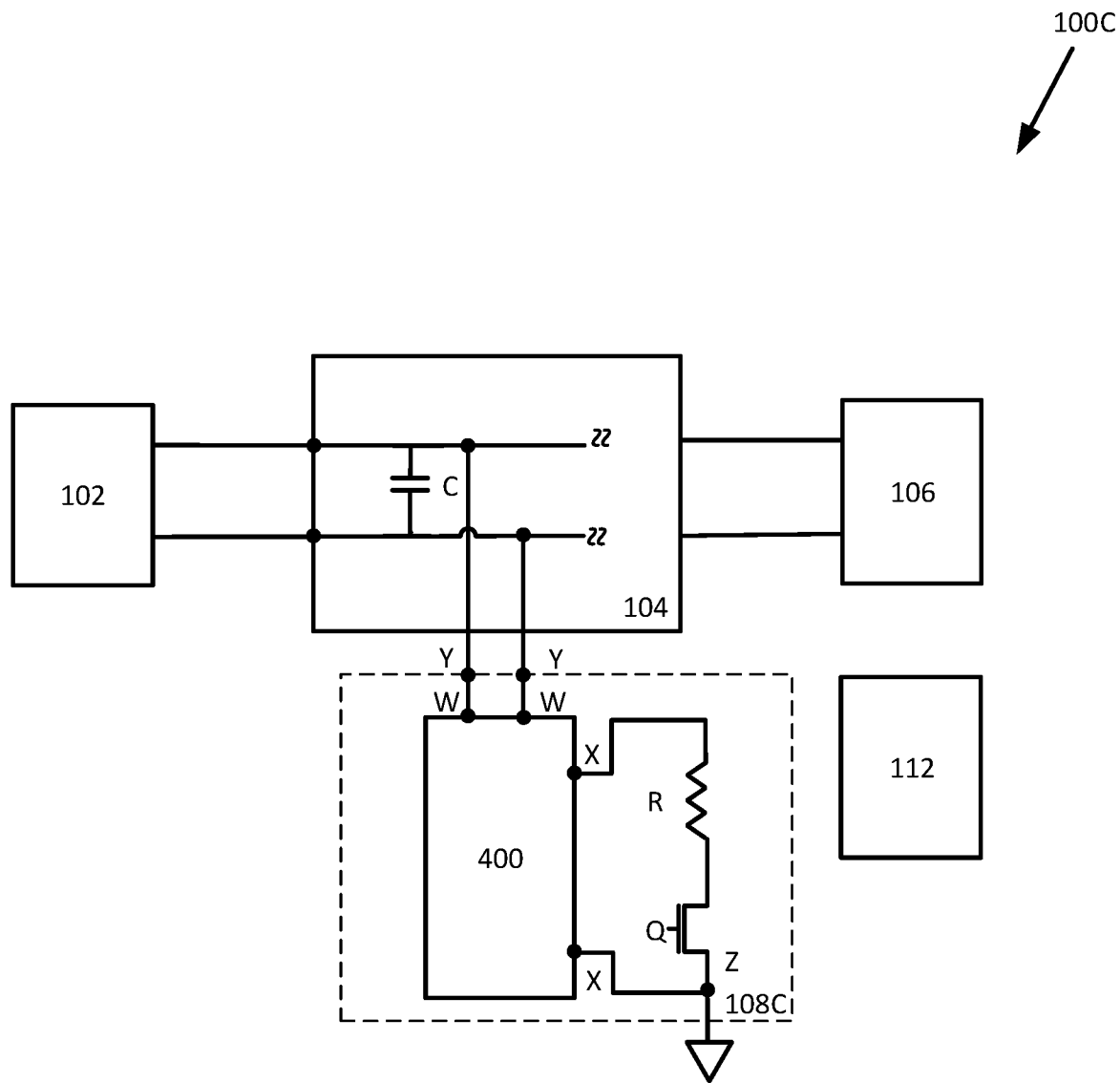
FIG. 4 illustrates a power system, in accordance with certain examples of the presently disclosed subject matter.

Discharge circuitry 108 may include one or more inputs and one or more outputs (e.g., one or more input terminals Y and one or more output terminals Z, and/or one or more input terminals W and one or more output terminals X illustrated for example in FIG. 4, illustration of the input terminals and output terminals may be omitted in other figures for the sake of simplicity).

Discharge circuitry 108 may be connected across an element to be discharged (e.g., across one or more capacitor C of system power device 104). This may be the case in all of the figures, although it is not illustrated throughout the figures for the sake of simplicity. Other arrangements of discharge circuitry 108 may also be possible, for discharge circuitry 108 to discharge the element to be discharged.

Discharge circuitry may be connected to an earth potential/ground potential. The earth potential/ground potential may be a virtual/local earth potential/ground potential (as opposed to being electrically connected to the actual earth/ground). The threshold for discharge may be a voltage that is a floating voltage relative to the actual earth/ground potential. The threshold for discharge may be a voltage that is relative to one or more elements of the power system (e.g. system power device 104).

In some examples, an input voltage may be discharged by transferring input charge to one or more internal storage capacitors C of system power device 104. Transfer of charge may be, for example, at about a constant current value. In this manner, where permitted by regulations, excess input voltage may be stored for future use in a non-dangerous manner and need not be dissipated.

Indication/control of the discharge circuitry 108 may be facilitated by one or more controllers 112. The one or more controllers 112 may be part of one or more other elements of the power system 100*a* (e.g., system power device 104, and/or discharge circuitry 108). The one or more controllers 112 may alternatively and/or additionally be separate external elements of the power system 100*a* (e.g., external to system power device 104 and/or external to discharge circuitry 108). As mentioned above, the one or more controllers may include digital controllers and/or analog controllers. The one or more controllers 112 may be configured to control one or more switches in the power system 100*a*. The one or more controllers 112 may be configured to operate the discharge circuitry 108 to discharge an input voltage. The one or more controllers 112 may be configured to regulate an output voltage of the discharge circuitry 108. The one or more controllers 112 may be configured to regulate the output voltage to about a constant value (e.g., for at least one phase or period of time of discharging the input voltage). The one or more controllers 112 may be configured to regulate an output current of the discharge circuitry 108 to about a constant current value (e.g., for at least one phase of discharge). The one or more controllers 112 may be configured to regulate an output power of the discharge circuitry 108 to about a constant power value for at least one phase of discharge.

Power system 100*a* may include a plurality of controllers (not shown), and one or more of those controllers may be designated as a master controller/central controller 112. In some cases, the central controller 112 may be the master controller. In some examples, each power device 110 may have its own controller with or without an external central controller, and one or more of those internal controllers may be designated as a master controller. FIG. 1A illustrates controller 112 as a central controller external to system power device(s) 104, discharge circuitry 108. FIG. 1D illustrates controller 112 as a central controller external to the power device(s) 110. In some cases, one or more controllers may be included in power device(s) 110, system power device(s) 104, and/or discharge circuitry 118 and one or more of the internal controllers may be designated as a central controller/master controller. As an example, the functionality of central controller 112 may be included in one or more controllers included as part of power device(s) 110 and system power device(s) 104. For example, power device(s) 110 (FIG. 1E) may have a plurality of controllers, and one or more of those controllers may be designated as a master controller which provides instructions/indications/signals to one or more other controllers.

The one or more controllers 112 of power system 100*a* may be configured to receive and/or transmit instructions as signals/instructions/indications/commands to and/or from one or more other elements of the power system. As mentioned above, one or more controllers may include one or more processors/processing circuits and memory configured to access data and make determinations/calculations/computations.

For the sake of simplicity, the connections between controller 112 and the other elements of power system 100*a* (e.g., system power devices 104, discharge circuitry 104, one or more sensors [not shown], etc.) are not illustrated in FIG. 1. It will be appreciated that in some examples power device(s) 110, system power device(s) 104, discharge circuitry 108, and/or one or more sensor(s), may be communicatively and/or operably connected to one or more controller 112. For example, one or more sensor(s) may provide data to controller 112.

The one or more sensor(s) may be configured to obtain one or more parameter/parameter data related to power system 100a. This one or more parameter may be an electrical parameter, for example: current, voltage, power, etc.

Discharge circuitry 108 and/or one or more controllers 112 may be configured to control the discharge of the discharge circuitry 108. For example, discharge circuitry 108 and/or one or more controllers 112 may be configured to control the output/discharge power/voltage/current (e.g., based on the input). Discharge circuitry 108 and/or one or more controllers 112 may be configured to control the output power/voltage/current at an output of the discharge circuitry 108, so that there is a relatively or substantially constant discharge power/voltage/current value. For example, the voltage value across the capacitor C may be monitored (e.g., by the controllers 112). If the controllers 112 determine that the monitored voltage exceeds a threshold, then the controllers 112 may control the discharge circuitry 108 to perform the discharge so that voltage value across the capacitor C may be reduced. The discharge circuitry 108 may also be configured to perform a relatively quick discharge (e.g., according to a certain time threshold/range of time, for example, about 10 seconds, about 20 seconds, or about 30 seconds).

Discharge circuitry 108 may include one or more power devices (e.g., converters, DC-DC converters, etc.) to help control discharge.

Discharge circuitry 108 may be internal (e.g., part of or connected to) or external to system power device 104.

Discharge circuitry 108 and/or one or more controllers 112 may be configured to control/regulate discharge so that there is a constant or non-constant discharge. For example, one or more controllers 112 may be configured to operate discharge circuitry 108 to speed up discharge (e.g., by increasing discharge current) so that there is an increase in discharge power (e.g., an upward sloping linear discharge power and/or an upward sloping exponential discharge power) and/or provide a discharge so that there is a decrease in discharge power (e.g., a downward sloping linear discharge power and/or a downward sloping exponential discharge power). As an example, discharge circuitry may be configured to perform discharge together with a linear load and/or a non-linear load.

Discharge circuitry 108 may include one or more power converters that is either part of or external to system power device (e.g., one or more of a DC to AC converter, DC to DC converter, etc.).

Figure 1B:
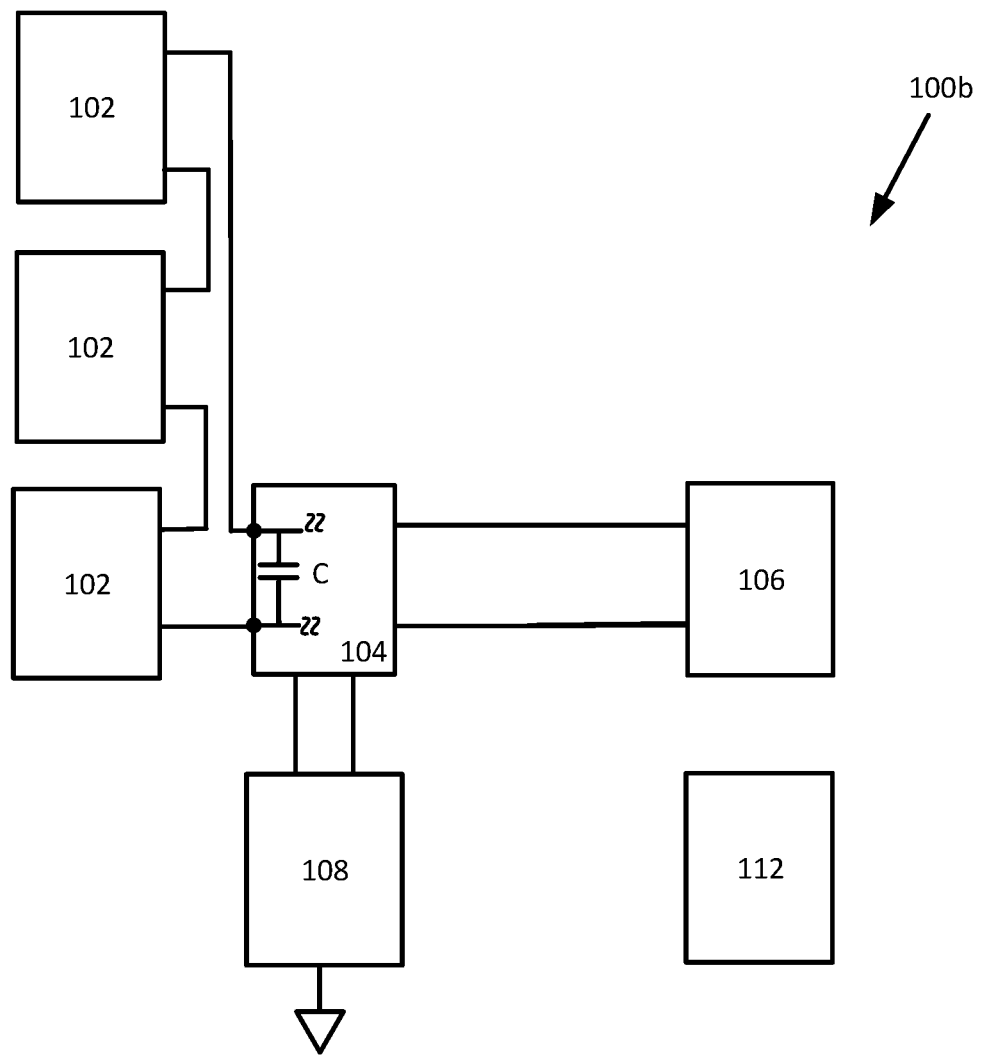
FIG. 1B illustrates a power system, in accordance with certain examples of the presently disclosed subject matter.

FIG. 1B illustrates a power system 100b according to examples of the present subject matter. Power system 100b may be similar to power system 100a, and include a plurality of power sources 102 connected in a series string connection. Even though FIG. 1B shows three power sources 102, any appropriate number of power sources 102 may be connected in the series string connection.

Figure 1C:
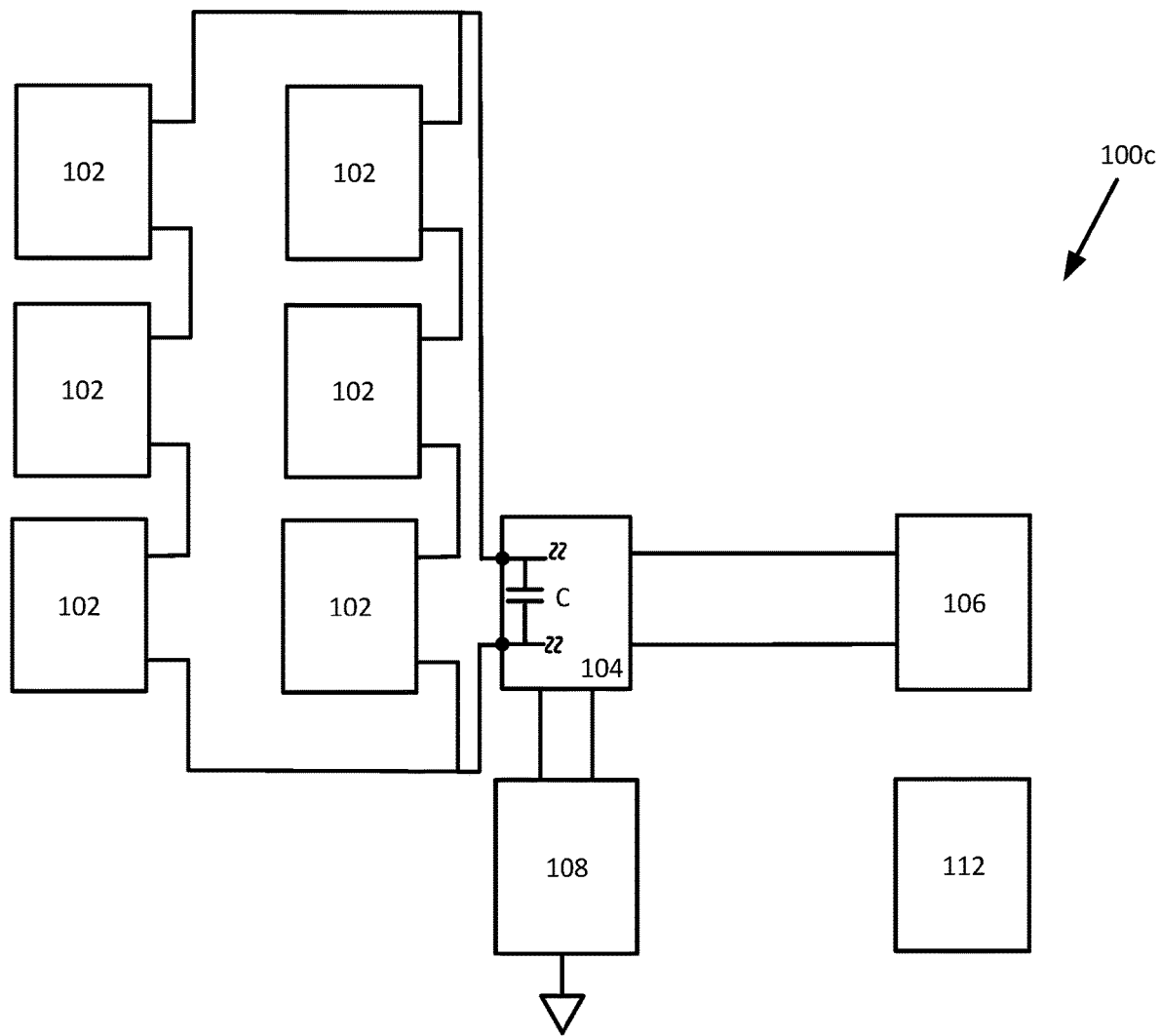
FIG. 1C illustrates a power system, in accordance with certain examples of the presently disclosed subject matter.
Figure 1D:
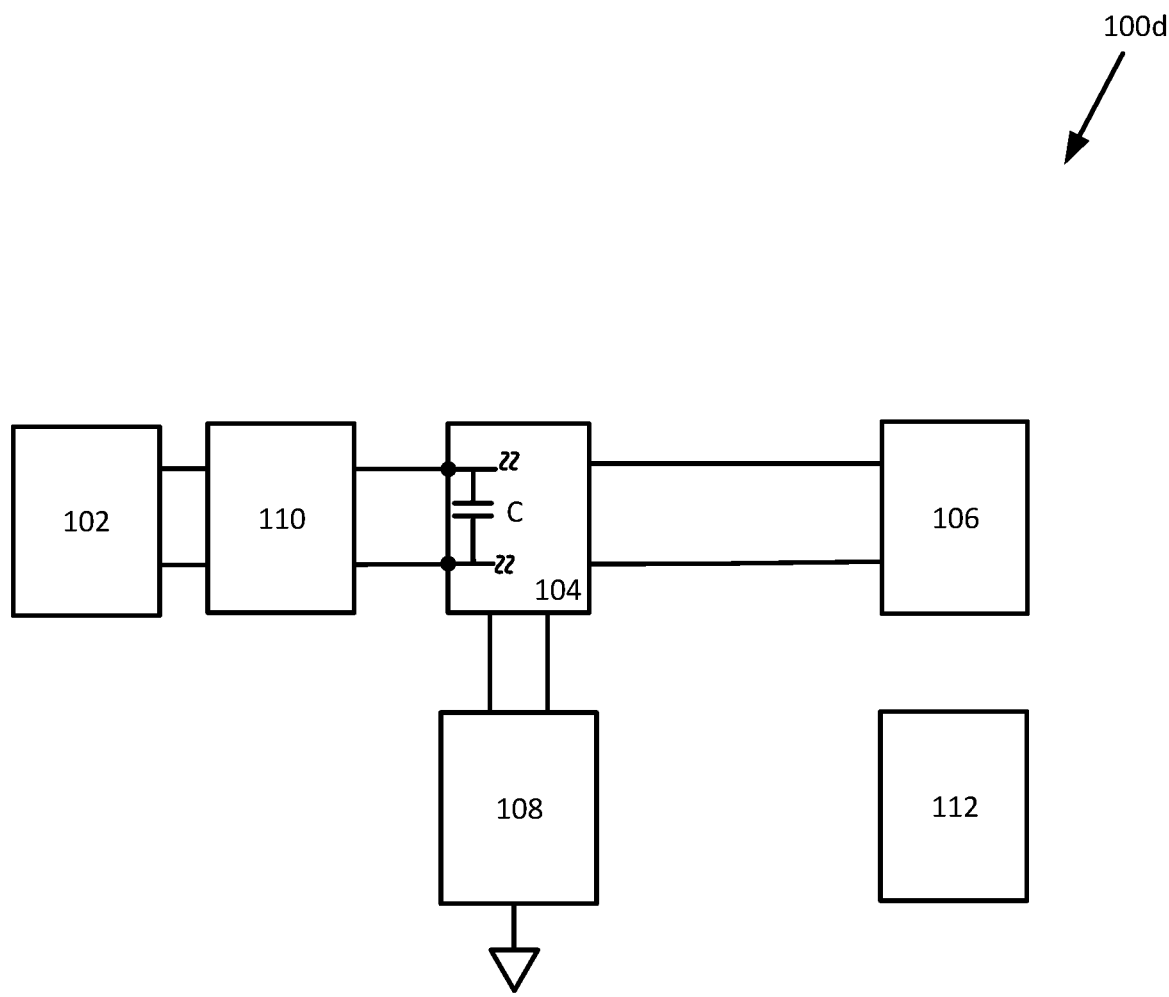
FIG. 1D illustrates a power system, in accordance with certain examples of the presently disclosed subject matter.

FIG. 1C illustrates a power system 100c according to examples of the present subject matter. Power system 100c may be similar to power systems 100a/100b, and include a plurality of strings of power sources 102. The plurality of strings may be connected in parallel to the system power devices 104. Even though FIG. 1C shows two strings, any appropriate number of strings may be connected in parallel to the system power devices 104.

Alternatively, power system 100c may include other combinations of series and/or parallel connections.

FIG. 1D illustrates a power system 100d according to examples of the present subject matter. Power system 100d may be similar to power systems 100a/100b/100c. Power source 102 may include or be connected to one or more power devices 110. The power device(s) 110 may be, for example, one or more: DC to DC converter(s) (e.g., buck converters, boost converters, buck/boost converters, buck+ boost converters, isolating converters, flyback converters, forward converters, etc.), DC to AC converter(s)/inverters, micro-inverter(s), etc.

Figure 1E:
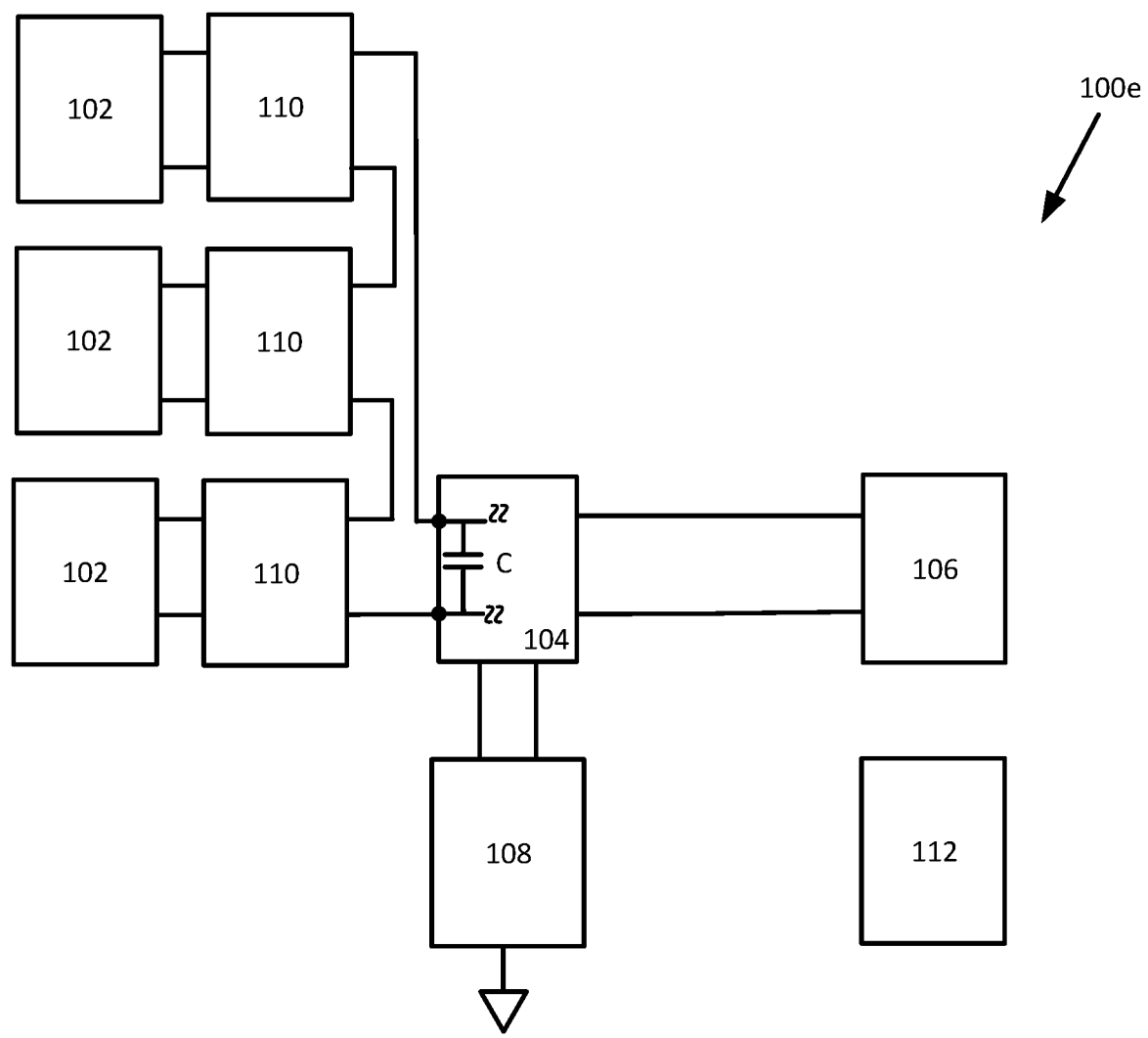
FIG. 1E illustrates a power system, in accordance with certain examples of the presently disclosed subject matter.

FIG. 1E illustrates a power system 100e according to examples of the present subject matter. Power system 100e may be similar to power systems 100a/100b/100c/100d, and include a plurality of power sources 102 with their respective power devices 110 connected in a series string connection. Even though FIG. 1E shows three power sources 102 with their respective power devices 110, any appropriate number of power sources 102 with their respective power devices 110 may be connected in the series string connection.

Figure 1F:
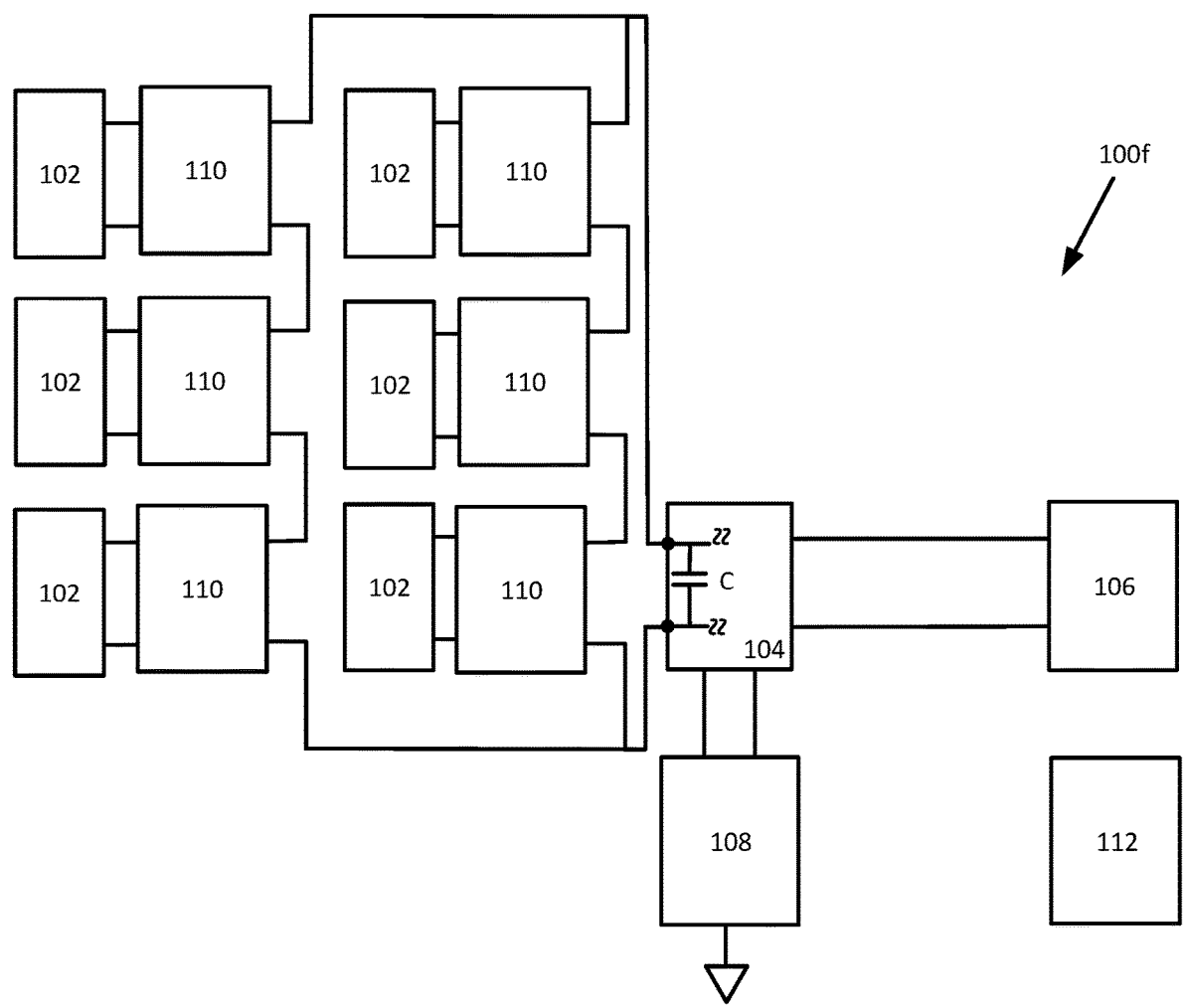
FIG. 1F illustrates a power system, in accordance with certain examples of the presently disclosed subject matter.

FIG. 1F illustrates a power system 100f according to examples of the present subject matter. Power system 100f may be similar to power systems 100a/100b/100c/100d/ 100e and include a plurality of strings of power sources 102 with their respective power devices 110. The plurality of strings may be connected in parallel to the system power devices 104. Even though FIG. 1F shows two strings of power sources 102 with their respective power devices 110, any appropriate number of strings of power sources 102 with their respective power devices 110 may be connected in parallel to the system power devices 104.

Alternatively, power system 100f may include other combinations of series and/or parallel connections of power sources 102 and power devices 110.

Figure 1G:
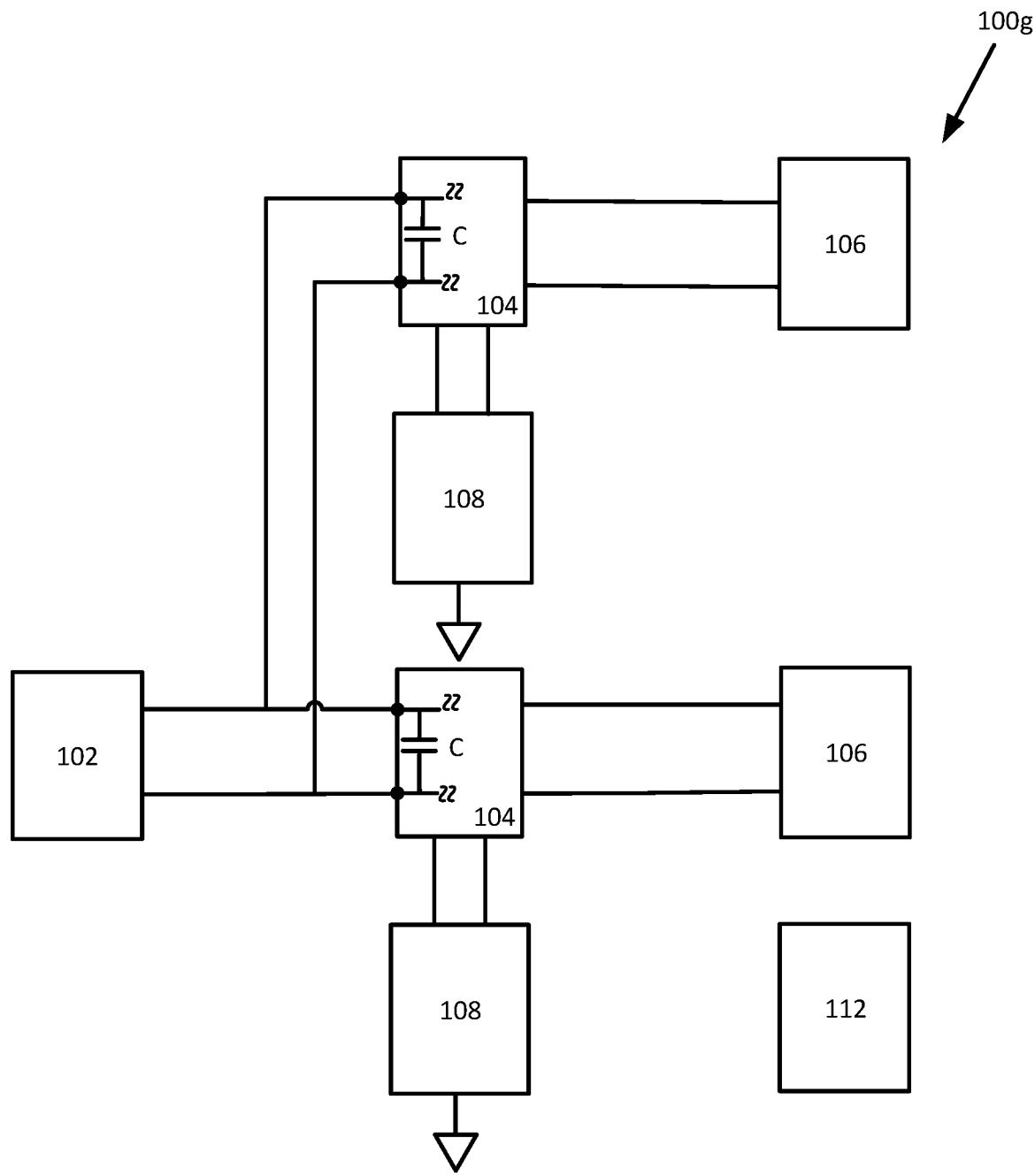
FIG. 1G illustrates a power system, in accordance with certain examples of the presently disclosed subject matter.

FIG. 1G illustrates a power system 100g according to examples of the present subject matter. Power system 100g may be similar to power systems 100a/100b/100c/100d/ 100e/100f and may include a plurality of system power devices 104 with their respective discharge circuitries 108. In some examples, a singular discharge circuitry 108 may be configured to operate and provide discharge for a plurality of system power devices 104. The plurality of system power devices 104 may be connected in parallel to the power sources 102. In the example of FIG. 1G each system power device 104 may be connected to a respective load 106. Even though FIG. 1G shows two system power devices 104, any appropriate number of system power devices 104 may be connected in parallel to the power sources 102.

Connecting a plurality of system power devices 104 (e.g., DC to AC converters/inverters) in parallel at the output of a power source 102 (e.g., on the "DC side" of the inverters) may help with combined discharge of the plurality of system power devices 104 (e.g., with or without disconnect—i.e., the system power devices 104 may be configured to perform discharge at substantially the same time or separately from one another, for example, without disconnect—discharge of one system power device 104 may cause the discharge of another system power devices 104 [e.g., if the system power devices 104 are synchronized with one another, and the system power devices 104 share input capacitance and voltage while discharging, and discharge of one of the system power devices 104 results in the discharge of the other system power device 104, since they are not configured to disconnect from one another], or, with disconnect—discharge of one system power device 104 might not cause the discharge of another system power devices 104 [e.g., if the system power devices 104 are not necessarily synchronized with one another, the system power devices 104 are configured for separate discharge, and discharge of one system power device 104 might not result in discharge of the other system power device 104, since a discharging system power device may be configured to disconnect from other system power devices prior to beginning discharge]). For example, discharge/disconnect of one system power device 104 may be determined based on an indication related to discharge/disconnect of one system power device 104. Disconnect may include disconnect of one system power device 104 from one or more other elements of the power system (e.g., power source 102, load 106, power device 110, etc.).

Alternatively, power system 100g may include other combinations of series and/or parallel connections of power sources 102, power devices 110, system power devices 104, and loads 106.

Figure 1H:
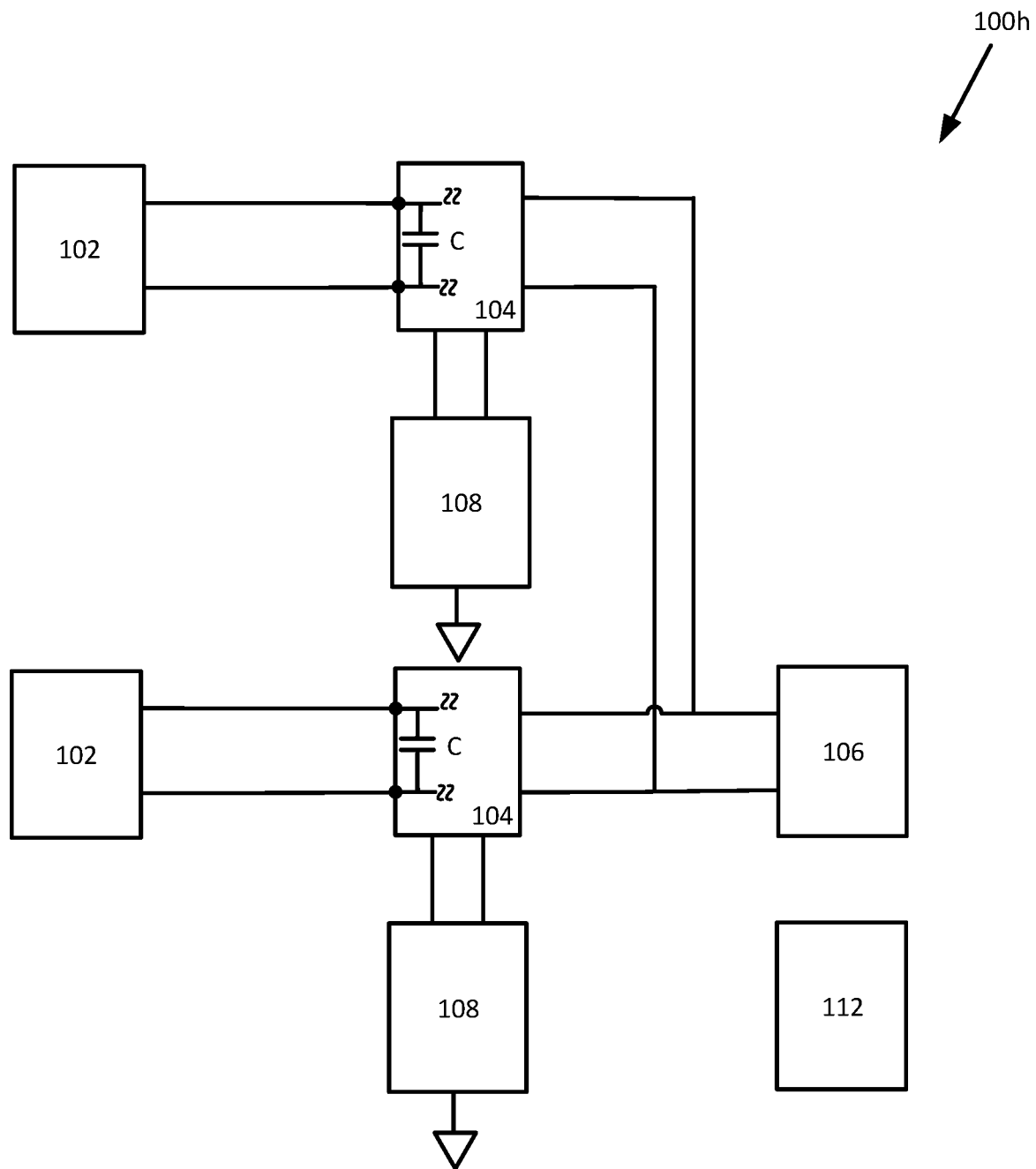
FIG. 1H illustrates a power system, in accordance with certain examples of the presently disclosed subject matter.

FIG. 1H illustrates a power system 100h according to examples of the present subject matter. Power system 100h may be similar to power systems 100a/100b/100c/100d/100e/100g/100h and includes a plurality of system power devices 104 with their respective discharge circuitries 108. In some examples, a singular discharge circuitry 108 may be configured to operate and provide discharge for a plurality of system power devices 104. The plurality of system power devices 104 may be connected in parallel to the load 106. In the example of FIG. 1H each system power device 104 may be connected to a respective power source 102. Even though FIG. 1H shows two system power devices 104, any appropriate number of system power devices 104 may be connected in parallel to the load 106.

Connecting a plurality of system power devices 104 (e.g., DC to AC converters/inverters) in parallel at the input to a load 106 (e.g., on the "AC side" of the inverters) may help with the initiation of the plurality of system power devices 104 (e.g., when the plurality of system power devices 104 begin to operate/operate in a "wake-up" mode of operation).

Alternatively, power system 100h may include other combinations of series and/or parallel connections of power sources 102, power devices 110, system power devices 104, and loads 106.

The descriptions that follow regarding the various power systems 100A-100K illustrated in FIGS. 2-11 may include the different power systems 100a-100h described above with reference to FIGS. 1A-1H. The illustrations of the various power systems 100A-100K in FIGS. 2-11 depict a single power source 102 and no power device 110 for the sake of simplicity. As mentioned above, in some cases one or more power source 102 and one or more power device 110 may be combined into a single unit with combined functionalities.

Figure 2:
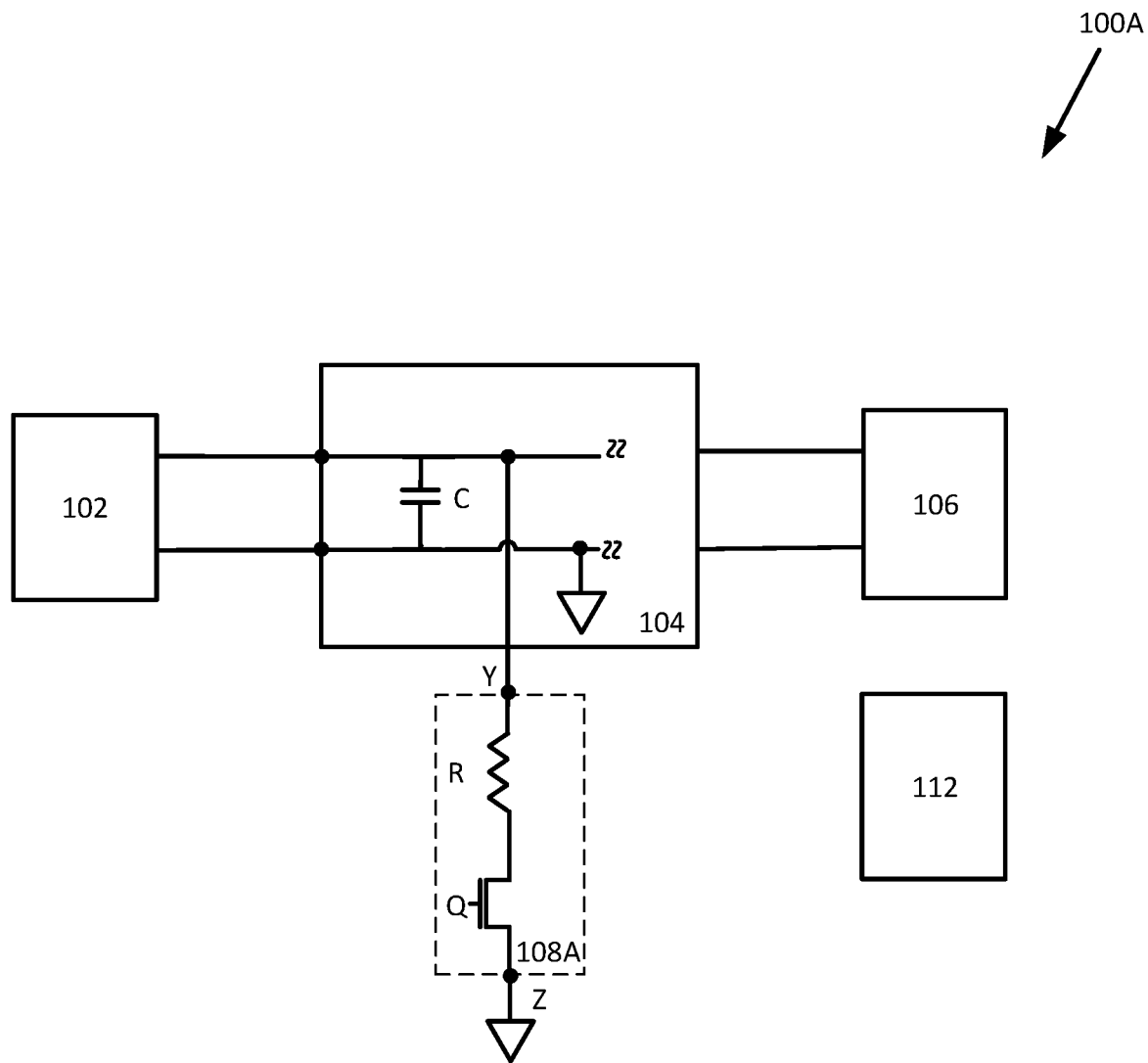
FIG. 2 illustrates a power system, in accordance with certain examples of the presently disclosed subject matter.

FIG. 2 illustrates a power system 100A according to examples of the present subject matter. Power system 100A includes discharge circuitry 108A. Discharge circuitry 108A may include at least one resistor R and at least one switch Q. For example, if the controllers 112 determine that a voltage across the capacitor C exceeds a threshold, then the controllers 112 may turn on (e.g., close) the switch Q to allow the discharge circuitry 108 to discharge the voltage. During the discharge, the controllers 112 may continue to monitor the voltage across the capacitor C and determine that the voltage no longer exceeds the threshold. The controllers 112 may then turn off (e.g., open) the switch Q to end the discharge. Accordingly, the voltage across the capacitor C may be maintained below the threshold. As an example, switch Q may be configured to be operational (e.g., to be on, for example, in a closed state) while the discharge circuitry 108 is in a discharge mode performing discharge, and non-operational (e.g., to be off, for example, in an open state) while the discharge circuitry 108 is not in a discharge mode performing discharge. For example, switch Q may be turned on when discharge is required (e.g., based on one or more determination whether discharge should be performed) and shut off when discharge is not required (e.g., based on one or more determination that discharge has been performed/completed).

Switch Q may be, for example, one or more: FET, MOSFET, BJT, insulated-gate bipolar transistor (IGBT), etc.

Switch Q is illustrated in FIG. 2 as a MOSFET.

Figure 3:
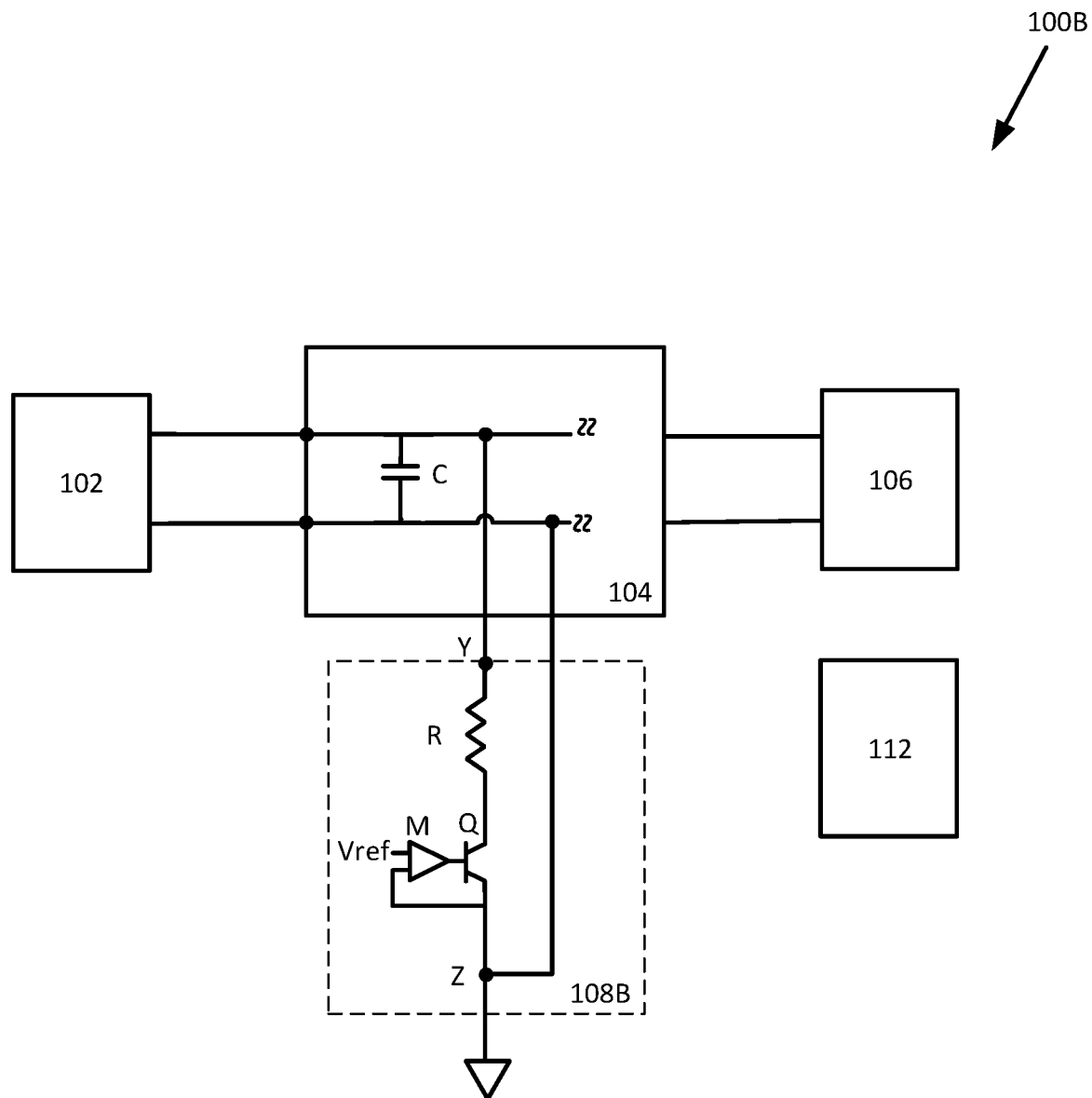
FIG. 3 illustrates a power system, in accordance with certain examples of the presently disclosed subject matter.

FIG. 3 illustrates a power system 100B according to examples of the present subject matter. Power system 100B may include discharge circuitry 108B. Discharge circuitry 108B may include at least one resistor R, at least one switch Q, and at least one comparator M. The comparator M may be configured to control the discharge and ensure a substantially constant discharge current flowing through discharge circuitry 108B. As mentioned above, switch Q may be configured to be operational (e.g., to be on, for example, in a closed state) while the discharge circuitry 108 is in a discharge mode performing discharge, and non-operational (e.g., to be off, for example, in an open state) while the discharge circuitry 108 is not in a discharge mode performing discharge. For example, switch Q may be turned on when discharge is required (e.g., based on one or more determination whether discharge should be performed) and shut off when discharge is not required (e.g., based on one or more determination that discharge has been performed/completed).

Switch Q is illustrated in FIG. 3 as a BJT.

FIG. 4 illustrates a power system 100C according to examples of the present subject matter. Power system 100C may include discharge circuitry 108C. Discharge circuitry 108C may include at least one resistor R, at least one switch Q, and at least one power device 400.

Discharge circuitry 108C may include at least one discharge path. The at least one discharge path may be connected to the power device 400. The at least one discharge path may include at least one discharge resistor R and at least one switch Q. As mentioned above, switch Q may be configured to be operational (e.g., to be on, for example, in a closed state) while the discharge circuitry 108 is in a discharge mode performing discharge, and non-operational (e.g., to be off, for example, in an open state) while the discharge circuitry 108 is not in a discharge mode performing discharge. For example, switch Q may be turned on when discharge is required (e.g., based on one or more determination whether discharge should be performed) and shut off when discharge is not required (e.g., based on one or more determination that discharge has been performed/completed).

Power device(s) 400 may be, for example, one or more: DC to DC converter(s) (e.g., buck converters, boost converters, buck/boost converters, buck+boost converters, isolating converters, flyback converters, forward converters, etc.), DC to AC converter(s)/inverter(s), micro-inverter(s), etc.

Power device 400 may include one or more inputs and one or more outputs (e.g., one or more input terminals W and one or more output terminals X).

Power device 400 may be dedicated to discharge (which will be described below).

Power device 400 may have other functions/modes of operation aside from discharge (e.g., power conversion in/for system power device 104).

Power device 400 may be an auxiliary power converter and/or a main dedicated power converter. For example, an auxiliary power converter may be a power converter configured to provide power to one or more elements of the power system that are not the main load (e.g., one or more elements of the power system that are not the electrical grid, for example, one or more logic circuits, one or more gate control circuits, one or more controllers, one or more discharge circuits, etc.).

Power device 400 may function as a power stage/power train (e.g., a DC to AC power converter, or a DC to DC power converter) that is part of system power device 104 (e.g., an inverter).

For example, power device 400 may function as a power stage/power train (e.g., a DC to AC power converter, or a DC to DC power converter) in the system power device 104 and/or be configure/provide/use a dedicated DC to DC discharge converter dedicated just for discharge, and not other functions.

For example, a power stage/power train may be a power converter configured to provide power to the main load of the power system (e.g., an electrical grid, one or more motors, one or more storage devices, etc.).

Discharge circuitry 108C may include multiple power devices 400.

Discharge circuitry 108C may also include multiple power devices 400 of different types, for example: dedicated, non-dedicated, auxiliary, main, etc.

Discharge circuitry 108C may use at least one power device 400($s$), and other discharge circuitry (e.g., other discharge circuitry that does or does not include a power device, for example, that is configured to be operated at the same time, or one after the other).

For example, the power system/one or more controller may be configured to switch/tap different discharge circuitry at different stages/phases of the discharge process, and/or may be configured to switch/tap between different discharge circuitry after a certain threshold. The operation of different circuitry for different stages/phases may constitute different modes of operation of the power system/discharge circuitry.

For example, discharge circuitry/power device 400 may be configured to control discharge with a first discharge circuitry in a first mode during a first discharge phase (e.g., with a power device that provides a relatively constant discharge power/voltage/current) until a certain threshold is reached (e.g., from a first power/voltage value to a second power/voltage value) and then use different second discharge circuitry in a second mode during a second discharge phase (e.g., with a switch/transistor and a resistor that provides a relatively linear or exponential discharge) to finish off the discharge (e.g., from the second power/voltage value to a third power/voltage value).

Switch Q is illustrated in FIG. 4 as a MOSFET.

One or more controllers 112 may be configured to control the discharge by controlling one or more parameters related to the operation of discharge circuitry/power device 400. The one or more parameters related to the operation of discharge circuitry/power device 400 that may controllable by one or more controllers 112 may be, for example: duty cycle, frequency, current, voltage, etc. For example, the controllers 112 may control the voltage or current output of the discharge circuitry/power device 400 (e.g., the voltage or current at the terminals X of the discharge circuitry/power device 400) to be at a substantially constant value, and thus may maintain the discharge voltage or current of the discharge circuitry 108C at a substantially constant value. As an example, the controllers 112 may be configured to control the voltage or current output of the discharge circuitry/power device 400 by controlling the duty cycle of one or more switches (e.g., switch Q and/or one or more switches that are part of power device 400). Controlling the frequency that one or more of the switches are turned on and turned off may affect the output of the discharge circuitry/power device 400, which may be done to control the output of the discharge circuitry/power device 400 (e.g., to maintain the discharge voltage or current of the discharge circuitry 108C at a substantially constant value). As another example, the controller 112 may control a switch by turning the switch only partially to the on state, resulting in a large switch resistance and a slower discharge (at lower current) than what would be achieved by fully turning the switch on.

Figure 5:
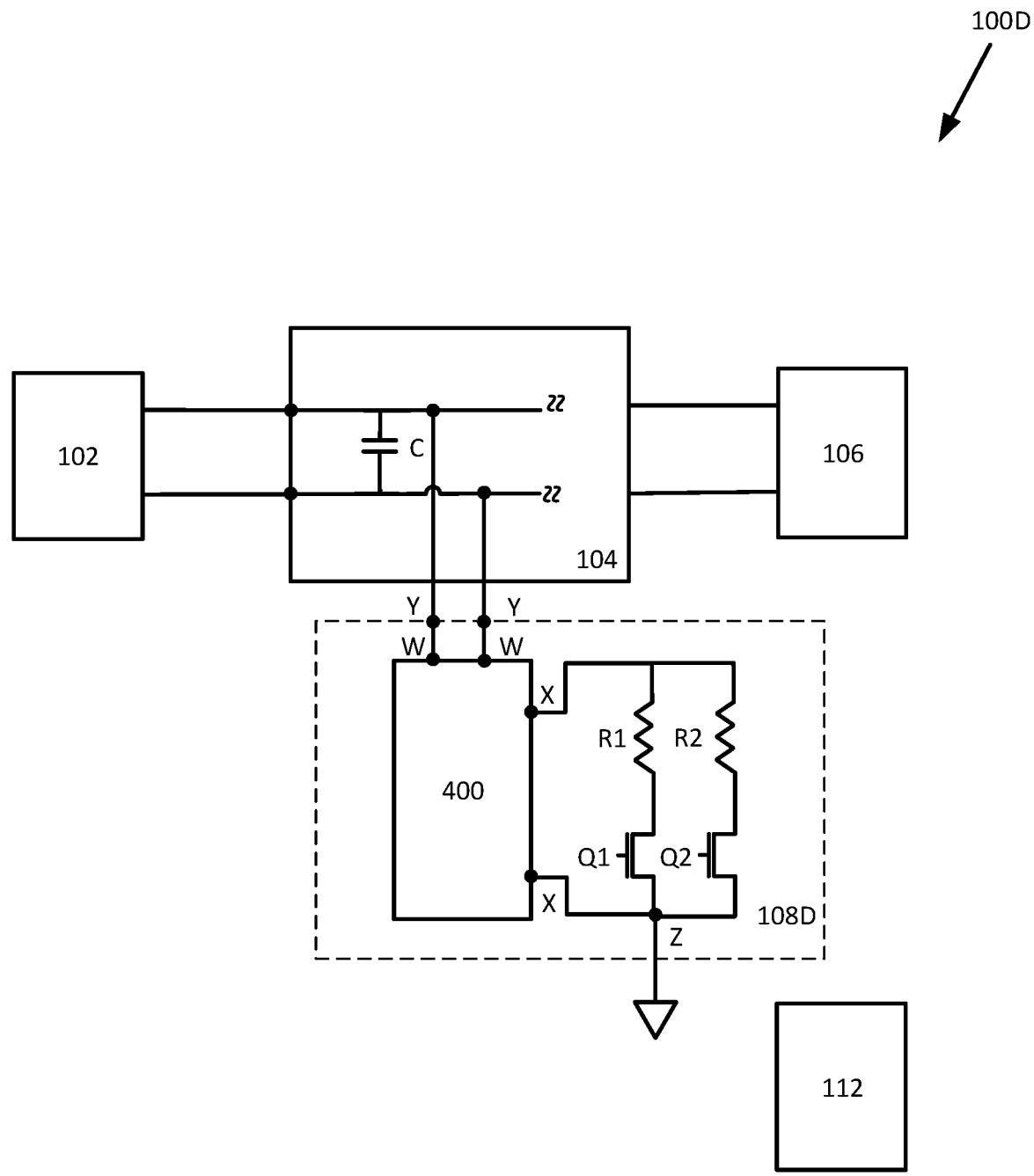
FIG. 5 illustrates a power system, in accordance with certain examples of the presently disclosed subject matter.

FIG. 5 illustrates a power system 100D according to examples of the present subject matter. Power system 100D includes discharge circuitry 108D. Discharge circuitry 108D may include a plurality of resistors R1, R2, a plurality of switches Q1, Q2, and at least one power device 400. As mentioned above, switches Q1, Q2 may be configured to be operational (e.g., to be on, for example, in a closed state) while the discharge circuitry 108 is in a discharge mode performing discharge, and non-operational (e.g., to be off, for example, in an open state) while the discharge circuitry 108 is not in a discharge mode performing discharge. For example, switches Q1, Q2 may be turned on when discharge is required (e.g., based on one or more determination whether discharge should be performed) and shut off when discharge is not required (e.g., based on one or more determination that discharge has been performed/completed).

Switches Q1, Q2 are illustrated in FIG. 5 as MOSFETs.

Discharge circuitry 108D may include at least two discharge paths. The at least two discharge paths may be connected to the power device 400. A first discharge path may include at least one first resistor R1 and at least one first switch Q1. The at least one first resistor R1 and the at least one first switch Q1 may be connected in series. A second discharge path may include at least one second resistor R2 and at least one second switch Q2. The at least one second resistor R2 and the at least one second switch Q2 may be connected in series.

The first discharge path may be in parallel to the second discharge path. The at least one first resistor R1 and at least one first switch Q1 may be connected in parallel to the at least one second resistor R2 and at least one second switch Q2.

As mentioned above, power system 100D may include one or more sensors (not shown).

The one or more sensor(s) may sense one or more parameters related to the power device 400 (e.g., related to the input of the power device, related to the output of the power device, etc.).

The discharge circuitry and/or a controller configured to operate the discharge circuitry may be configured with different modes corresponding to different phases/stages of discharge/operation. The discharge circuitry and/or a controller configured to operate the discharge circuitry may be configured to switch modes in response to/based on different thresholds (e.g., related to one or more sensed parameter, for example, a sensed voltage at the output of power device 400, or according to an elapsed period of time).

For example, a controller configured to operate the discharge circuitry may be configured to operate the discharge circuitry in a first mode of discharge during a first phase/stage, the first mode using both the first discharge path and the second discharge path substantially simultaneously, and to operate in a second mode of discharge during a second phase/stage, the second mode using just the first discharge path and not the second discharge path.

Power system/discharge circuitry (e.g., discharge circuitry 108D) may include one or more additional discharge circuitry/one or more additional discharge path(s) (e.g., discharge circuitry 108A).

The additional discharge circuitry/additional discharge path(s) may be in one or more elements of the power system (e.g., in system power device 104, for example, connected before the input to the power device 400, and/or after the output of the power device 400).

The additional discharge circuitry/additional discharge path(s) may be an external element.

The additional discharge circuitry/additional discharge path(s) may be connected in parallel to the first discharge circuitry.

The additional discharge circuitry/additional discharge path(s) may be faster than the first discharge circuitry/discharge path(s). But, the additional discharge circuitry/additional discharge path(s) may also be potentially less stable than the first discharge circuitry/discharge path(s) in some circumstances, e.g., the additional discharge circuitry/additional discharge path(s) may be configured to discharge a relatively greater amount of discharge power/voltage in a relatively shorter time.

Different modes of operation including different discharge circuitry/discharge paths may be switched to during different phases/stages of discharge/operation (e.g., in response to/based on different thresholds, for example, voltage at the output of power device 400).

For example, during a first discharge phase/stage/period of time the a controller configured to operate the discharge circuitry may be configured to use first circuitry and second circuitry (or just the first circuitry), and during a second discharge phase/stage/period of time the discharge circuitry may be configured to use just the second circuitry and not the first circuitry (which may be provide a faster discharge, thereby potentially increasing safety by rapidly reducing a potentially dangerous voltage, but at a potentially greater risk, which might be mitigated by the amount of input power/voltage in the second phase/stage being lesser than the amount of input power/voltage in the first phase/stage).

For example: in a first mode/phase/stage and/or for a first period of time, use both first circuitry and second circuitry, and in a second mode/phase/stage and/or for a second period of time use just first circuitry and not second circuitry.

For example: in a first mode/phase/stage and/or for a first period of time, use just first circuitry and not second circuitry, and in second mode/phase/stage and/or for a second period of time, use just second circuitry and not first circuitry.

For example: in a first mode/phase/stage and/or for a first period of time, use just first circuitry and not second circuitry, in a second mode/phase/stage and/or for a second period of time, use both first circuitry and second circuitry.

For example: in a first mode/phase/stage and/or for a first period of time, use just first circuitry and not second circuitry and use first and second paths, in a second mode/phase/stage and/or for a second period of time, use just first circuitry and not second circuitry and use just first path and not second path, in a third mode/phase/stage and/or for a third period of time, use just second circuitry and not first circuitry.

For example: in a first mode/phase/stage and/or for a first period of time, use both first circuitry and second circuitry, in a second mode/phase/stage and/or for a second period of time, use both first circuitry and third circuitry and not second circuitry, in a third mode/phase/stage and/or for a third period of time, use just first circuitry and not second circuitry and not third circuitry.

Figure 6:
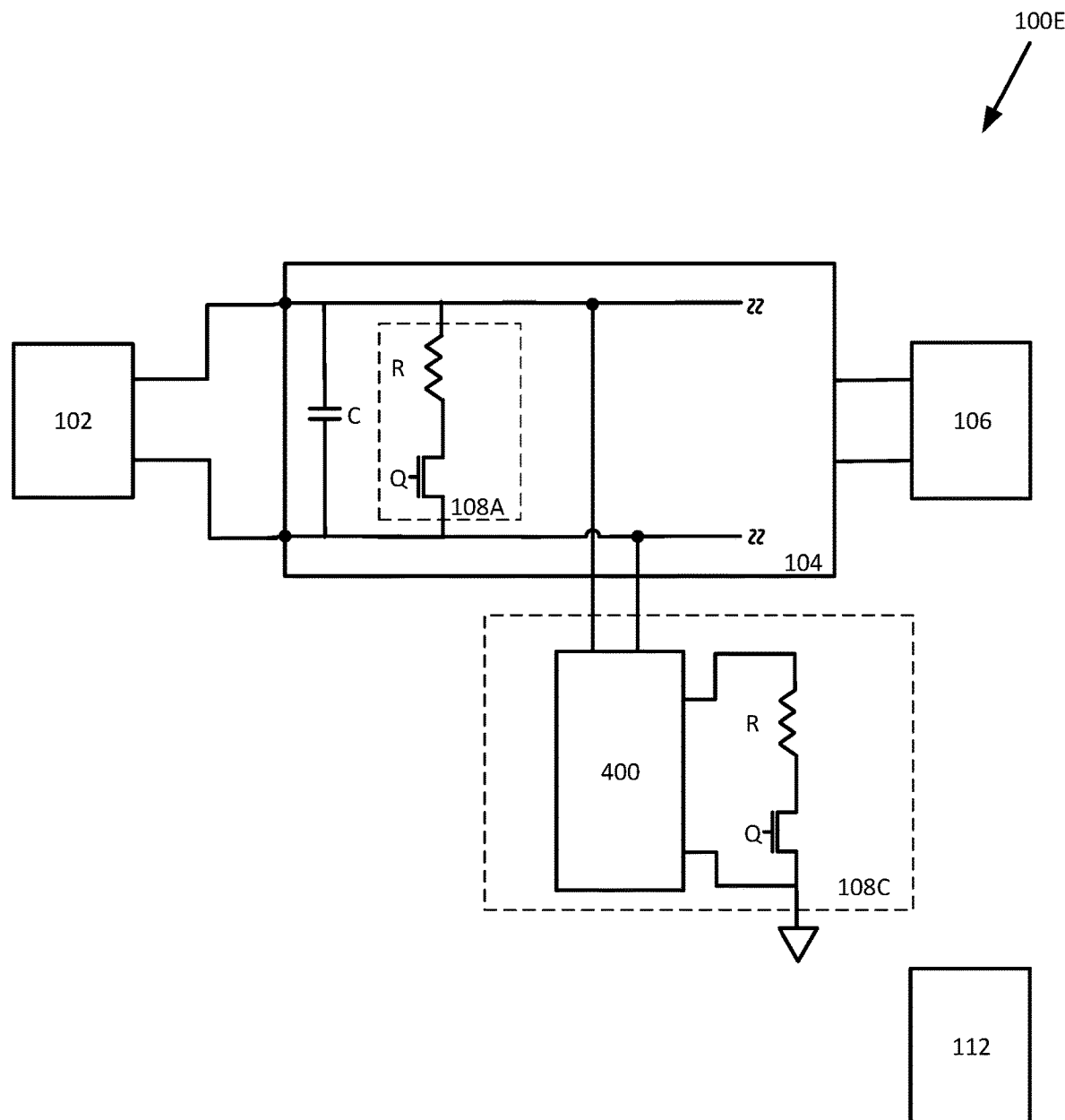
FIG. 6 illustrates a power system, in accordance with certain examples of the presently disclosed subject matter.

FIG. 6 illustrates a power system 100E according to examples of the present subject matter. Power system 100E may include discharge circuitry 108A and discharge circuitry 108C. Discharge circuitry 108A may be included in system power device 104. Discharge circuitry 108A and discharge circuitry 108C may operate simultaneously and/or in turns. For example, in both a first phase of discharge and a second phase of discharge both discharge circuitry 108A and discharge circuitry 108C may both be configured to be operational and provide discharge. Alternatively, in a first phase of discharge both discharge circuitry 108A and discharge circuitry 108C may both be configured to be operational and provide discharge, and in a second phase of discharge just discharge circuitry 108A or discharge circuitry 108C may be configured to be operational and provide discharge, while the other discharge circuitry is turned off/not operational to provide discharge. Or, in a first phase of discharge just discharge circuitry 108A or discharge circuitry 108C may be configured to be operational and provide discharge, while the other discharge circuitry is turned off/not operational to provide discharge, and in a second phase of discharge both discharge circuitry 108A and discharge circuitry 108C may both be configured to be operational and provide discharge. Further alternatively, in a first phase of discharge either discharge circuitry 108A or discharge circuitry 108C may be configured to be operational and provide discharge (e.g., when either just a linear discharge or just a constant discharge is desired, and/or when either just a direct discharge [not including the use of a power device] or just a controlled conversion discharge [including the use of a power device] is desired) while the other discharge circuitry is turned off/not operational to provide discharge, and in a second phase of discharge the other discharge circuitry may be configured to be operational and provide discharge (e.g., when another type of discharge, for example, constant discharge or linear discharge, and/or, controlled conversion discharge or direct [non-controlled conversion] discharge, is desired), while the discharge circuitry that was operational to provide discharge during the first phase of discharge is turned off/not operational to provide discharge in the second phase of discharge. In some examples, other discharge circuitry (e.g., discharge circuitry 108B shown in FIG. 3) may be included in system power device 104.

Control of discharge circuitry may be analog and/or digital (e.g., using one or more analog and/or digital controllers 112). For example, an analog controller 112 may be configured to control discharge circuitry 108A by comparing a sensed/obtained voltage value (e.g., a sensed/obtained voltage value across the capacitor C, and/or another sensed/obtained voltage value related to system power device 104) to a threshold voltage value, and if the sensed/obtained voltage value is greater than the sensed/obtained voltage value, then discharge circuitry 108A operates in a discharge mode to perform discharge. As another example, the controllers 112 may include both an analog controller 112 configured to operate using analog signals/indications and a digital controller 112 configured to operate using digital signals/indications. The analog controller 112 may be "normally on" with the digital controller 112 providing a disable signal to the analog controller (e.g., preventing discharge in a first mode of operation). When the digital controller 112 is unable to provide this disable signal (e.g., a voltage value related to the digital controller 112 is less than a threshold voltage value), then the analog controller 112 (in the absence of the disable signal) may be configured to control/activate the discharge circuitry 108 and perform discharge/operate in a second mode of operation (e.g., a discharge mode of operation).

Figure 7:
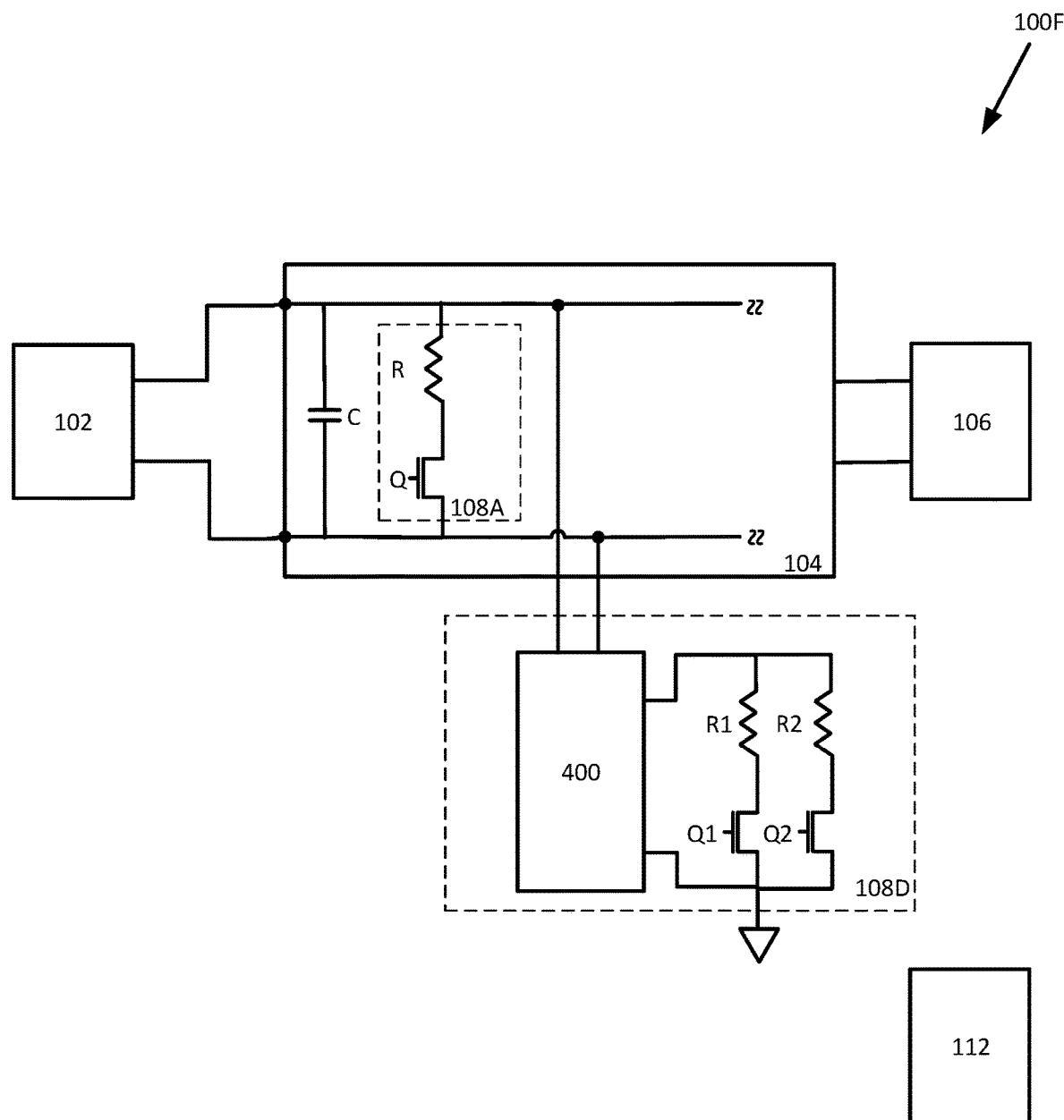
FIG. 7 illustrates a power system, in accordance with certain examples of the presently disclosed subject matter.

FIG. 7 illustrates a power system 100F according to examples of the present subject matter. Power system 100F may include discharge circuitry 108A and discharge circuitry 108D. Discharge circuitry 108A may be included in system power device 104. Discharge circuitry 108A and discharge circuitry 108D may operate simultaneously and/or in turns. As another example, other discharge circuitry (e.g., discharge circuitry 108B) may be included in system power device 104. Discharge circuitry 108A and/or discharge circuitry 108D may include a plurality of discharge paths, and which/how many of the plurality of discharge paths are activated/deactivated/operating to perform discharge may be related to one or more obtained/sensed/measured parameter related to the power system. For example, in a first phase of discharge a plurality of discharge paths may be configured to perform the discharge (e.g., to help maintain the discharge voltage or current of the discharge circuitry 108D at a substantially constant value), and in a second phase of discharge (e.g., in response to/based on one or more sensors sensing a change in voltage, for example, a decrease in the input voltage and/or or output voltage related to power device 400) a single discharge path/fewer discharge paths may be configured to perform the discharge (e.g., to help maintain the discharge voltage or current of the discharge circuitry 108D at a substantially constant value, or to provide only linear discharge and/or direct discharge using discharge circuitry 108A), while other discharge path(s) that were active in the first phase of discharge are not operational to provide discharge in the second phase of discharge.

Figure 8:
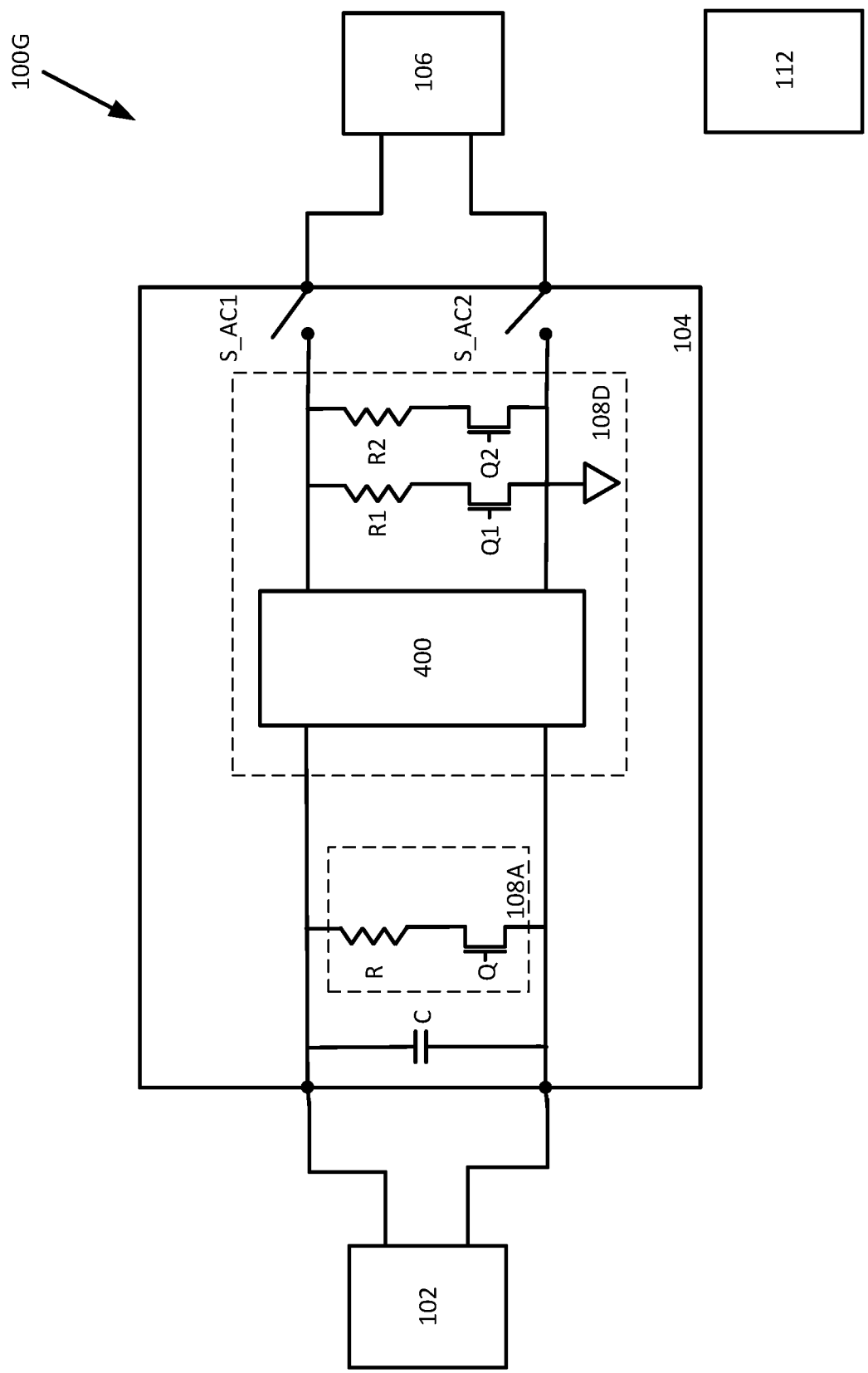
FIG. 8 illustrates a power system, in accordance with certain examples of the presently disclosed subject matter.

FIG. 8 illustrates a power system 100G according to examples of the present subject matter. Power system 100G includes discharge circuitry 108A and discharge circuitry 108D. Discharge circuitry 108A and discharge circuitry 108D may be both included in system power device 104. Discharge circuitry 108A and discharge circuitry 108D may operate simultaneously and/or in turns. As another example, other discharge circuitry (e.g., discharge circuitry 108B) may be included in system power device 104.

In the example of FIG. 8, the power device 400 that may be part of discharge circuitry 108D may be a power stage/power train (e.g., a DC to AC converter or a DC to DC converter) that is part of system power device 104 (e.g., an inverter).

System power device 104 may include one or more switches for connecting/disconnecting system power device 104 to/from other elements (e.g., electrical elements of the power system 100, for example, power source 102, power device 110, load 106, etc.). System power device 104 may include one or more DC switches for connecting/disconnecting system power device 104 to/from a DC element, such as, power source 102/power device 110 (e.g., one or more switches on a "DC side" of the system power device 104, as an example, S_DC1, S_DC2 illustrated, for example, in FIG. 9). System power device 104 may include one or more AC switches for connecting/disconnecting system power device 104 to/from an AC element, such as, load 106 (e.g., one or more switches on an "AC side" of the system power device 104, for example, switches S_AC1, S_AC2).

Figure 9:
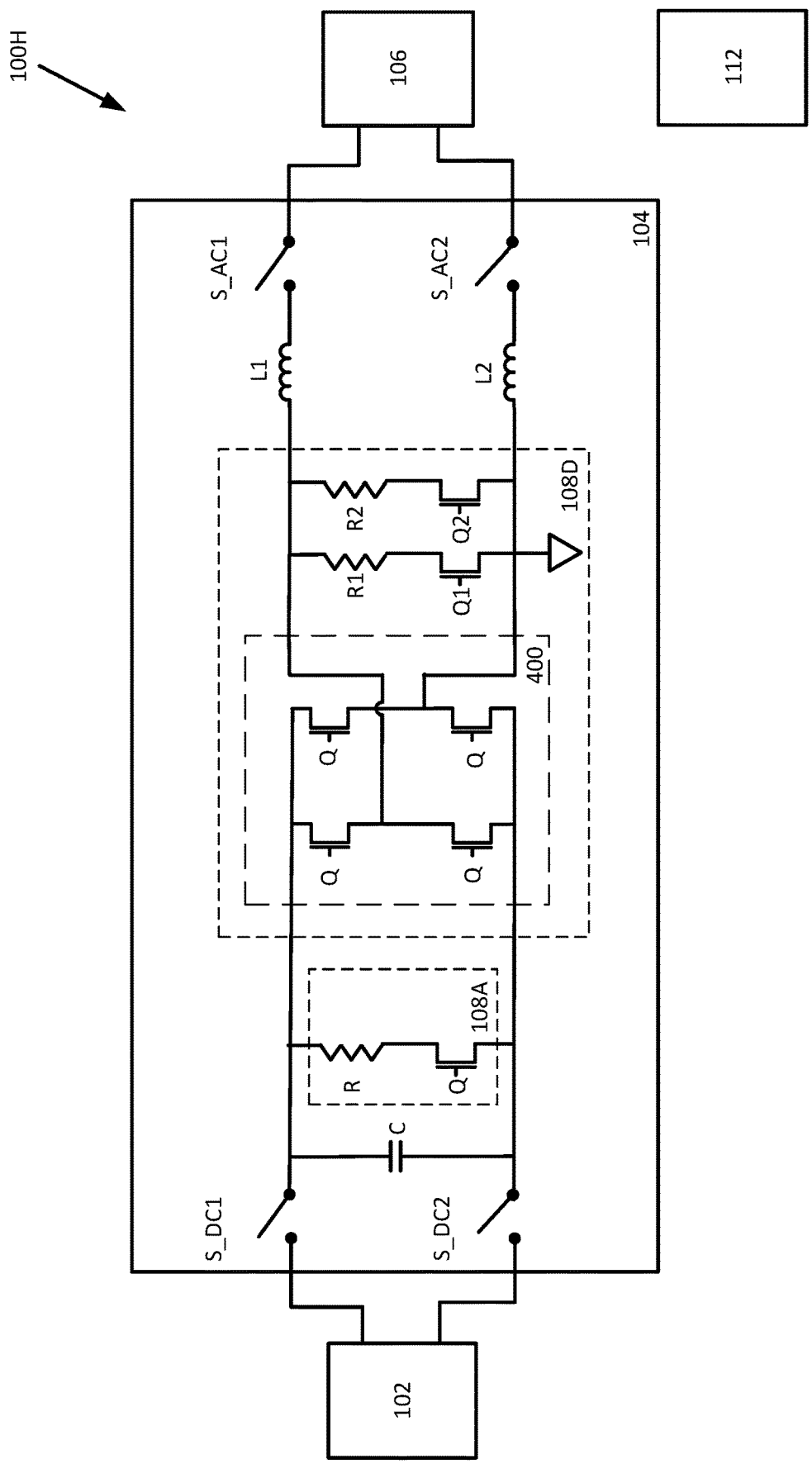
FIG. 9 illustrates a power system, in accordance with certain examples of the presently disclosed subject matter.

FIG. 9 illustrates a power system 100H according to examples of the present subject matter. Power system 100H may include discharge circuitry 108A and discharge circuitry 108D. Discharge circuitry 108A and discharge circuitry 108D may be both included in system power device 104. Discharge circuitry 108A and discharge circuitry 108D may operate simultaneously and/or in turns. As another example, other discharge circuitry (e.g., discharge circuitry 108B) may be included in system power device 104.

As mentioned above, the one or more indication to perform discharge may be related to an indication that at least one DC switch has been turned off, and/or an indication that at least one AC switch has been turned off.

The indication that a DC switch has been turned off may be related to the actuation of the switches S_DC1, S_DC2 that connect the system power device 104 to the power source 102 (e.g., an indication that switches S_DC1, S_DC2 have been turned off, disconnecting the system power device 104 from the power source 102). In some examples, when the DC switch (e.g., switch S_DC1 or S_DC2) is turned off, a sensor (e.g., a current sensor) may detect that little or no current flows between the power source 102 and the system power device 104. Accordingly, the sensor may provide an indication that the DC switch has been turned off. In other cases sensor may be one or more other sensor(s), e.g., voltage sensor, power sensor, proximity sensor, etc., that is configured to detect when the DC switch is turned off (e.g., senses no/less voltage, senses no/less power, senses a part of the switch has been physically moved, etc.) and to provide an indication that the DC switch has been turned off.

The indication that an AC switch has been turned off may be related to the actuation of the switches S_AC1, S_AC2 that connect the system power device 104 to the load 106 (e.g., an indication that switches S_AC1, S_AC2 have been turned off, disconnecting the system power device 104 from the load 106). In some examples, one or more sensor may be configured to detect when an AC switch has been turned off and to provide an indication that the AC switch has been turned off.

Power device 400 is illustrated as a full bridge circuit. Power device 400/system power device 104 may include four switches Q and one or more inductors L1, L2 (e.g., one or more inductors of a transformer).

As mentioned above, in some cases, controller 112 may be a digital controller 112. Discharge circuitry 108A and/or discharge circuitry 108D may include one or more non-linear discharge element/discharge load (e.g., an electrical load/electrical element used for discharge, for example, the discharge element/discharge load may not be a resistor, and the discharge element/discharge load may be any other appropriate load and/or a controlled load). As mentioned above, the controller 112/discharge circuitry 108 may be configured to operate during discharge in a way that there might not be a constant or linear or exponential descent of discharge power when operating in discharge mode/a stage of a discharge mode. For example, controller 112/discharge circuitry 108 may be configured to operate during discharge in a way that there is a linear or exponential ascent of discharge power when operating in discharge mode (i.e., the discharge may be controllable by controller 112/discharge circuitry 108/power device 400). As an example, there may be a linear or exponential ascent of discharge power when operating in a first stage of the discharge mode, and a constant discharge power and/or a linear or exponential descent of discharge power when operating in a second stage of the discharge mode.

Figure 10:
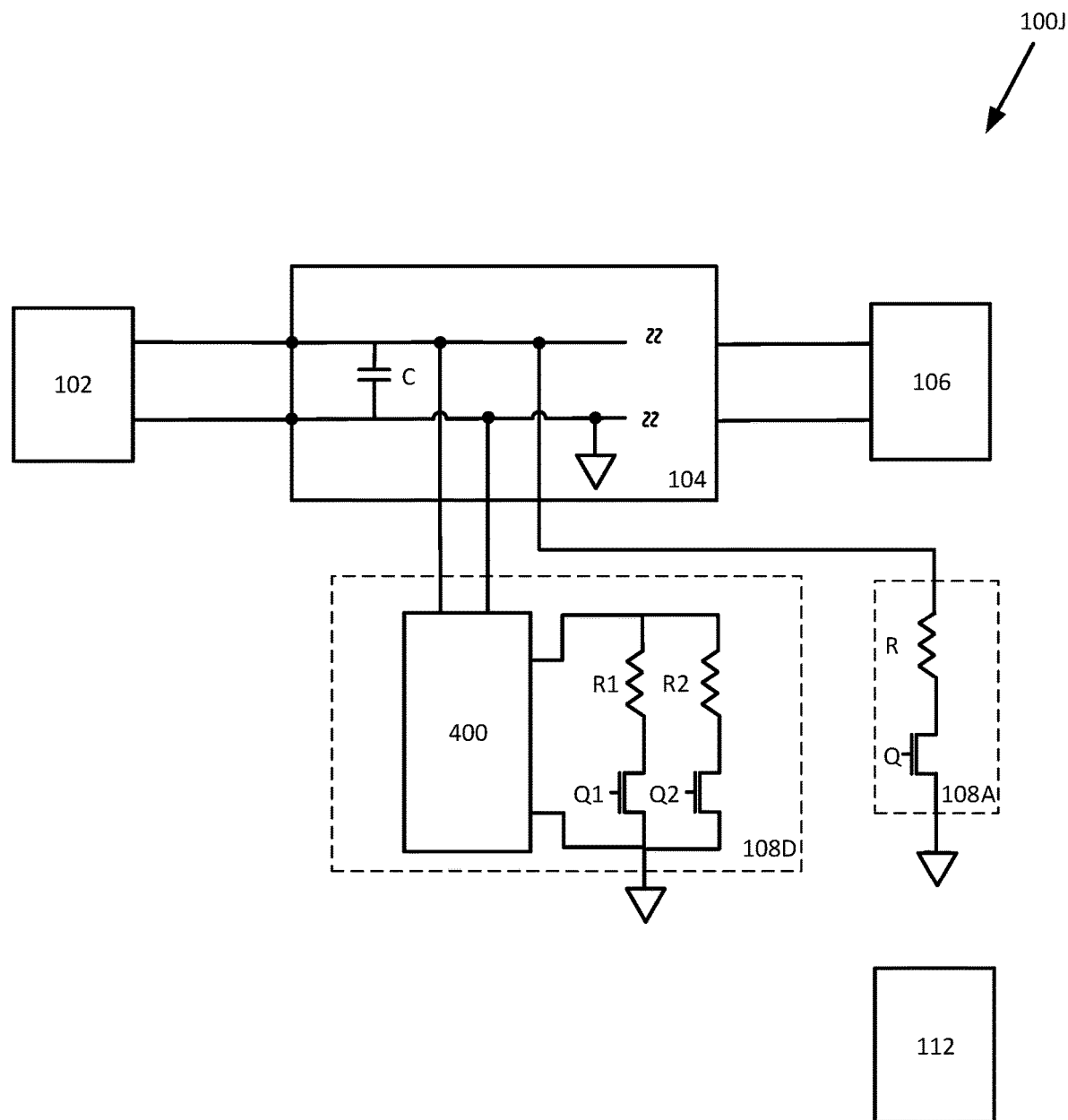
FIG. 10 illustrates a power system, in accordance with certain examples of the presently disclosed subject matter.

FIG. 10 illustrates a power system 100J according to examples of the present subject matter. Power system 100J may include discharge circuitry 108A and discharge circuitry 108D. Discharge circuitry 108A and discharge circuitry 108D may be both external to system power device 104. Discharge circuitry 108A and discharge circuitry 108D may operate simultaneously and/or in turns. Discharge circuitry 108A and discharge circuitry 108D may be connected in parallel. As another example, other discharge circuitry (e.g., discharge circuitry 108A, 108B) may be included in system power device 104.

Figure 11:
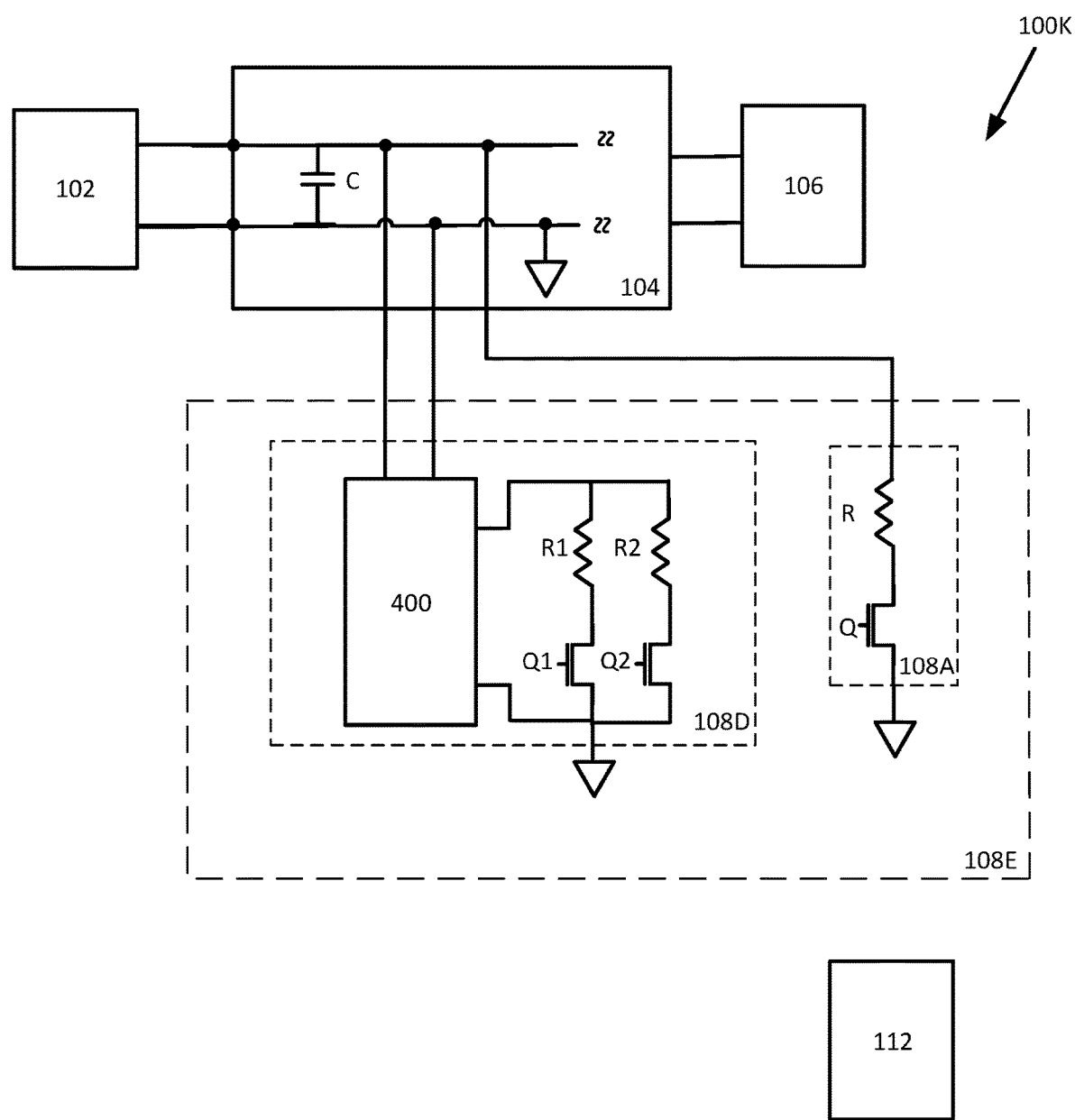
FIG. 11 illustrates a power system, in accordance with certain examples of the presently disclosed subject matter.

FIG. 11 illustrates a power system 100K according to examples of the present subject matter. Power system 100K may include discharge circuitry 108E. Discharge circuitry 108E may be external to system power device 104. Discharge circuitry 108E may include discharge circuitry 108A and discharge circuitry 108D. Discharge circuitry 108A and discharge circuitry 108D may operate simultaneously and/or in turns. Discharge circuitry 108A and discharge circuitry 108D may be connected in parallel. As another example, other discharge circuitry (e.g., discharge circuitry 108B, 108C) may be included in discharge circuitry 108E and/or system power device 104.

Figure 12:
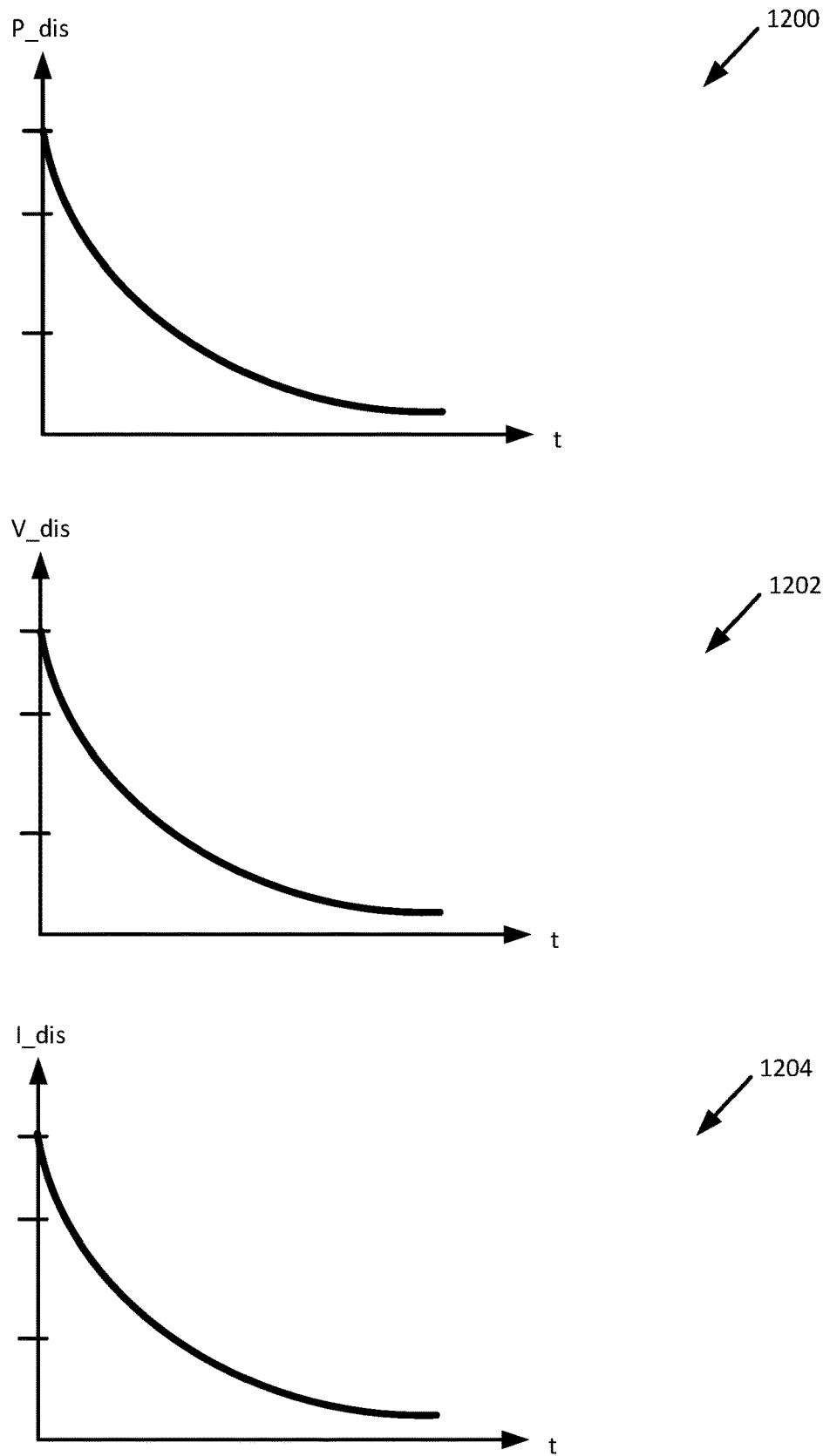
FIG. 12 illustrates graphs, in accordance with certain examples of the presently disclosed subject matter.

FIG. 12 illustrates graphs 1200, 1202, 1204 according to examples of the present subject matter. Graph 1200 is a graph representing discharge power, the input and/or output power at the input and/or output of some examples of discharge circuitry during discharge (e.g., the power related to a load [for example, a capacitor C and/or a resistor R] connected to the discharge circuitry that either provides or receives power). Graph 1202 is a graph representing discharge voltage, the input and/or output voltage at the input and/or output of some examples of discharge circuitry during discharge (e.g., the voltage related to a load [for example, a capacitor C and/or a resistor R] connected to the discharge circuitry that either provides or receives voltage). Graph 1204 is a graph representing discharge current, the input and/or output current at the input and/or output of some examples of discharge circuitry during discharge (e.g., the current related to a load [for example, a capacitor C and/or a resistor R] connected to the discharge circuitry that either provides or receives current/has current flowing through it). Using discharge circuitry 108A (FIG. 2) may result in an exponential discharge of power, as illustrated in graph 1200. Using discharge circuitry 108A may also result in exponential discharge of voltage and an exponential current flowing through discharge circuitry 108A, as illustrated in graphs 1202 and 1204, respectively. For example, one or more of the graphs 1200, 1202, 1204 may be illustrative of the discharge power/voltage/current at terminal Y of discharge circuitry 108A (FIG. 2) (e.g., the power/voltage/current related to capacitor C and/or resistor R during the discharge).

There may be an issue with exponential discharge of power, since the resistor R and switch Q of discharge circuitry 108A need to be able to withstand the relatively great discharge power/voltage/current during a relatively quick discharge. For example, using discharge circuitry that is a resistor with a transistor may result in exponential voltage dissipation, exponential current, and exponential power. At the beginning of the discharge there may be a relatively great power, which may require a relatively great resistor that is able to withstand a relatively great power (e.g., about 160 w). The requirement of relatively great resistors may be prohibitive.

Figure 13:
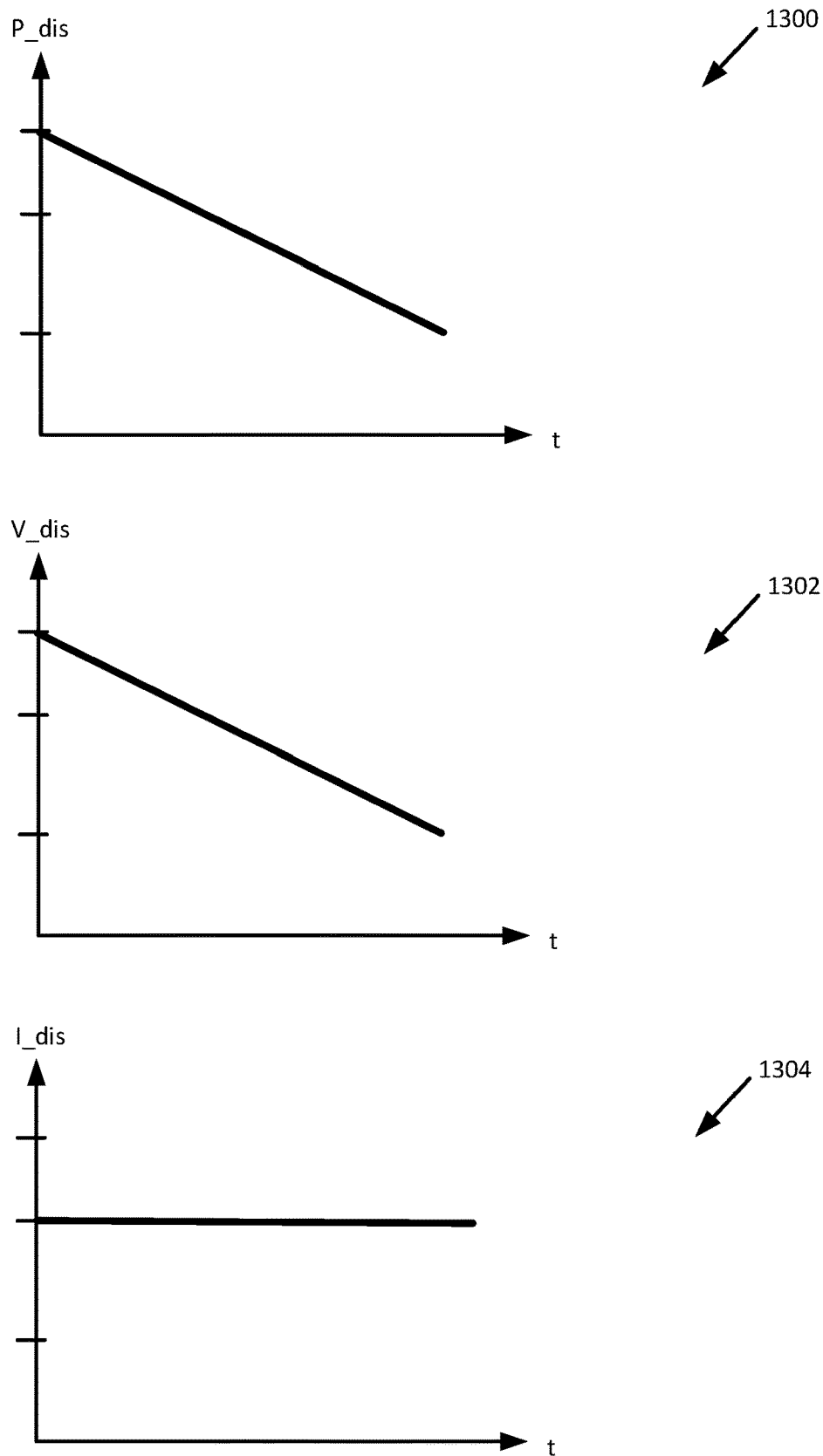
FIG. 13 illustrates graphs, in accordance with certain examples of the presently disclosed subject matter.

FIG. 13 illustrates graphs 1300, 1302, 1304 according to examples of the present subject matter. Graph 1300 is a graph representing discharge power, the input and/or output power at the input and/or output of some examples of discharge circuitry during discharge (e.g., the power related to a load [for example, a capacitor C and/or a resistor R] connected to the discharge circuitry that either provides or receives power). Graph 1302 is a graph representing discharge voltage, the input and/or output voltage at the input and/or output of some examples of discharge circuitry during discharge (e.g., the voltage related to a load [for example, a capacitor C and/or a resistor R] connected to the discharge circuitry that either provides or receives voltage). Graph 1204 is a graph representing discharge current, the input and/or output current at the input and/or output of some examples of discharge circuitry during discharge (e.g., the current related to a load [for example, a capacitor C and/or a resistor R] connected to the discharge circuitry that either provides or receives current/has current flowing through it). Using discharge circuitry 108B (FIG. 3) may result in a linear discharge of power, as illustrated in graph 1300. Using discharge circuitry 108B may also result in linear discharge of voltage and a relatively constant current flowing through discharge circuitry 108B, as illustrated in graphs 1302 and 1304, respectively. Comparator M and/or controller 112 may be configured to control the discharge so that the discharge current I remains relatively constant. A reference voltage Vref may be used as an input to the comparator M to control the discharge and ensure about a relatively constant output current value. The output voltage may be sensed (e.g., by one or more sensors) and the sensed output voltage may be used as feedback compared to the reference voltage Vref to control the discharge (e.g., control the rate of the switch Q). For example, one or more of the graphs 1300, 1302, 1304 may be illustrative of the discharge power/voltage/current at terminal Y of discharge circuitry 108B (FIG. 3) (e.g., the power/voltage/current related to capacitor C and/or resistor R during the discharge).

There may be an issue with linear discharge of power, since the Switch Q of discharge circuitry 108B needs to be able to withstand the relatively great discharge power/voltage/current during a relatively quick discharge. For example, in some cases when linear discharge is used, a physical effect (e.g., the Spirito effect) may cause the switch Q to malfunction, burn, and/or explode.

For example, discharge circuitry that includes a transistor (e.g., BJT) with a relatively lesser resistor may be used to control the discharge so that the result is linear voltage dissipation, constant current, and linear power. During discharge, the Spirito effect (e.g., due to relatively great current in the transistor) may cause materials and/or elements of the transistor to heat up. The transistor might not be designed for sufficient heat dissipation. For example, the heat may be focused towards the center of the heat disperser of the transistor and not the sides of the transistor, which may cause the transistor to burn and/or explode. This may be the case when non-dedicated circuitry is used as discharge circuitry, since this circuitry may have a lesser resistor, resulting in greater discharge current. In this case, there may be relatively quick discharger, but the transistor might not hold up to the greater current. Using a relatively greater resistor may result in a lesser current, and may also result in a relatively slower discharge. When using discharge circuitry 108B to discharge a relatively great power in a relatively quick time, if the discharge is not controlled properly, then the discharge may cause spikes in the transistor, causing the transistor to burn out, explode, and/or catch on fire. As an example, using discharge circuitry/one or more power devices 400 configured to help control the discharge (e.g., to help maintain the discharge voltage or current of the discharge circuitry 108 at a substantially constant value) may help avoid these issues.

Figure 14:
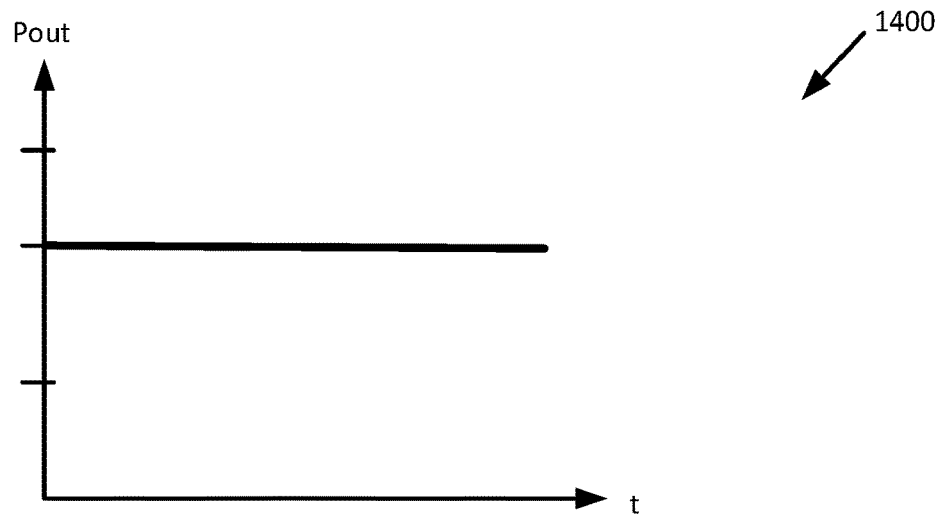
FIG. 14 illustrates graphs, in accordance with certain examples of the presently disclosed subject matter.
Figure 14:
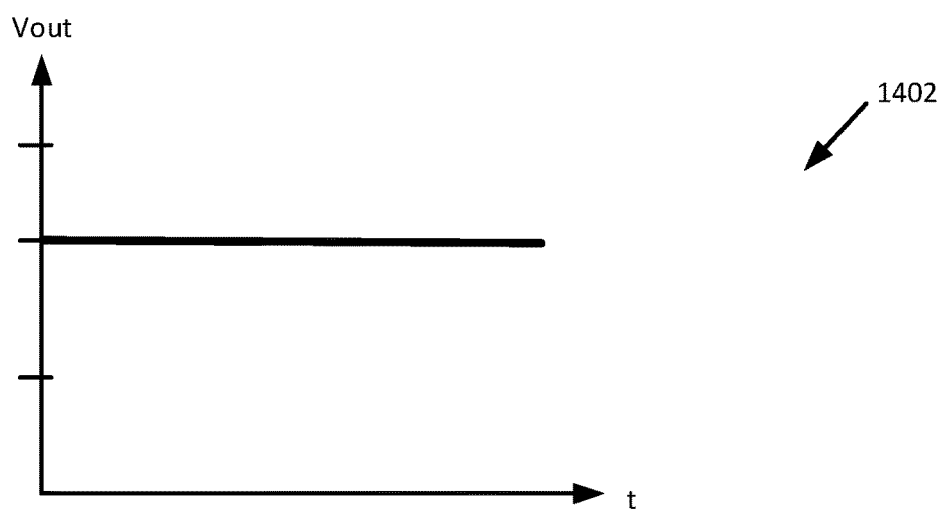
Figure 14:
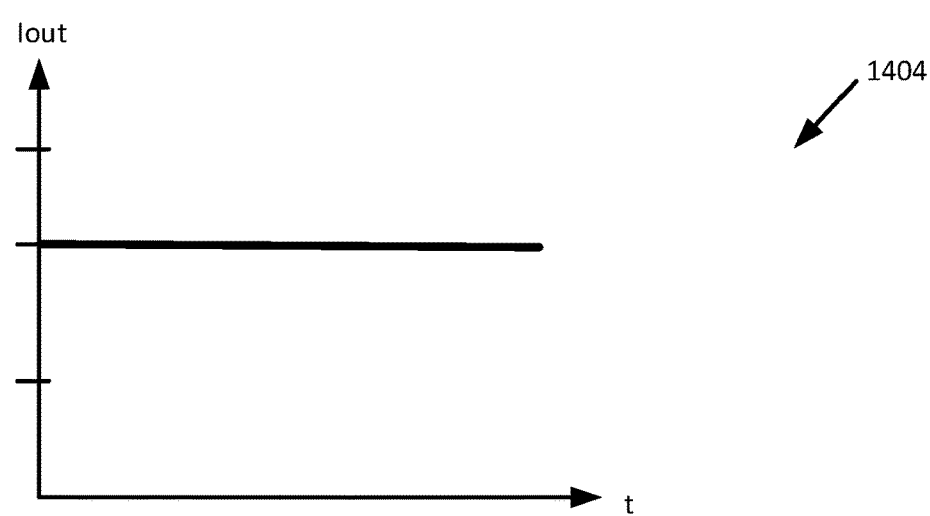

FIG. 14 illustrates graphs 1400, 1402, 1404 according to examples of the present subject matter. Graph 1400 is a graph representing discharge power, the output power at the output of some examples of discharge circuitry during discharge (e.g., the power related to a load [for example, a resistor R] connected to the discharge circuitry that receives power). Graph 1402 is a graph representing discharge voltage, the output voltage at the output of some examples of discharge circuitry during discharge (e.g., the voltage related to a load [for example, a resistor R] connected to the discharge circuitry that receives voltage). Graph 1404 is a graph representing discharge current, the output current at the output of some examples of discharge circuitry during discharge (e.g., the current related to a load [for example, a resistor R] connected to the discharge circuitry that receives current/has current flowing through it). Using discharge circuitry 108C (FIG. 4) with power device 400 (e.g., a DC to DC converter) may result in a relatively constant discharge of power, as illustrated in graph 1400. Using discharge circuitry 108C may result in a relatively constant discharge of voltage and a relatively constant current flowing through discharge circuitry 108C, as illustrated in graphs 1402 and 1404, respectively. Discharge circuitry 108C and/or power device 400 may be configured to control the discharge so that the discharge current I remains relatively constant. Controller 112 and/or sensor(s) may be configured to help control the discharge and ensure about a relatively constant output current value. For example, the output voltage may be sensed (e.g., by one or more sensors) and the sensed output voltage may be used to help control the discharge (e.g., control the rate of one or more switches Q in the discharge circuitry/power device, for example, so that there is constant rate of discharge). For example, one or more of the graphs 1400, 1402, 1404 may be illustrative of the discharge power/voltage/current at terminal(s) X of discharge circuitry 108C (FIG. 4) (e.g., the power/voltage/current related to resistor R during the discharge).

For example, discharge circuitry that includes a resistor in series with a transistor and a DC to DC converter may be used to control the discharge so that there is a relatively constant discharge voltage, relatively constant discharge current, and a relatively constant discharge power. A control loop/feedback to the DC to DC converter may help ensure relatively constant discharge power (relatively constant discharge voltage, and relatively constant discharge current).

As an example, the discharge circuitry/power device 400 (e.g., a DC to DC converter) may be and/or include non-dedicated discharge circuitry that may already be in/part of the system power device 104 (e.g., DC to AC inverter). For example, the discharge circuitry/power device may have multiple modes of operation. A first mode of operation may be one of power conversion in the system power device. A second mode of operation may be to discharge power/voltage in a relatively quick period of time (e.g., to connect/be used as part of the discharge circuitry to dissipate the relatively great voltage of the capacitor). One or more modes of operation may have additional modes/phases of operation. For example, in discharge mode the discharge circuitry/power device may have a first mode/phase where discharge is done with relatively constant discharge power, and a second mode/phase where discharge is done with relatively non-constant discharge power (e.g., exponential discharge power and/or linear discharge power).

There may be issue during discharge when the input voltage (e.g., Vin/Vc—the capacitor voltage) gets relatively lesser which causes a drop in the output voltage, so there might not be constant power output, and the discharge circuitry might not able to relatively quickly discharge the voltage at that point. For example, in some cases, at some point during discharge of the input voltage (the voltage input to discharge circuitry/power device 400) may get relatively lesser than it was at the beginning of discharge, which may cause the discharge circuitry to slow down and/or stop operating even though the discharge has not been completed (e.g., the input voltage is still above a threshold, e.g., about 30 volts). To potentially solve this problem, discharge circuitry 108D (FIG. 5) with power device 400 and multiple/plurality of discharge paths may be configured to provide a relatively constant discharge of power even when the input voltage is relatively lesser. Discharge circuitry 108D may include a plurality of discharge paths (parallel resistor with transistor lines) that are configured to be used for discharge at the beginning of discharge, and when the input voltage drops, discharge circuitry 108D may be configured to switch/change modes of operation and have/use/operate fewer/only one of the discharge paths (resistor with transistor lines) to complete the discharge (at least to the desired threshold—e.g., 30 volts). For example, discharge circuitry 108D may be configured to use a first discharge path (e.g., resistor R1 and switch Q1) and a second discharge path (e.g., resistor R2 and switch Q2) during a first mode/phase of discharge, and to use just the first discharge path and not the second discharge path during a second mode/phase of discharge.

For example, one or more sensors/controllers 112 may be configured to sense/obtain/determine/estimate the input voltage (e.g., Vin/Vc—the capacitor voltage), i.e., the discharge voltage to be discharged.

There may be an issue, since it may be difficult to measure/sense the relatively great voltage (e.g., discharge voltage/capacitor voltage Vin/Vc) on the input side of the discharge circuitry/power device (e.g., DC to DC converter) to know when/before the voltage drops and the discharge circuitry/power device should switch modes of operation. Equipment needed to measure a relatively great voltage and/or the measuring of the relatively great voltage may be prohibitive. One solution to this issue is to measure parameters (e.g., voltage, current, power, etc.) on the output side of the discharge circuitry/power device (e.g., DC to DC converter), which may be a relatively lesser voltage, to help determine when/after the input voltage drops. For example, the discharge circuitry/controller/sensors might not be able to measure/sense/determine before/as soon as the input voltage drops, but rather the discharge circuitry/controller/sensors may sense right after/relatively shortly after the input voltage drops and the discharge circuitry/controller may be configured to relatively quickly adjust (e.g., switch to a second mode/phase of operation, for example, turn off/stop using one or more of the discharge paths [resistor with transistor lines]) to lesser the output current and raise/correct the output voltage, so that the output voltage stays a relatively greater constant output voltage (with a relatively constant current) and a relatively constant output power/discharge power.

As an example, the discharge circuitry/power device may disperse energy using a power train of the system power device (e.g., DC to AC inverter). The power train may include a plurality of transistors (e.g., 4 transistors, for example, a full bridge circuit). Discharge circuitry/power device may be configured to split up dispersion/dispersal of the energy during discharge between the plurality of different transistors, so that each transistor only gets part (e.g., ¼) of the load. This may enable a quicker and more reliable discharge. In this case also, the discharge circuitry may be configured to provide constant power at the output for the discharge.

As an example, a plurality of discharge circuitries/discharge paths may be used either relatively simultaneously and/or subsequently.

For example, the power systems illustrated in FIGS. 6-10 illustrate examples where multiple discharge circuits are used.

Power system 100E (FIG. 6) includes discharge circuitry 108C and discharge circuitry 108A. Discharge circuitry 108C may include a power device 400 (e.g., a DC to DC converter) and a resistor R in series with a switch Q (e.g., a transistor) electrically connected on the DC output side of the power device 400. Discharge circuitry 108A includes a resistor R (which may be a relatively lesser resistor) in series with a switch Q (e.g., a MOSFET or BJT transistor) electrically connected on the DC input side of the power device 400. Discharge circuitry 108A may be configured to operate relatively simultaneously with discharge circuitry 108C (e.g., during discharge). Discharge circuitry 108A may provide a relatively slow discharge on the DC input side of power device 400, but may help with the discharge (e.g., may make the overall discharge quicker and more reliable).

As an example, discharge circuitry may be configured to switch between different modes/phases/stages of operation based on a sensed parameter related to a certain threshold (e.g., a sensed voltage above or below a certain threshold). For example, based on a sensed parameter related to a certain threshold, discharge circuitry may be configured to: turn on, turn off, perform exponential discharge, perform linear discharge, perform constant discharge, perform direct discharge, perform converter controlled discharge, perform discharge with a plurality of discharge paths, perform discharge with a different number (single/fewer/more) discharge path(s), operate in a non-discharge (e.g., standard conversion) mode of operation, etc.

Figure 15:
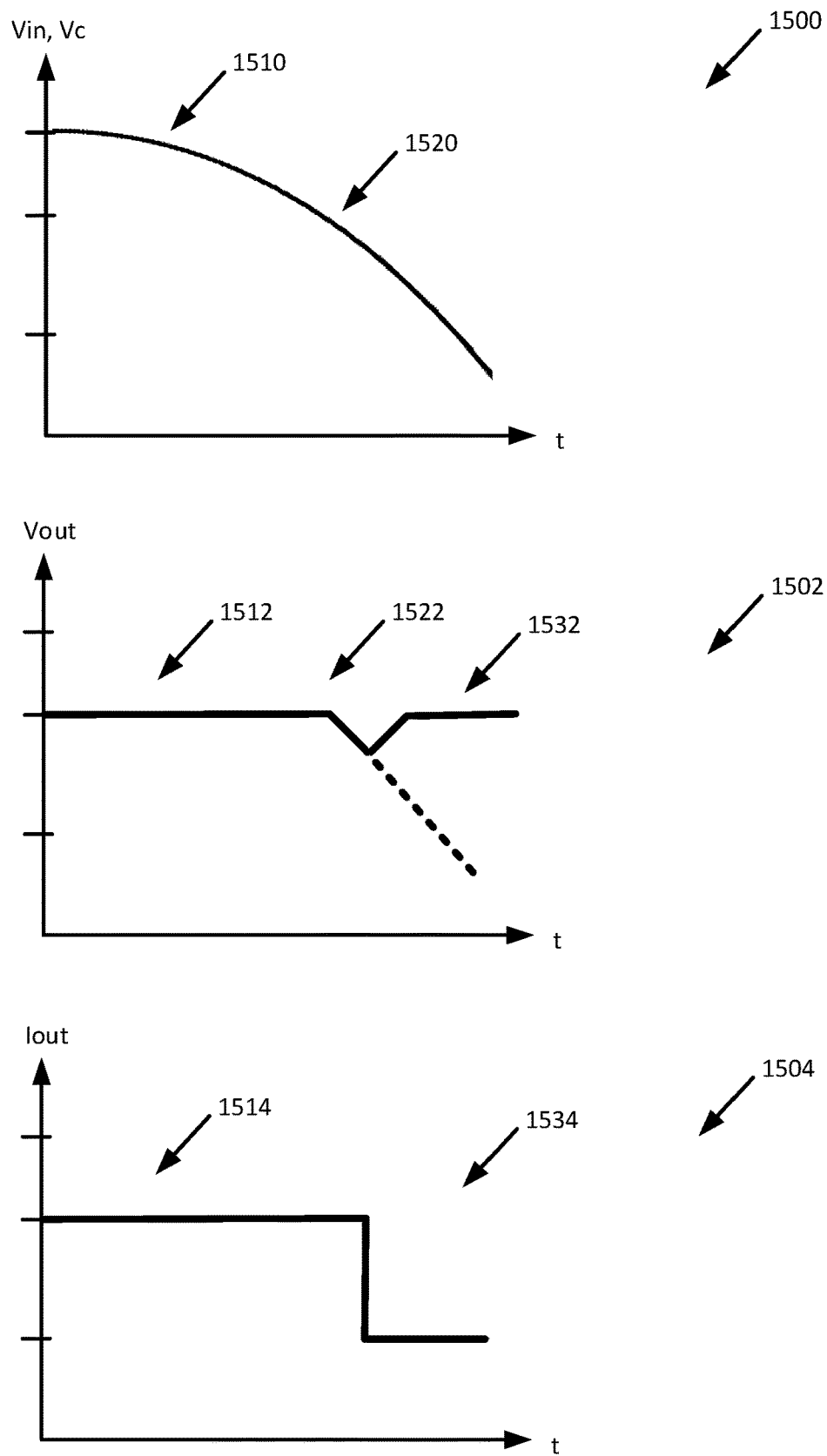
FIG. 15 illustrates graphs, in accordance with certain examples of the presently disclosed subject matter.

FIG. 15 illustrates graphs 1500, 1502, 1504 according to examples of the present subject matter. Graph 1500 is a graph representing input voltage, the voltage at the input of some examples of discharge circuitry during discharge (e.g., the voltage related to a load [for example, a capacitor C] connected to the discharge circuitry that provides voltage). Graph 1502 is a graph representing discharge voltage, the output voltage at the output of some examples of discharge circuitry during discharge (e.g., the voltage related to a load [for example, a resistor R, R1, R2] connected to the discharge circuitry that receives voltage). Graph 1504 is a graph representing discharge current, the output current at the output of some examples of discharge circuitry during discharge (e.g., the current related to a load [for example, a resistor R, R1, R2] connected to the discharge circuitry that receives current/has current flowing through it). As illustrated in graph 1500, the input voltage at the beginning of discharge 1510 may be greater than the relatively lesser input voltage at a later point of discharge 1520. During the first stage of discharge the discharge circuitry (e.g., discharge circuitry 108D) may discharge using a first mode of discharge (e.g., using two or more discharge paths) which may result in a relatively constant discharge of voltage, a relatively constant discharge voltage 1512, as illustrated in graph 1502, and a relatively constant current flowing through discharge circuitry, a relatively constant discharge current 1514, as illustrated in graph 1504. Since the input voltage (e.g., voltage input to discharge circuitry/power device 400) may get relatively lesser as discharge progresses to a later point of discharge 1520, this may cause discharge to slow down and/or stop. As illustrated in graph 1502, this may cause a disruption of the relatively constant discharge of voltage, and may result in a relatively linear discharge voltage 1522. For example, in response to sensing this change in the output voltage (e.g., using a controller and one or more sensors) the discharge circuitry/power device 400 may switch/change to a second mode of discharge (e.g., using a single discharge path, for example in the second phase/stage of discharge one or more discharge path that was operating in the first phase/stage of discharge may be switched off/turned off, and only a first discharge path and not a second discharge path may operate in the second phase/stage of discharge). For example, based on/in response to a sensed output voltage, one or more discharge path may be turned off, which may result in a relatively constant discharge of voltage, a relatively constant discharge voltage 1532, as illustrated in graph 1502, and a relatively constant current flowing through discharge circuitry, a relatively constant discharge current 1534, as illustrated in graph 1504. The output discharge current during the first stage of discharge 1514 may be a relatively lesser output discharge current during the second stage of discharge 1534, but the output discharge current for the second stage/phase of discharge 1534 is also a relatively constant current value. For example, discharge circuitry/power device 400 may be configured to control the discharge so that the discharge current I remains constant during each phase/stage of discharge. Discharge circuitry/power device 400 may use a controller 112 and one or more sensor(s) to control the discharge and ensure about a relatively constant output current value. For example, discharge circuitry/controller/sensors may be configured to sense the output voltage and use the sensed voltage to control the discharge (e.g., control the rate of one or more switches Q) to ensure a relatively constant discharge power/output power. For example, graph 1500 may be illustrative of the input voltage at terminal(s) Y, W of discharge circuitry 108D (FIG. 5) (e.g., the voltage related to capacitor C during the discharge). For example, one or more graphs 1502, 1504 may be illustrative of the discharge voltage/current at terminal(s) X of discharge circuitry 108D (FIG. 5) (e.g., the power/voltage/current related to resistor R1 and/or R2 during the discharge).

In some examples where multiple discharge circuitries are used (e.g., discharge circuitry 108A and discharge circuitry 108C of power system 100E [FIG. 6]), some of the discharge circuitry may operate during multiple phases/stages of the discharge without any change of mode (e.g., discharge circuitry 108A), and some of the discharge circuitry may operate simultaneously with the other discharge circuitry in one or more phases/stage of the discharge while also switching between different modes (e.g., discharge circuitry 108C may turn off or on different discharge paths based on determinations/indications of different phases/stages of discharge).

In some examples where multiple discharge circuitries are used (e.g., discharge circuitry 108A and discharge circuitry 108D of power system 100K [FIG. 11]), some of the discharge circuitry may operate during first phases/stages of the discharge and not operate during subsequent phases/stages of the discharge (e.g., discharge circuitry 108D may operate first), and some of the discharge circuitry may operate in turn with/subsequently to the other discharge circuitry, and might not operate during first phases/stages of the discharge and operate during subsequent phases/stages of the discharge (e.g., discharge circuitry 108A may operate second).

Figure 16:
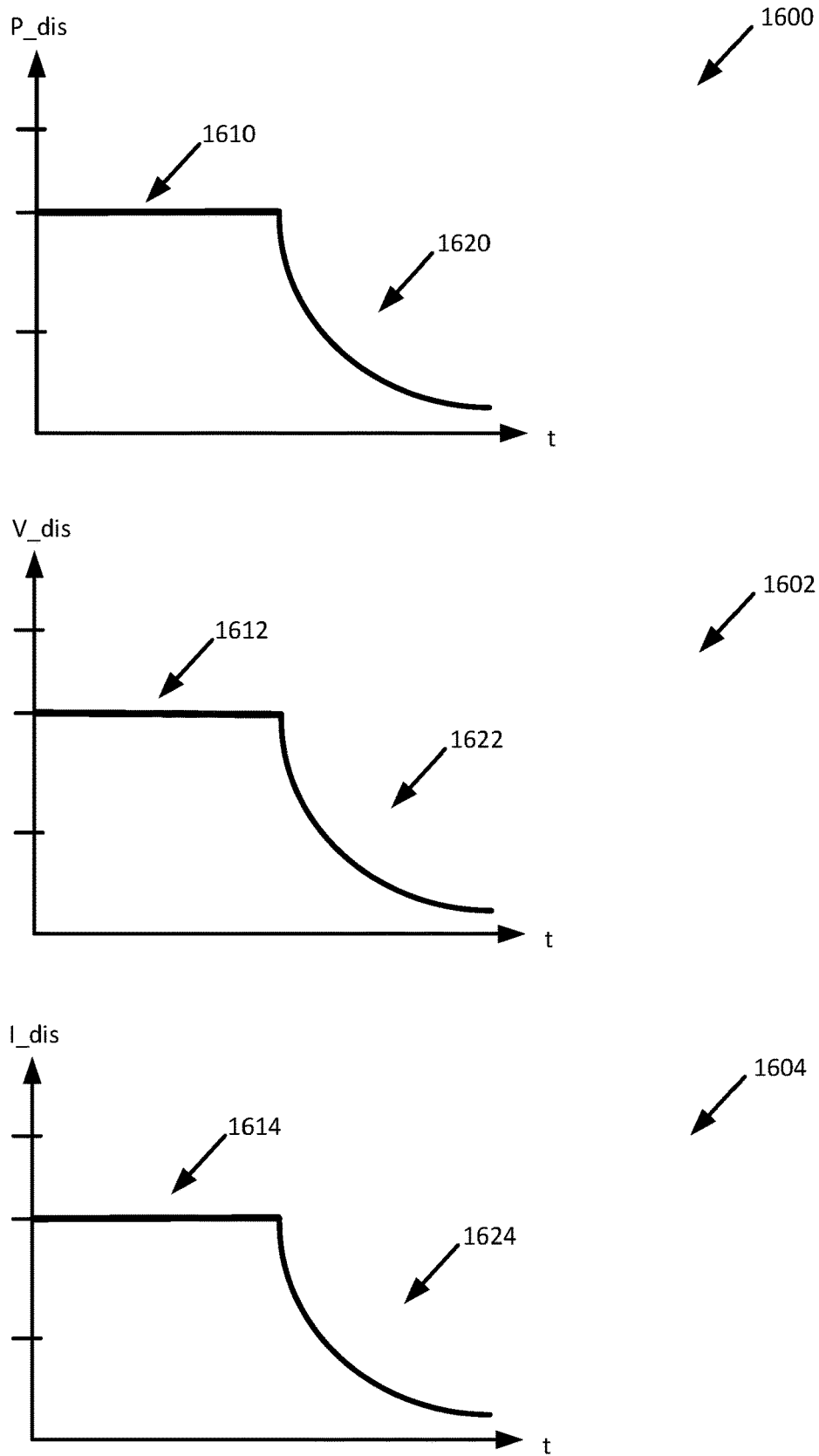
FIG. 16 illustrates graphs, in accordance with certain examples of the presently disclosed subject matter.

FIG. 16 illustrates graphs 1600, 1602, 1604 according to examples of the present subject matter. Graph 1600 is a graph representing discharge power, the output power at the output of some examples of discharge circuitry during discharge. Graph 1602 is a graph representing discharge voltage, the output voltage at the output of some examples of discharge circuitry during discharge. Graph 1604 is a graph representing discharge current, the output current at the output of some examples of discharge circuitry during discharge. As illustrated in graph 1600, the output power/discharge power at the beginning of discharge/a first stage/phase of discharge 1610 may be a relatively constant output power/discharge power, and the output power/discharge power at a later point/a second stage/phase of discharge 1620 may be a relatively non-constant output power/discharge power (e.g., exponential discharge power and/or linear discharge power). Similarly, as illustrated in graph 1602, the output voltage/discharge voltage at the beginning of discharge/a first stage/phase of discharge 1612 may be a relatively constant output voltage/discharge voltage, and the output voltage/discharge voltage at a later point/a second stage/phase of discharge 1622 may be a relatively non-constant output voltage/discharge voltage (e.g., exponential discharge voltage and/or linear discharge voltage). Additionally, as illustrated in graph 1604, the output current/discharge current at the beginning of discharge/a first stage/phase of discharge 1614 may be a relatively constant output current/discharge current, and the output current/discharge current at a later point/a second stage/phase of discharge 1624 may be a relatively non-constant output current/discharge current (e.g., exponential discharge current and/or linear discharge current). For example, one or more of the graphs 1600, 1602, 1604 may be illustrative of the discharge power/voltage/current at terminal(s) of discharge circuitry 108E (FIG. 11) (e.g., the power/voltage/current related to resistors R, R1, and/or R2 during the discharge).

For example, during a first phase/stage of discharge a first discharge circuitry may be configured to be operated to result in/produce a relatively constant discharge of voltage and a relatively constant current flowing through discharge circuitry.

For example, using discharge circuitry 108E (FIG. 11) which includes discharge circuitry 108A and discharge circuitry 108D, discharge circuitry 108D may be configured to operate during a beginning of discharge/a first stage/phase of discharge. This first stage/phase of discharge may include one or more sub-phases/sub-stages.

For example, in a first sub-phase/sub-stage multiple discharge paths of discharge circuitry 108D are configured to operate, and in a second sub-phase/sub-stage fewer or more discharge paths of discharge circuitry 108D are configured to operate. During both the first sub-phase/sub-stage and the second sub-phase/sub-stage there may be a relatively constant discharge power/voltage/current output, although the value of the relatively constant discharge current in the first sub-phase/sub-stage may be greater than the value of the relatively constant discharge current in the and the second sub-phase/sub-stage.

In some examples, discharge circuitry 108C with a single discharge path may be used during the beginning of discharge/a first stage/phase of discharge to provide a relatively constant discharge power/voltage/current output (e.g., without any sub-phases/sun-stages).

During a second phase/stage of discharge, a second discharge circuitry may be configured to be operated to result in/produce a relatively non-constant discharge of voltage, and a relatively non-constant current flowing through discharge circuitry. For example, discharge circuitry 108A may be configured to operate during a later point of discharge/a second stage/phase of discharge.

Input voltage may be the voltage input to discharge circuitry/power device 400.

For example, during a second mode/phase/stage discharge circuitry/controller may be configured to switch off a first discharge path/discharge circuitry, so that only the second discharge circuitry and not the first discharge circuitry is operating (e.g., to turn off one discharge circuitry/discharge path based on/in response to a sensed output voltage).

Discharge circuitry being configured to provide/produce a relatively non-constant discharge power/voltage/current for the second phase/stage of discharge (e.g., exponential or linear, rather than relatively constant discharge power/voltage/current) might not be an issue since the input power/input voltage is relatively lesser at the later point of discharge/the second stage/phase of discharge (e.g., when switch/begin the second phase/stage of discharge) than during the beginning of discharge/the first stage/phase of discharge (e.g., when switch/begin the first phase/stage of discharge). In contrast to a relatively non-constant discharge power/voltage/current being an issue during a beginning of discharge/a first stage/phase of discharge. For example, the use of relatively non-constant discharge may be used to "finish off/complete" the discharge once the process of the discharge has reached a certain point (e.g., the input voltage has reached a certain threshold, for example, the input voltage may be about 50V, about 20V, or about 10V). Even though there may be more risk using relatively non-constant discharge, this risk may be mitigated by the fact that the input power/input voltage is relatively lesser at the later point of discharge/the second stage/phase of discharge than during the beginning of discharge/the first stage/phase of discharge The change/switch between different modes of operation of the discharge circuitry may be a result of one or more sensed parameters (e.g., sensed by one or more sensors) and/or determinations/indications to switch between different modes of operation of the discharge circuitry (e.g., determined/indicated by one or more controllers, for example, based on/in response to one or more sensed parameters/parameter data).

For example, the different phase/stages and/or sub-phases/sub-stages may be determined based on certain thresholds. For example, a first phase/stage and/or sub-phase/sub-stage may be determined based on a first parameter value (e.g., a relatively greater voltage value or a relatively lesser voltage value), and a second phase/stage and/or sub-phase/sub-stage may be determined based on a second parameter value (e.g., a relatively lesser voltage value or a relatively lesser greater value, for example that is sensed/obtained subsequent to the first parameter value).

As an example, the determination about switching modes of operation may be made using one or more controllers 112 (e.g., external and/or in the discharge circuitry, power device and/or inverter). The determination may be based on parameter data obtained by one or more sensors. For example, parameter data may be compared to a certain threshold in order to determine the mode of operation.

As an example, the parameter data may relate to one or more elements of the power system, for example it may relate to: the discharge circuitry, the power device, the converter, the system power device, the inverter, the power source, the grid, etc.

For example, the parameter data may include: temperature parameter data, electrical parameter data, time parameter data, irradiance parameter data, etc.

As an example, the electrical parameter data may relate to: current, voltage, power, etc.

For example, if parameter data is greater than a certain threshold value then the discharge circuitry may operate in a certain mode of operation (e.g., if a sensed/obtained voltage/current/power/temperature is greater than or less than a certain threshold then discharge may be performed, for example, controlled conversion discharge). As another example, if parameter data is less than or greater than another certain threshold value then the discharge circuitry may operate in another certain mode of operation (e.g., if a sensed/obtained voltage/current/power/temperature is less than or greater than a certain other threshold then a different discharge may be performed, for example direct discharge or controlled conversion discharge using a different number of discharge paths, or discharge may be ended and the system power device/power device may begin to operate in a different [non-discharge] mode of operation).

Figure 17:
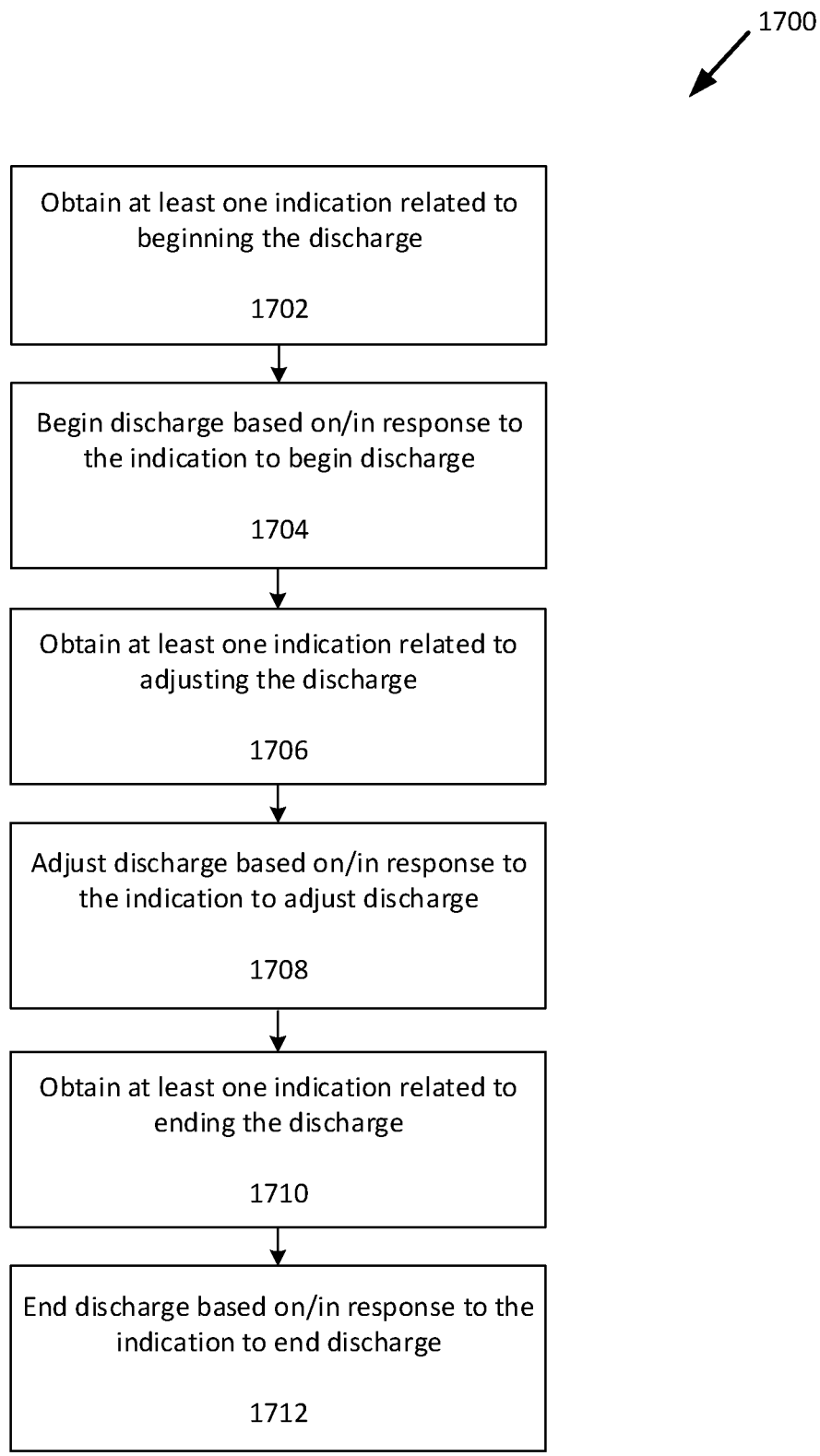
FIG. 17 illustrates a flow chart showing an example method for discharge, in accordance with certain examples of the presently disclosed subject matter.

Reference is now made to FIG. 17, which illustrates a flow chart showing an example method 1700 for discharge, in accordance with certain examples of the presently disclosed subject matter.

At step 1702 at least one indication related to beginning discharge is obtained (e.g., the indication may be obtained by discharge circuitry 108/one or more controllers 112). For example, a certain voltage value may be sensed/obtained that indicates that discharge should be performed (e.g., the voltage value is greater than or less than a certain threshold).

At step 1704 discharge is begun based on/in response to the indication to begin discharge (e.g., discharge circuitry 108 may begin to perform discharge). For example, the discharge circuitry 108 may perform a controlled conversion discharge (e.g., using one or more power device configured to control the discharge) based on/in response to the certain voltage value.

At step 1706 at least one indication related to adjusting discharge is obtained (e.g., the indication may be obtained by discharge circuitry 108/one or more controllers 112). For example, the at least one indication related to adjusting discharge may be an indication related to: adjusting the power device 400 (e.g., a rate of switching/discharge and/or adjusting an output value), a first phase/stage of discharge, a second phase/stage of discharge, a first discharge path, a second discharge path, a first discharge circuitry, a second discharge circuitry, a first mode of operation, a second mode of operation, etc. For example, the discharge circuitry 108/controller 112 may obtain an indication (e.g., a sensed/obtained voltage value) that indicates that a direct discharge should/may be performed (e.g., without using the one or more power device configured to control the discharge) based on/in response to the certain voltage value. As another example, the discharge circuitry 108/controller 112 may obtain an indication (e.g., a sensed/obtained voltage value) that indicates that a controlled conversion discharge using fewer or more discharge paths should/may be performed (e.g., using a single discharge path of a power device configured to control the discharge, instead of a plurality of discharge paths of the power device) based on/in response to the certain voltage value.

At step 1708 discharge is adjusted based on/in response to the indication to adjust discharge (e.g., discharge circuitry 108 adjusts the discharge). For example, the discharge circuitry 108 may then perform a direct conversion discharge or a controlled conversion discharge using fewer discharge paths based on/in response to the certain voltage value.

At step 1710 at least one indication related to ending discharge is obtained (e.g., the indication is obtained by discharge circuitry 108/one or more controllers 112). For example, a certain voltage value may be sensed/obtained to indicate that discharge should be ended (e.g., the voltage value is less than or greater than a certain threshold).

At step 1712 discharge is ended based on/in response to the indication to end discharge (e.g., discharge circuitry 108 finishes to perform discharge). For example, the discharge circuitry 108 may turn off or shut down based on/in response to the certain voltage value.

Figure 18:
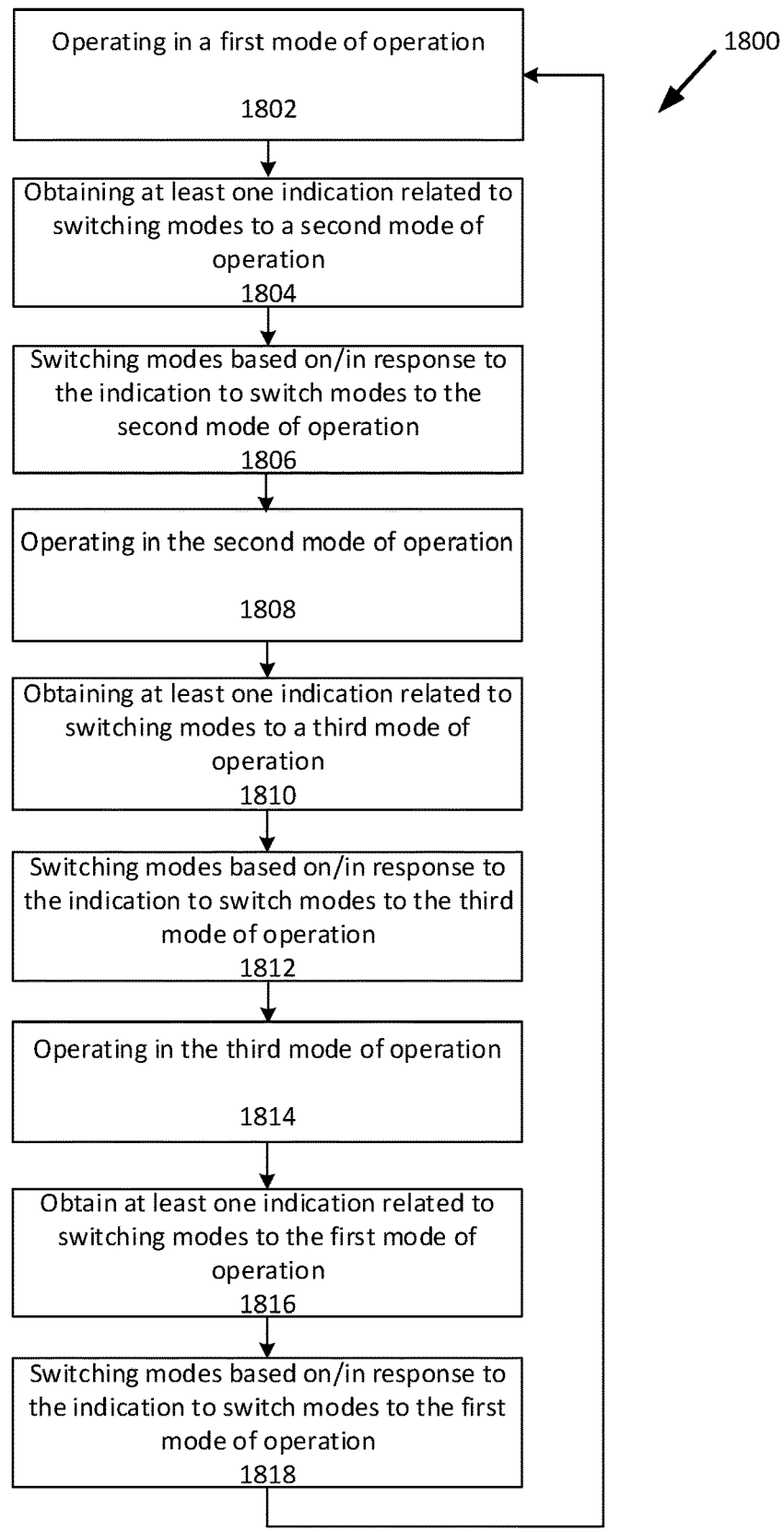
FIG. 18 illustrates a flow chart showing an example method for discharge, in accordance with certain examples of the presently disclosed subject matter.

Reference is now made to FIG. 18, which illustrates a flow chart showing an example method 1800 for discharge, in accordance with certain examples of the presently disclosed subject matter.

At step 1802 the discharge circuitry is operated in a first mode of operation (e.g., a power conversion mode, converting power at the input of a power device to the output of a power device, for example, the converted output power may be provided as an output voltage on a first load [e.g., an AC electrical grid, a series connection of power devices, a storage device, etc.]).

At step 1804 at least one indication related to switching the mode of the discharge circuitry to a second mode of operation is obtained (e.g., the indication may be obtained by discharge circuitry/one or more controller). For example, the at least one indication related to switching mode to the second mode of operation may be an indication related to: one or more parameter (e.g., an electrical parameter in the power system), a threshold (e.g., voltage or power threshold), overcurrent, islanding, one or mode of operation of the discharge circuitry, etc.

At step 1806 the discharge circuitry switches mode to the second mode of operation, based on/in response to the obtained indication to switch modes to the second mode of operation (e.g., discharge circuitry may switch from the first mode of operation to the second mode of operation).

At step 1808 the discharge circuitry is operated in the second mode of operation (e.g., a discharge mode, discharging power at the input of a power device to the output of a power device, for example, the converted output power may be discharged as an output voltage on a second load [e.g., a discharge resistor, the first load, etc.]). For example, the second mode of operation may be a first discharge mode for a first phase/stage, and/or a first sub-phase/sub-stage of discharge.

At step 1810 at least one indication related to switching the mode of the discharge circuitry to a third mode of operation is obtained (e.g., the indication may be obtained by discharge circuitry/one or more controller). For example, the at least one indication related to switching mode to the third mode of operation may be an indication related to: one or more parameter (e.g., an electrical parameter in the power system), a threshold (e.g., voltage or power threshold), overcurrent, islanding, one or mode of operation of the discharge circuitry, etc.

At step 1812 the discharge circuitry switches mode to the third mode of operation, based on/in response to the obtained indication to switch modes to the third mode of operation (e.g., discharge circuitry may switch from a second mode of operation to a third mode of operation).

At step 1814 the discharge circuitry is operated in the third mode of operation (e.g., a discharge mode, discharging power at the input of a power device to the output of a power device, for example, the converted output power may be discharged as an output voltage on a second load [e.g., a discharge resistor, the first load, etc.]). For example, the third mode of operation may be a second discharge mode for a second phase/stage, and/or a second sub-phase/sub-stage of discharge. In some examples the discharge circuitry may be shut down/turned off when discharge has been completed (e.g., a certain threshold has been met).

At step 1816 at least one indication related to switching the mode of the discharge circuitry to the first mode of operation is obtained (e.g., the indication may be obtained by discharge circuitry/one or more controller). For example, the at least one indication related to switching mode to the first mode of operation may be an indication related to: one or more parameter (e.g., an electrical parameter in the power system), a threshold (e.g., voltage or power threshold), overcurrent, islanding, one or mode of operation of the discharge circuitry, etc.

At step 1818 the discharge circuitry switches mode back to the first mode of operation, based on/in response to the obtained indication to switch modes to the first mode of operation (e.g., discharge circuitry may switch from the third mode of operation to the first mode of operation). For example, the discharge circuitry may stop the discharge and continue to convert power.

At step 1802 the discharge circuitry is operated in the first mode of operation (e.g., the power conversion mode, converting power at the input of a power device to the output of a power device, for example, the converted output power may be provided as an output voltage on the first load.

Figure 19A:
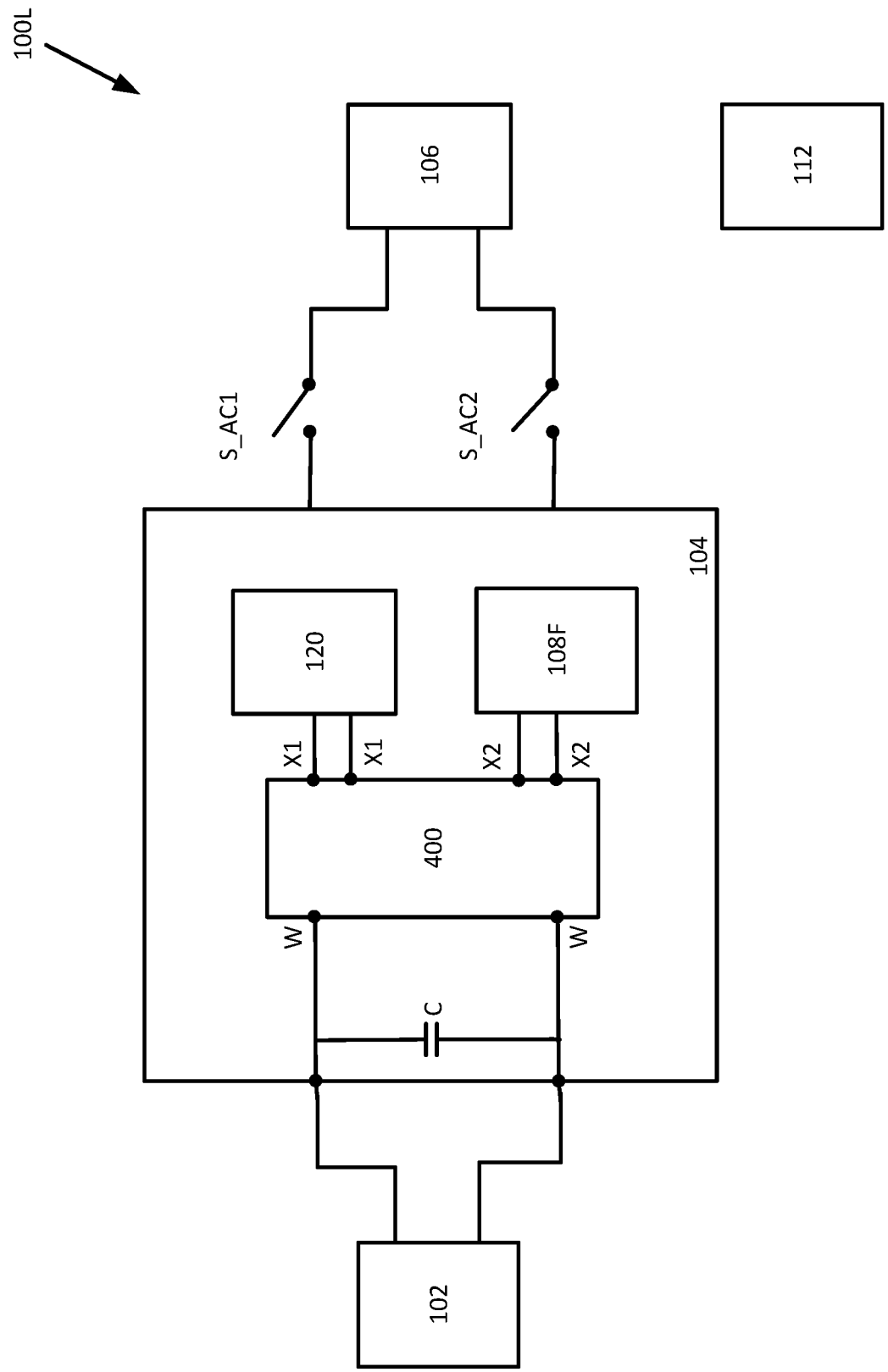
FIG. 19A illustrates a power system, in accordance with certain examples of the presently disclosed subject matter.

FIG. 19A illustrates a power system 100L according to examples of the present subject matter. Power system 100L/ elements of power system 100L may be similar to power systems/elements of power systems 100A-100K described above. Power system 100L may include a power device 400. Power device 400 may be an auxiliary power device (e.g., a DC to DC converter, for example, of system power device 140, e.g., a DC to AC inverter). Power system 100L may also include an additional load 120 (which may be the same as or similar to load 106). The one or more additional load 120 may include, for example: a processing circuit/processor, a memory storage device, a power storage device (e.g., a battery), a resistive device (e.g., a resistor), etc. The one or more additional load 120 may draw power from the power device 400 and/or capacitor C (e.g., also/even during a stage of discharge).

Power device 400 may include one or more inputs and one or more outputs (e.g., one or more input terminals W and one or more output terminals X1, X2, for example, output terminals X1, X2 may be similar to output terminals X illustrated in FIG. 4). Output terminals X1 may be configured to provide a similar output or a different output than output terminals X2. As an example, output terminals X1 may be in series and/or parallel to output terminals X2. The one or more additional load 120 may be connected to output terminals X1 of power device 400.

Power system 100L may also include discharge circuitry 108F. Discharge circuitry 108F may be connected to output terminals X2 of power device 400. Discharge circuitry 108F/elements of discharge circuitry 108F may be similar to discharge circuitry/elements of discharge circuitry 108A-108E described above. Discharge circuitry 108F may be configured to maximize the discharge of the discharge voltage (e.g. the voltage to be discharged, for example the voltage of the capacitor Vc) while taking into account/ performing discharge based on/in response to both the discharge power/discharge voltage of the discharge circuitry 108F and the discharge/usage power/discharge/usage voltage of the one or more additional load 120 (e.g., the power drawn by the one or more additional load 120). For example, discharge circuitry 108F may be configured to control discharge based on/in response to one or more additional loads 120 being connected/also drawing power during discharge. For example, if at a first stage of discharge the additional load 120 is inactive, not operational, or not connected (e.g., not drawing power from the power device 400 and/or capacitor C), then discharge circuitry 108F may be configured to operate and discharge at a first voltage value/power level. If at a subsequent second stage of discharge the additional load 120 is active, operational, or connected (e.g., drawing power from the power device 400 and/or capacitor C), then discharge circuitry 108F may be configured to operate and discharge at a second voltage value/power level (e.g., different than the first voltage value, for example the first voltage value may be greater than the second voltage value, as an example, the first voltage value may be about 10 volts and the second voltage value may be about 8 volts). In response to/based on the change in voltage the discharge circuitry 108F may be configured to control one or more electrical parameters to adjust the discharge (e.g., to maximize the discharge power being discharged by the discharge circuitry 108F and the additional load 120). For example, in response to/based on the change in voltage the discharge circuitry 108F may be configured to control the current flowing through/drawn by discharge circuitry 108F. As an example, in response to/based on a lesser voltage the discharge circuitry 108F may be configured to decrease the current flowing through/drawn by discharge circuitry 108F in order to decrease the power drawn by discharge circuitry 108F and maximize the power drawn by the additional load 120.

Discharge circuitry 108F may be configured to control the discharge based on/in response to one or more sensed/ obtained parameter (e.g., an electrical parameter). For example, discharge circuitry 108F may be configured to control the discharge current (e.g., the amount of current drawn/flowing through discharge circuitry 108F) based on/in response to a sensed/obtained voltage/power (e.g. the voltage/power at the input of auxiliary converter/power device 400/the voltage of capacitor C, and/or the voltage/ power at the output of auxiliary converter/power device 400). For example, discharge circuitry 108F may include control circuitry (described in detail below with reference to FIGS. 20A-20D) configured to control a current flowing through control circuitry 108F based on/in response to a sensed voltage (e.g., related to/indicative of a change in power drawn by additional load 120, for example, an increased in power drawn by additional load 120 and/or a decrease in power drawn by additional load 120.)

As an example, if in a stage of discharge the power drawn by additional load 120 begins/increases (e.g. such that the total power drawn by the discharge circuitry 108F and additional load 120 is above a certain threshold) then the sensed/obtained voltage (e.g., the voltage/power at the input of auxiliary converter/power device 400, and/or the voltage/ power at the output of auxiliary converter/power device 400) may decrease accordingly (e.g., below a certain threshold, for example less than about 10 volts, or less then about 12 volts). Based on/in response to the decrease of the sensed/ obtained voltage, discharge circuitry 108F may be configured to decrease the current flowing through discharge circuitry 108F. Discharge circuitry 108F decreasing the current flowing through discharge circuitry 108F may result in/cause the power drawn by the discharge circuitry 108F to decrease, and may result in/cause the total power drawn by the discharge circuitry 108F and additional load 120 to decrease (e.g., below a certain threshold). Discharge circuitry 108F decreasing the current flowing through discharge circuitry 108F, and decreasing the power drawn by the discharge circuitry 108F, may result in/cause the sensed/obtained voltage (e.g., the voltage/power at the input of auxiliary converter/power device 400, and/or the voltage/power at the output of auxiliary converter/power device 400) to increase accordingly (e.g., to about a certain threshold, for example about 10 volts, or about 12 volts). The discharge circuitry 108F may thus be configured to control the discharge power/discharge voltage of the discharge circuitry 108F by controlling the current flowing through the discharge circuitry 108F (e.g., based on/in response to the obtained/sensed voltage).

As an example, if in a subsequent stage of discharge the power drawn by additional load 120 remains relatively constant (e.g. such that the total power drawn by the discharge circuitry 108F and additional load 120 is/remains above a certain threshold) then the discharge circuitry 108F may be configured to maintain/control the current flowing through the discharge circuitry 108F at a relatively constant current value (e.g., less than the current flowing through the discharge circuitry 108F in the stage of discharge before the power drawn by additional load 120 began/increased). For example, in a stage of discharge before the power drawn by additional load 120 began/increased the current flowing through the discharge circuitry 108F may be maintained at a relatively constant current of about 10 A. As an example, in a stage of discharge after the power drawn by additional load 120 began/increased and the power drawn by additional load 120 remains relatively constant, the current flowing through the discharge circuitry 108F may be maintained at a relatively constant current of about 8 A or about 5 A.

As an example, if in a stage of discharge the power drawn by additional load 120 ceases/decreases (e.g. such that the total power drawn by the discharge circuitry 108F and additional load 120 is below a certain threshold) then the sensed/obtained voltage (e.g., the voltage/power at the input of auxiliary converter/power device 400, and/or the voltage/power at the output of auxiliary converter/power device 400) may increase accordingly (e.g., to about a certain threshold, for example about 10 volts, or about 12 volts). As an example, in a stage of discharge after the power drawn by additional load 120 ceases/decreased, the current flowing through the discharge circuitry 108F may be maintained at a relatively constant current of about 10 A (e.g. about the current value of the current flowing through the discharge circuitry 108F in the stage of discharge before the power drawn by additional load 120 began/increased).

Figure 19B:
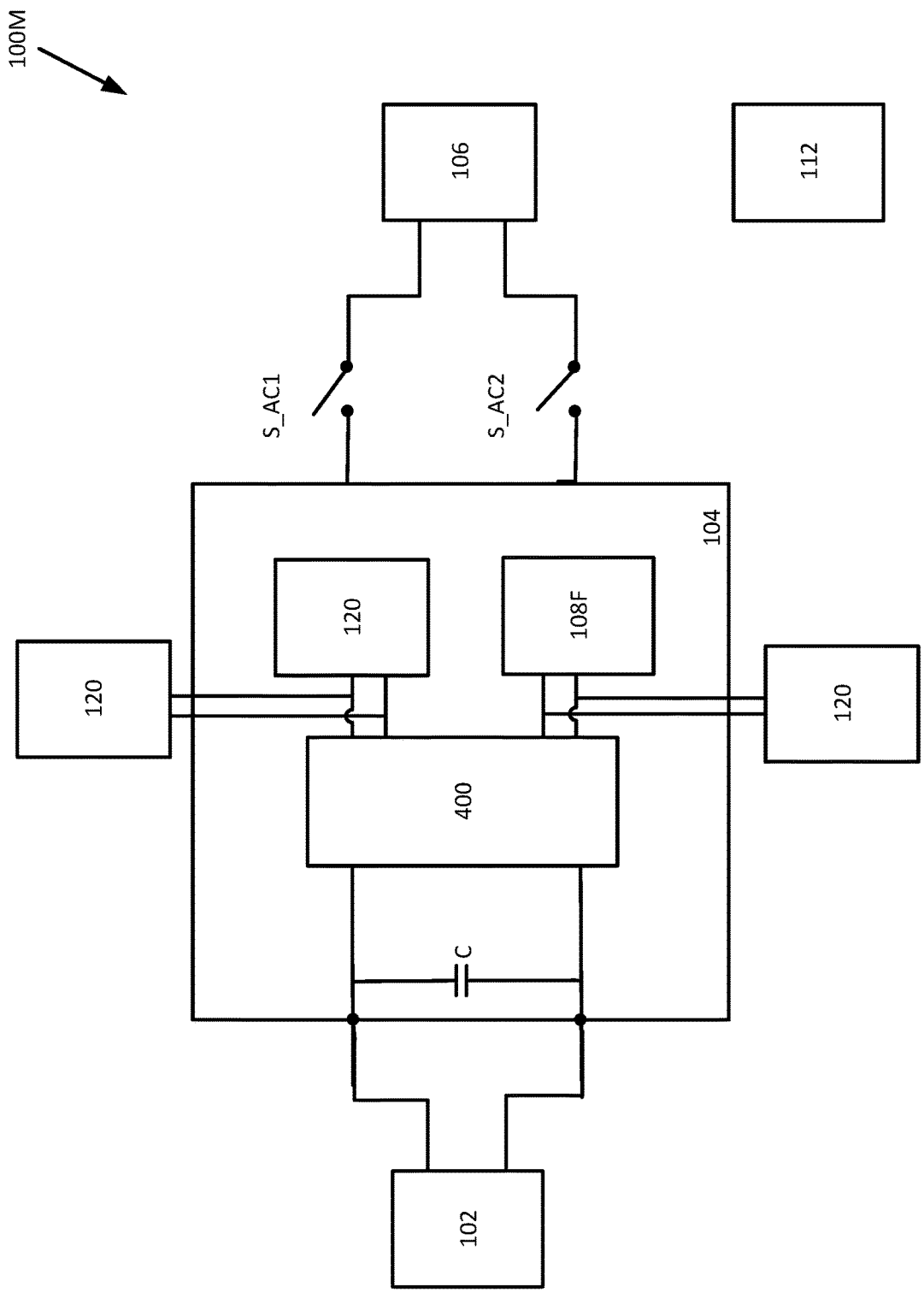
FIG. 19B illustrates a power system, in accordance with certain examples of the presently disclosed subject matter.

FIG. 19B illustrates a power system 100M according to examples of the present subject matter. Power system 100M/elements of power system 100M may be similar to power systems/elements of power systems 100A-100L described above. Power system 100M may include a plurality of additional loads 120 (which may be the same as or similar to load 106). The plurality of additional loads 120 may be internal or external to system power device 104. One or more additional loads 120 may be connected to the same bus as each other. One or more additional loads 120 may be connected to the same bus as discharge circuitry 108F.

Figure 20A:
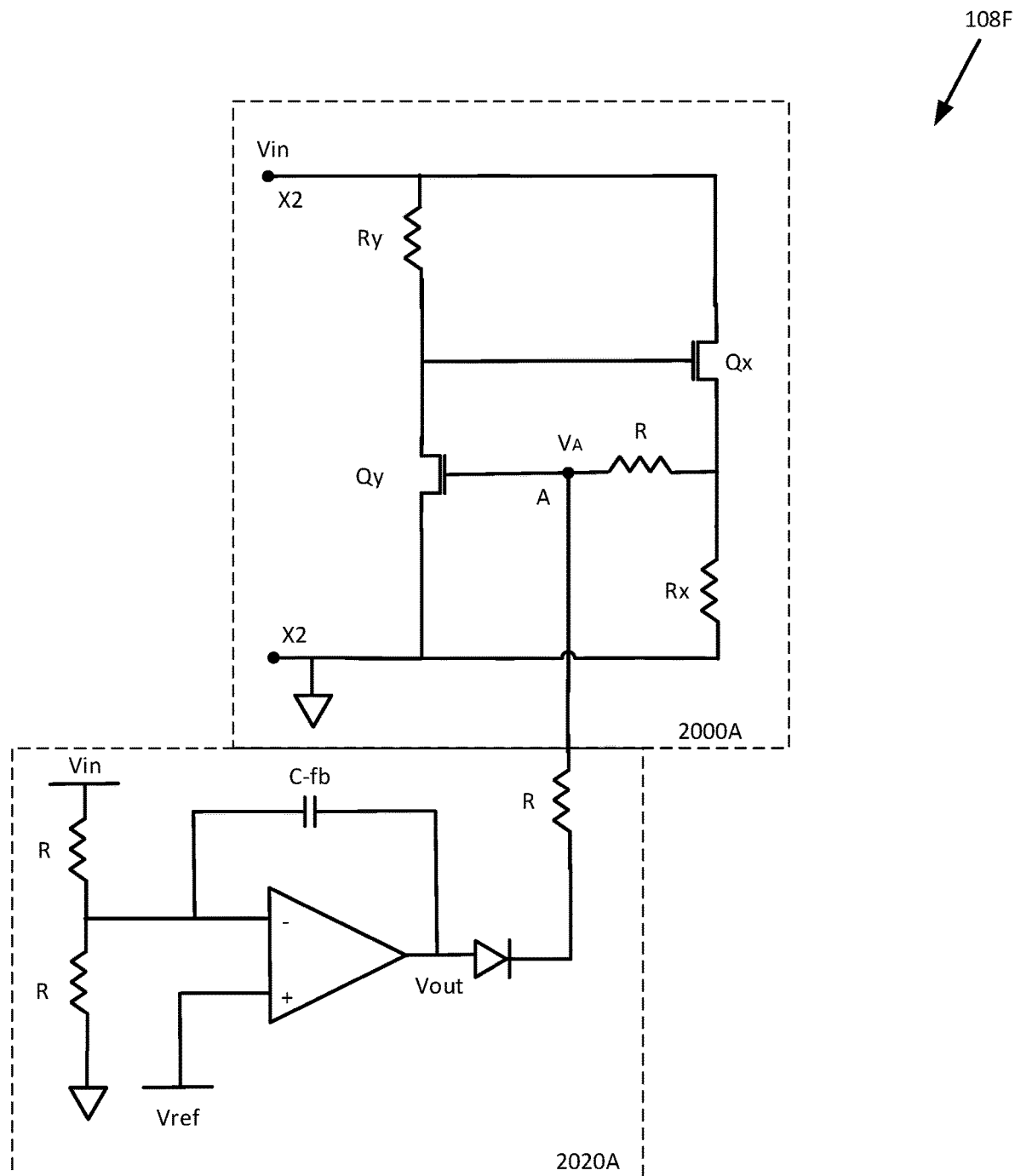
FIG. 20A illustrates discharge circuitry, in accordance with certain examples of the presently disclosed subject matter.

FIG. 20A illustrates discharge circuitry 108F according to examples of the present subject matter. Discharge circuitry 108F may include control circuitry 2000A and control circuitry 2020A. Control circuitry 2000A may be configured to maintain the current flowing through resistor Rx at about a relatively constant current (e.g., during a certain stage of discharge, for example, about 1 A, or about 10 A). Resistor Rx may have a relatively much lesser resistance than resistor Ry (e.g., on a scale of hundreds or thousands less resistance, for example, Rx may have a resistance of about 1-10 ohms, and Ry may have a resistance of about 1-10 kohms). Switch Qx may be configured to operate when the input voltage (Vin) (e.g. the voltage at the input/output of power device 400) is greater than about a certain first threshold (Vt1) (e.g., the threshold voltage for switch Qx), and less than about a certain second threshold (Vt2) (e.g., the threshold voltage for switch Qy). Switch Qy may be configured to operate when the input voltage (Vin) (e.g. the voltage at the input/output of power device 400) is greater than about a certain first threshold (Vt1) (e.g., the threshold voltage for switch Qx), and greater than and/or about equal to about a certain second threshold (Vt2) (e.g., the threshold voltage for switch Qy) (e.g. about 1-5 volts, for example, about 2 volts, or about 2.5 volts). Switch Qx and switch Qy may be configured to be on/near the edge-of-conductance (e.g., during one or more mode of operation of discharge circuitry 108F/during a stage of discharge). Control circuitry 2000A may be configured to maintain the current through resistor Rx at a relatively constant current using switches Qx and Qy (e.g., according to the second threshold voltage Vt2, for example, the threshold voltage for switch Qy).

Control circuitry 2020A may be configured to control the current flowing through/drawn by discharge circuitry 108F (e.g., by controlling the second threshold voltage Vt2, for example, the threshold voltage for switch Qy, thus controlling the value of the constant current flowing through/drawn by resistor Rx). Control circuitry 2020A may include a resistor bridge and an integrator circuit (e.g. a comparator and a feedback loop with a capacitor C-fb) configured to control the current in discharge circuitry 108F (e.g., based on/in response to a sensed/obtained parameter, for example, to decrease the current based on/in response to a decrease in voltage and/or increase the current based on/in response to an increase in voltage).

For example, if an input voltage (Vin)/sensed/obtained voltage (e.g., the voltage/power at the input of auxiliary converter/power device 400, and/or the voltage/power at the output of auxiliary converter/power device 400, for example, the voltage at terminal[s] W and/or terminal[s] X2 illustrated in FIG. 19A, which as illustrated in FIG. 20A terminal[s] X2 may be the input terminals to control circuitry of discharge circuitry 108F) is a relatively greater voltage (e.g., greater than or about equal to a certain threshold), then the voltage at terminal A (VA) may be affected (e.g., voltage VA may be a relatively lesser voltage if the amplifier is an inverting amplifier), and the current flowing through/drawn by the discharge circuitry 108F/resistor Rx may be a relatively greater and relatively constant current (e.g., the current flowing through/drawn by the discharge circuitry 108F/resistor Rx might not be decreased). The increase voltage may be controlled, for example, by diode D, which may be configured to prevent the voltage from being increased past a certain threshold (e.g., a certain maximum voltage level for discharge). If the input voltage (Vin)/sensed/obtained voltage (e.g., the voltage/power at the input of auxiliary converter/power device 400, and/or the voltage/power at the output of auxiliary converter/power device 400) is a relatively lesser voltage (e.g., less than a certain threshold), then the voltage at terminal A (VA) may be affected (e.g., voltage VA may be a relatively greater voltage if the amplifier is an inverting amplifier), and the current flowing through/drawn by the discharge circuitry 108F/resistor Rf may be decreased to a relatively lesser and relatively constant current, thereby decreasing the power drawn by discharge circuitry 108F, and thereby maximizing the discharge power of the element to be discharged (e.g. the capacitor of a system power device 104) even when there are one or more other additional load(s) 120 also drawing power from the element to be discharged/the power device 400 (e.g., during discharge).

Figure 20B:
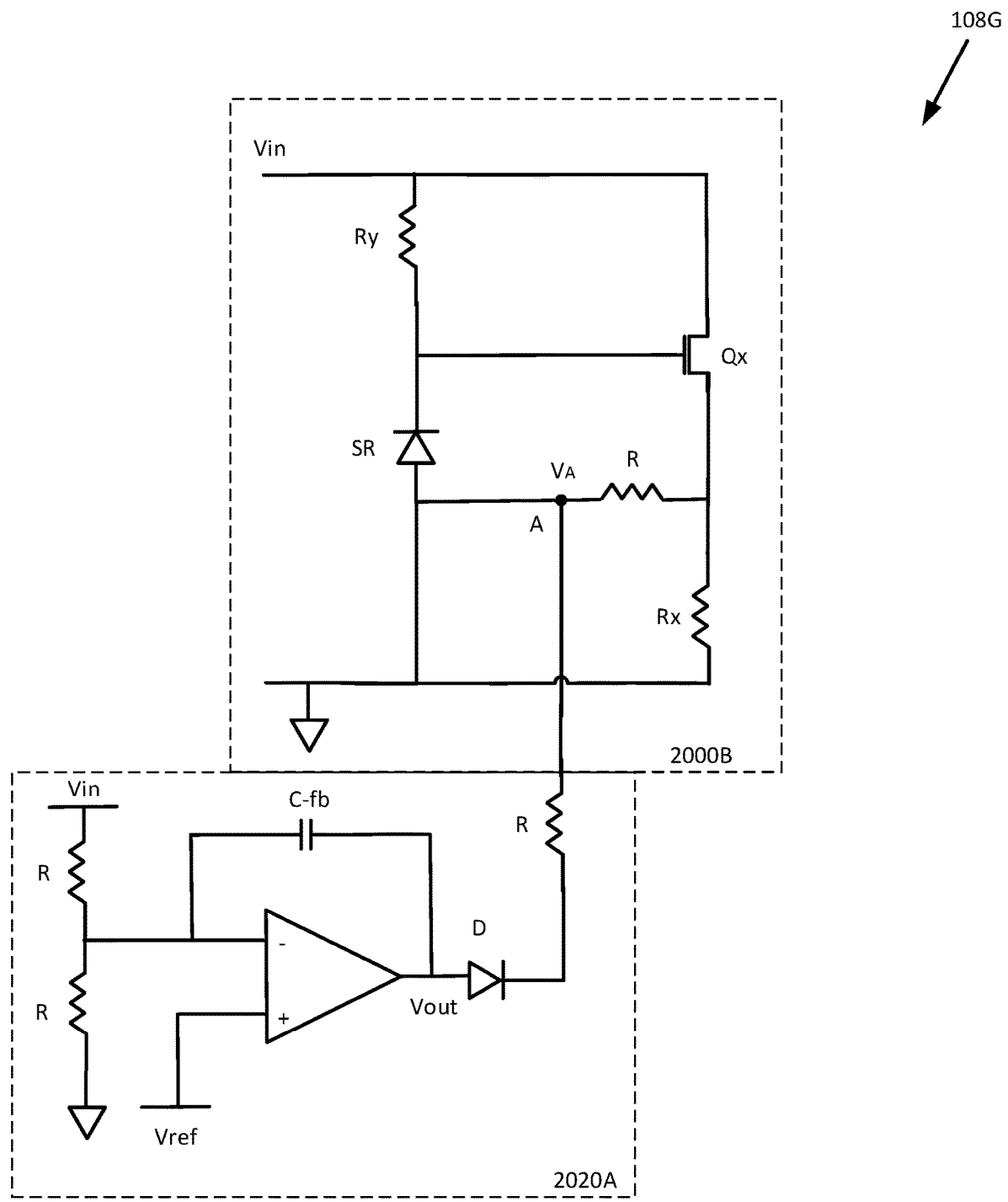
FIG. 20B illustrates discharge circuitry, in accordance with certain examples of the presently disclosed subject matter.

FIG. 20B illustrates discharge circuitry 108G with control circuitry 2000B according to examples of the present subject matter. Discharge circuitry 108G may be similar to discharge circuitry 108F. Control circuitry 2000B may include a shunt regulator SR (e.g., instead of a switch, for example, the MOSFET Qy illustrated in discharge circuitry 108F). Shunt regulator SR may be configured with a certain threshold voltage for operation (Vt2) (e.g., a threshold voltage in the range of about 1 volt-5 volts, for example, about 2.5 volts) similar to the threshold of switch Qy. Discharge circuitry 108G including shunt regulator SR may be configured to operate in a similar manner as discharge circuitry 108F including switch Qy.

Figure 20C:
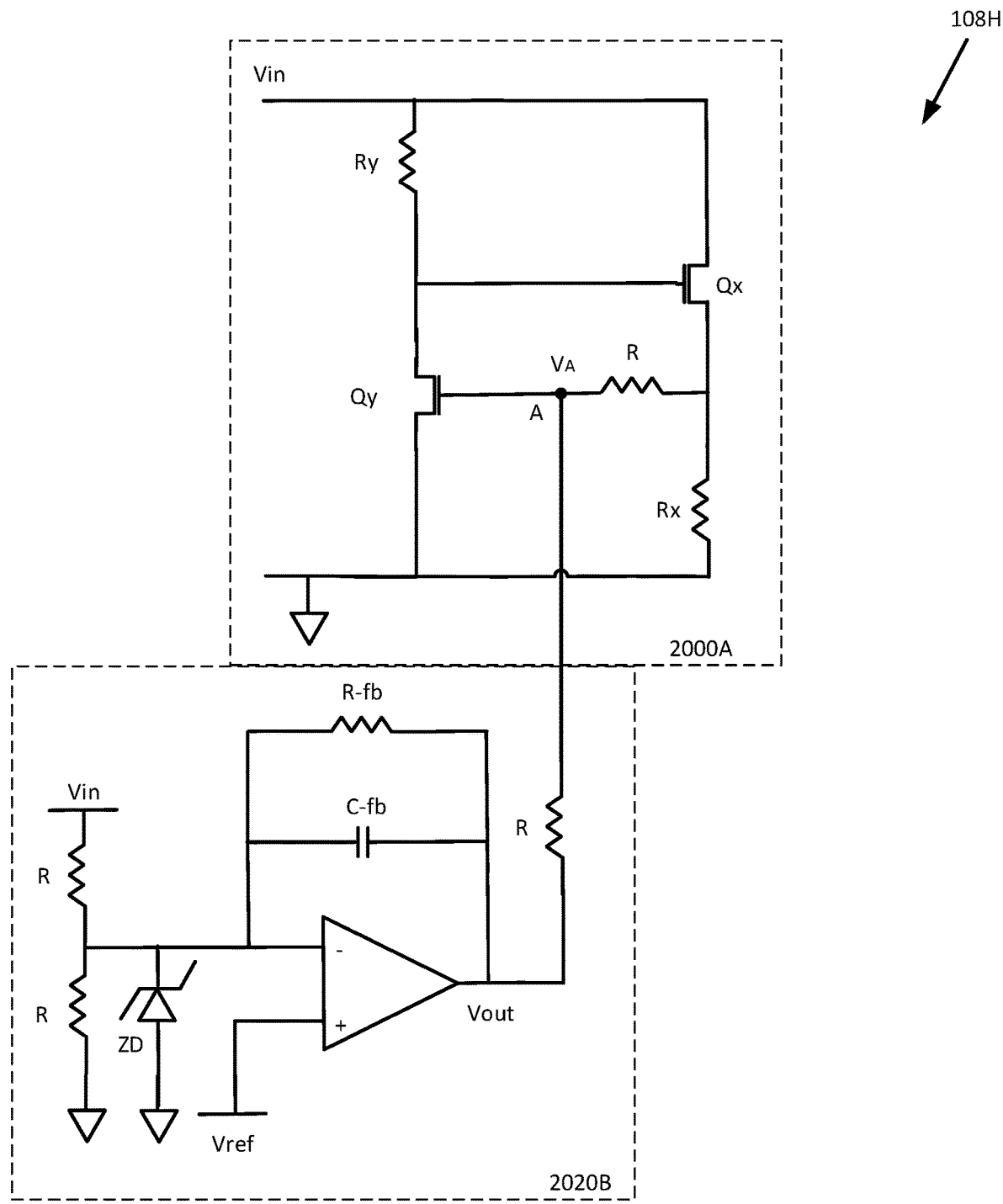
FIG. 20C illustrates discharge circuitry, in accordance with certain examples of the presently disclosed subject matter.

FIG. 20C illustrates discharge circuitry 108H with control circuitry 2020B according to examples of the present subject matter. Discharge circuitry 108H may be similar to discharge circuitry 108F/discharge circuitry 108G. Control circuitry 2020B may include a feedback loop with a resistor R-fb (e.g., in addition to a feedback loop with a capacitor C-fb, for example, as illustrated in discharge circuitry 108F/108G). Resistor R-fb may help provide DC gain control. Control circuitry 2020B may also include a zener diode ZD (e.g., instead of a diode, for example, the diode D illustrated in discharge circuitry 108F). Zener diode ZD may be configured to prevent the voltage from increasing past a certain threshold. Discharge circuitry 108H including zener diode ZD may be configured to operate in a similar manner as discharge circuitry 108F including diode D. Zener diode ZD may also be configured to allow operation of discharge circuitry 108H/control circuitry 2020B at relatively low voltages (e.g., less than a threshold voltage for diode D, for example, about 0.5 volts or about 0.7 volts). As mentioned, appropriate elements may be interchanged between the examples described herein, and additional/alternative elements with similar functionality may also be used.

Figure 20D:
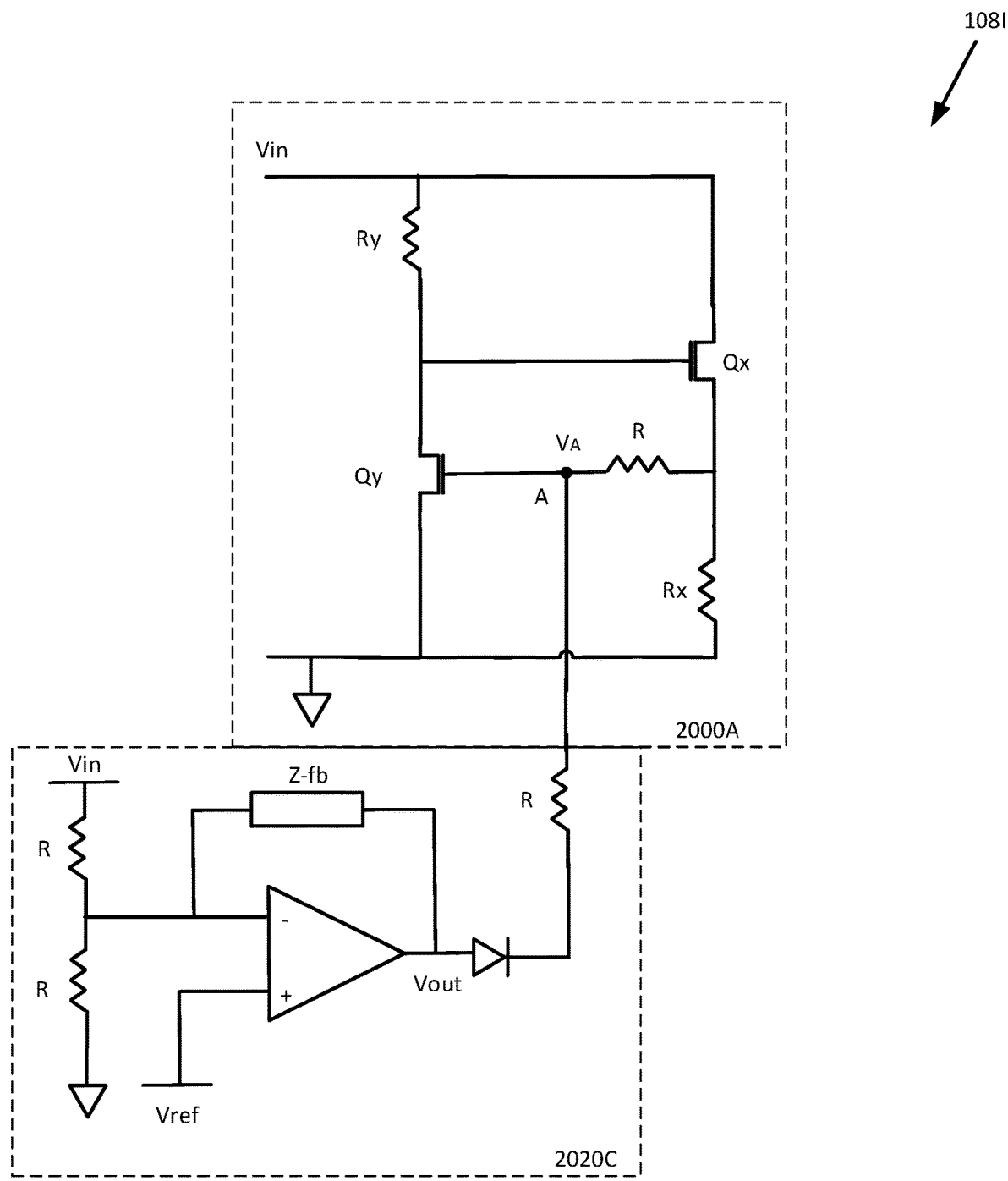
FIG. 20D illustrates discharge circuitry, in accordance with certain examples of the presently disclosed subject matter.

FIG. 20D illustrates discharge circuitry 108I with control circuitry 2020C according to examples of the present subject matter. Discharge circuitry 108I may be similar to discharge circuitry 108F/108G/108H. Discharge circuitry 2020C may include a feedback loop with an impedance Z-fb. Impedance Z-fb may include one or more electrical element, for example, one or more of: a resistor, a capacitor, an inductor, etc. A feedback loop with just a resistor R-fb may cause a more drastic/immediate change in current (e.g., a less exponential response in the current/voltage produced by the discharge circuitry 108I) than a feedback loop that includes a capacitor C-fb.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The skilled person will appreciate that inventive aspects disclosed herein may include an apparatus or a method as in any of the following clauses:

CLAUSES

Clause 1. An apparatus comprising:
 a discharge circuitry configured to discharge an input voltage in a system power device;
 the discharge circuitry being configured to discharge the input voltage in response to at least one indication related to discharge; and
 the discharge circuitry being configured to discharge the input voltage so that an output voltage of the discharge circuitry is about a constant voltage value during discharge.

Clause 2. The apparatus of clause 1, wherein the discharge circuitry comprises at least one converter.

Clause 3. The apparatus of clause 2, wherein the at least one converter is a direct current (DC) to DC converter.

Clause 4. The apparatus of clause 2, wherein the at least one converter is a buck converter.

Clause 5. The apparatus of clause 2, wherein the at least one converter is a boost converter.

Clause 6. The apparatus of clause 2, wherein the at least one converter is a buck/boost converter.

Clause 7. The apparatus of clause 2, wherein the at least one converter is a buck+boost converter.

Clause 8. The apparatus of clause 1, wherein the system power device is a DC to alternating current (AC) converter.

Clause 9. The apparatus of clause 1, wherein the discharge circuitry comprises at least one first switch in series connection with at least one first resistor.

Clause 10. The apparatus of clause 9, wherein the discharge circuitry comprises at least one second switch in series connection with at least one second resistor.

Clause 11. The apparatus of clause 10, wherein the at least one first switch and the at least one first resistor are connected in parallel to the at least one second switch and the at least one second resistor.

Clause 12. The apparatus of clause 11, wherein the at least one first switch is configured to operate during a first phase and a second phase of discharge.

Clause 13. The apparatus of clause 12, wherein the at least one second switch is configured to operate during the first phase of discharge but not the second phase of discharge.

Clause 14. The apparatus of clause 1, further comprising at least one sensor configured to sense an electrical parameter related to discharge.

Clause 15. The apparatus of clause 13, wherein the second phase of discharge is activated and transitioned to in response to a threshold.

Clause 16. The apparatus of clause 15, wherein the second phase of discharge is activated and transitioned to in response to a sensed electrical parameter related to the threshold.

Clause 17. The apparatus of clause 1, further comprising a second discharge circuitry that does not include a converter to discharge the voltage.

Clause 18. The apparatus of clause 17, wherein the second discharge circuitry is included in the system power device.

Clause 19. The apparatus of clause 17, wherein the second discharge circuitry is included in the discharge circuitry.

Clause 20. The apparatus of clause 1, wherein the discharge circuitry is configured to discharge the input voltage so that an output current of the discharge circuitry is about a constant current value during discharge.

Clause 21. The apparatus of clause 1, wherein the discharge circuitry is configured to discharge the input voltage so that an output power of the discharge circuitry is about a constant power value during discharge.

Clause 22. The apparatus of clause 1, wherein the indication related to discharge is at least one of: an indication related to overvoltage, and an indication related to islanding.

Clause 23. The apparatus of clause 17, wherein the second discharge circuitry is configured to discharge a second input voltage so that an output voltage of the second discharge circuitry is not a constant current voltage value during discharge.

Clause 24. The apparatus of clause 17, wherein the second discharge circuitry operates during a first phase and a second phase of the discharge.

Clause 25. The apparatus of clause 17, wherein the second discharge circuitry operates simultaneously with the discharge circuitry.

Clause 26. The apparatus of clause 24, wherein the second discharge circuitry operates during the second phase of the discharge but not the first phase of the discharge.

Clause 27. The apparatus of clause 17, wherein the second discharge circuitry operates after the discharge circuitry.

Clause 28. The apparatus of clause 17, wherein the discharge circuitry includes a full bridge circuit.

Clause 29. The apparatus of clause 28, wherein the voltage is discharged by at least four switches of the full bridge circuit.

Clause 30. The apparatus of clause 29, wherein discharge of the voltage is distributed between the at least four switches.

Clause 31. The apparatus of clause 1, wherein the discharge circuitry is not dedicated discharge circuitry.

Clause 32. The apparatus of clause 1, wherein the discharge is relatively quick.

Clause 33. The apparatus of clause 1, wherein the discharge is within a time threshold.

Clause 34. The apparatus of clause 1, wherein the input voltage is relatively great.

Clause 35. The apparatus of clause 1, wherein the input voltage is stored by at least one capacitor.

Clause 36. The apparatus of clause 35, wherein the at least one capacitor is a relatively great capacitor.

Clause 37. A method comprising:
obtaining at least one indication related to discharge of an input voltage in a system power device; and
in response to the at least one indication related to discharge, discharging the input voltage, using discharge circuitry, so that an output voltage is about a constant voltage value during discharge.

Clause 38. The method of clause 37, wherein the discharge circuitry includes at least one converter.

Clause 39. The method of clause 37 or clause 38, wherein the output current of the discharge circuitry is about a constant current value during discharge.

Clause 40. The method of clause 37 or clause 38, wherein an output power of the discharge circuitry is about a constant power value during discharge.

Clause 41. An apparatus comprising:
a power converter having an input and an output; and
a controller configured to control the power converter, wherein the controller is configured to, in a first mode of operation, operate the power converter to convert input power to output power, and provide the output power at a first output voltage to a first load,
and in a second mode of operation, operate the power converter to discharge input voltage by converting the input voltage to a second output voltage across a second load.

Clause 42. The apparatus of clause 41, wherein the first load is an electrical grid.

Clause 43. The apparatus of clause 41, wherein the first load is a series connection of power devices.

Clause 44. The apparatus of clause 41, wherein the first load is a storage device.

Clause 45. The apparatus of clause 41, wherein the second load is a resistor.

Clause 46. The apparatus of clause 41, further comprising a third mode of operation, wherein the apparatus is configured to discharge the input voltage by direct discharge, without controlled conversion, via a third load and not the power converter.

Clause 47. The apparatus of clause 41, wherein the second output voltage is a substantially constant voltage.

Clause 48. The apparatus of clause 41, wherein, in the second mode, the controller is configured to operate the power converter to draw a substantially constant current at the input.

Clause 49. The apparatus of clause 41, wherein the first load is the same as the second load.

Clause 50. A method comprising:
operating a power converter, the power converter comprising an input and an output, in a first mode of operation and a second mode of operation;
wherein the operating the power converter in the first mode of operation comprises: converting input power to output power; and
providing the output power at a first output voltage to a first load; and
wherein the operating the power converter in the second mode of operation comprises: discharging input voltage by converting the input voltage to a second output voltage across a second load.

Clause 51. The method of clause 50, wherein the first load is at least one of: an electrical grid, a series connection of power devices, and a storage device.

Clause 52. The method of clause 51, wherein the second load is a resistor.

Clause 53. The method of clause 51, further comprising operating the power converter in a third mode of operation including discharging the input voltage across a third load without first converting the input voltage.

Clause 54. The method of clause 51, wherein the second output voltage is a substantially constant voltage.

Clause 55. The method of clause 51, wherein, operating the power converter in the second mode further comprises: drawing a substantially constant current at the input.

Clause 56. An apparatus comprising:
a discharge circuitry configured to discharge an input voltage in a system power device; and
a controller configured to control the discharge circuitry so that a discharge voltage of the discharge circuitry is controlled during discharge.

Clause 57. The apparatus of clause 56, wherein the discharge circuitry comprises at least one converter.

Clause 58. The apparatus of clause 56, wherein the discharge voltage is about a constant voltage value during the discharge.

Clause 59. The apparatus of clause 56, wherein the discharge voltage is not a constant voltage value during the discharge.

Clause 60. The apparatus of clause 56, wherein the discharge voltage is a voltage of a capacitor.

Clause 61. An apparatus comprising:
discharge circuitry configured to discharge an input voltage of a system power device;
the discharge circuitry being configured to discharge the input voltage in response to at least one indication related to discharge; and
a controller configured to operate the discharge circuitry to discharge the input voltage and to regulate an output voltage of the discharge circuitry.

Clause 62. The apparatus of clause 61, wherein the controller is configured to regulate the output voltage to about a constant voltage value for at least one phase of discharge.

Clause 63. The apparatus of clause 61 or clause 62, wherein the discharge circuitry comprises at least one converter.

Clause 64. The apparatus of clause 63, wherein the at least one converter is a direct current (DC) to DC converter.

Clause 65. The apparatus of clause 63 or clause 64, wherein the at least one converter is at least one of: a buck converter, a boost converter, a buck/boost converter, a buck+boost converter, an isolating converter, a flyback converter, or a forward converter.

Clause 66. The apparatus of any one of clauses 61-65, wherein the system power device is a DC to alternating current (AC) converter.

Clause 67. The apparatus of any one of clauses 61-66, wherein the discharge circuitry comprises at least one first switch in a series connection with at least one first resistor.

Clause 68. The apparatus of any one of clauses 61-67, wherein the discharge circuitry comprises:
at least one second switch in a series connection with at least one second resistor;
the at least one first switch and the at least one first resistor are connected in parallel to the at least one second switch and the at least one second resistor;
the at least one first switch is configured to operate during a first phase of discharge and a second phase of discharge; and
the at least one second switch is configured to operate during the first phase of discharge but not the second phase of discharge.

Clause 69. The apparatus of any one of any one of clauses 61-68, wherein the controller is configured to regulate an output current of the discharge circuitry to about a constant current value for at least one phase of discharge or regulate an output power of the discharge circuitry to about a constant power value for at least one phase of discharge.

Clause 70. The apparatus of any one of clauses 61-69, wherein the indication related to discharge is at least one of: an indication related to overvoltage at an input to the system power device, an indication related to islanding, and an indication related to shut down.

Clause 71. The apparatus of any one of clauses 61-70, wherein the discharge circuitry includes a full bridge circuit.

Clause 72. The apparatus of any one of clauses 61-71, wherein the input voltage is stored by at least one capacitor.

The invention claimed is:

1. An apparatus comprising:
a discharge circuit comprising:
a first switch in a first series connection with a first resistor, and
a second switch in a second series connection with a second resistor, wherein:
the first switch and the first resistor are connected in parallel to the second switch and the second resistor,
the discharge circuit is configured to discharge an input voltage of a system power device, and
the discharge circuit is configured to discharge the input voltage in response to an indication related to discharge; and
a controller configured to operate the discharge circuit to discharge the input voltage and to regulate an output voltage of the discharge circuit.

2. The apparatus of claim 1, wherein the controller is configured to regulate the output voltage to about a constant voltage value for a phase of discharge.

3. The apparatus of claim 1, wherein the discharge circuit comprises a third switch and a third transistor.

4. The apparatus of claim 1, wherein the discharge circuit comprises a converter.

5. The apparatus of claim 4, wherein the converter is a direct current (DC) to DC converter.

6. The apparatus of claim 4, wherein the converter is at least one of: a buck converter, a boost converter, a buck/boost converter, a buck+boost converter, an isolating converter, a flyback converter, or a forward converter.

7. The apparatus of claim 4, wherein the controller is configured to:
activate the converter to regulate the output voltage to a constant voltage value for a first phase of discharge; and
deactivate the converter to regulate the output voltage to non-constant voltage values for a second phase of discharge.

8. The apparatus of claim 7, wherein the non-constant voltage values for the second phase of discharge are linear voltage discharge values or exponential voltage discharge values.

9. The apparatus of claim 7, wherein:
the discharge circuit comprises a third switch in a third series connection with a third resistor; and
the third switch is configured to operate during the second phase of discharge.

10. The apparatus of claim 1, wherein the system power device comprises a DC to alternating current (AC) converter.

11. The apparatus of claim 1, further comprising the system power device, wherein the system power device comprises the discharge circuit.

12. The apparatus of claim 1, wherein the first switch is configured to operate during a first phase of discharge and a second phase of discharge.

13. The apparatus of claim 12, wherein the second switch is configured to operate during the first phase of discharge but not the second phase of discharge.

14. The apparatus of claim 1, wherein the controller is configured to regulate an output current of the discharge circuit to about a constant current value for a phase of discharge.

15. The apparatus of claim 1, wherein the controller is configured to regulate an output power of the discharge circuit to about a constant power value for a phase of discharge.

16. The apparatus of claim 1, wherein the indication related to discharge is an indication related to overvoltage at an input to the system power device.

17. The apparatus of claim 1, wherein the indication related to discharge is an indication related to islanding.

18. The apparatus of claim 1, wherein the indication related to discharge is an indication related to shut down.

19. The apparatus of claim 1, wherein the discharge circuit comprises a full bridge circuit.

20. The apparatus of claim 1, wherein the input voltage is stored by a capacitor.

21. The apparatus of claim 1, wherein the controller is configured to:
   activate the first switch and the second switch to regulate the output voltage to a constant voltage value.

22. The apparatus of claim 1, wherein the controller is configured to:
   activate the first switch and the second switch to regulate the output voltage to a constant voltage value for a first phase of discharge; and
   deactivate the first switch to regulate the output voltage to the constant voltage value for a second phase of discharge.

23. The apparatus of claim 22, wherein:
   the discharge circuit comprises a third switch in a third series connection with a third resistor; and
   the third switch is configured to operate during a third phase of discharge.

24. A method comprising:
   obtaining an indication related to discharge of an input voltage in a system power device; and
   in response to the indication related to discharge, discharging the input voltage, using a discharge circuit, so that an output voltage is about a constant voltage value during discharge, wherein the discharge circuit comprises:
      a first switch in a first series connection with a first resistor, and
      a second switch in a second series connection with a second resistor, and
      wherein the first switch and the first resistor are connected in parallel to the second switch and the second resistor.

25. The method of claim 24, wherein the discharge circuit comprises a converter.

26. The method of claim 24, wherein an output current of the discharge circuitry is about a constant current value during discharge.

27. The method of claim 24, wherein an output power of the discharge circuitry is about a constant power value during discharge.

* * * * *